United States Patent [19]

Petersen

[11] Patent Number: 4,992,961

[45] Date of Patent: Feb. 12, 1991

[54] METHOD AND APPARATUS FOR INCREASING IMAGE GENERATION SPEED ON RASTER DISPLAYS

[75] Inventor: Roger J. Petersen, Santa Rosa, Calif.

[73] Assignee: Hewlett-Packard Company, Palo Alto, Calif.

[21] Appl. No.: 278,873

[22] Filed: Dec. 1, 1988

[51] Int. Cl.[5] .......................... G06F 3/14; G09G 5/36

[52] U.S. Cl. .......................... 364/521; 340/724; 340/747; 340/799; 364/518

[58] Field of Search .......................... 364/521, 518; 340/724, 340/750, 801; 358/22, 160

[56] References Cited

U.S. PATENT DOCUMENTS

| | | | |
|---|---|---|---|
| 4,459,677 | 7/1984 | Porter et al. | 364/900 |
| 4,472,732 | 9/1984 | Bennett et al. | 358/22 |
| 4,475,161 | 10/1984 | Stock | 364/521 |
| 4,631,750 | 12/1986 | Gabriel et al. | 382/41 |
| 4,648,049 | 3/1987 | Dines et al. | 364/521 |
| 4,773,026 | 9/1988 | Takahara et al. | 364/518 |
| 4,799,173 | 1/1989 | Rose et al. | 364/518 |

*Primary Examiner*—Gary V. Harkcom
*Assistant Examiner*—Raymond J. Bayerl
*Attorney, Agent, or Firm*—William C. Milks, III

[57] ABSTRACT

An image data generation circuit for a conventional raster display comprises a graphics systems processor and a standard video dynamic random access memory (VRAM) interconnected by an address translator circuit. The VRAM is connected to the raster display. The graphics system processor is preferably an off-the-shelf graphics system processor capable of drawing horizontal lines very quickly. This graphics system processor is configured to transpose raw data to achieve the same horizontal drawing speed while drawing in the vertical direction and feeds the resulting image data to the address translator circuit. The address translator circuit reconverts the image data for storage in the VRAM so that the image data can be accessed in a conventional manner to modulate the electron beam of the raster display. In one example, this results in an eight-fold increase in the update or refresh rate of the corresponding image on the raster display.

20 Claims, 42 Drawing Sheets

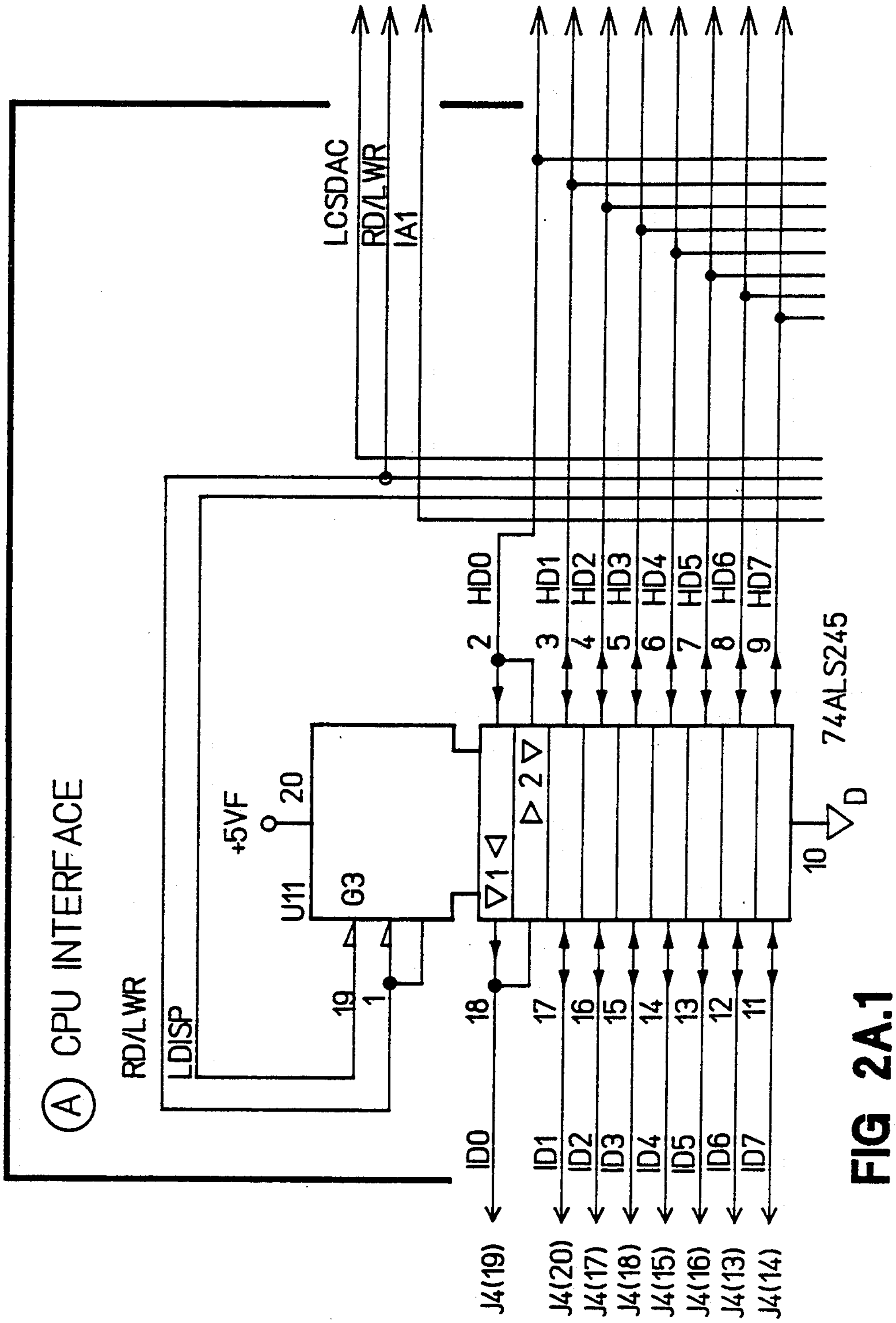
FIG 2A.1

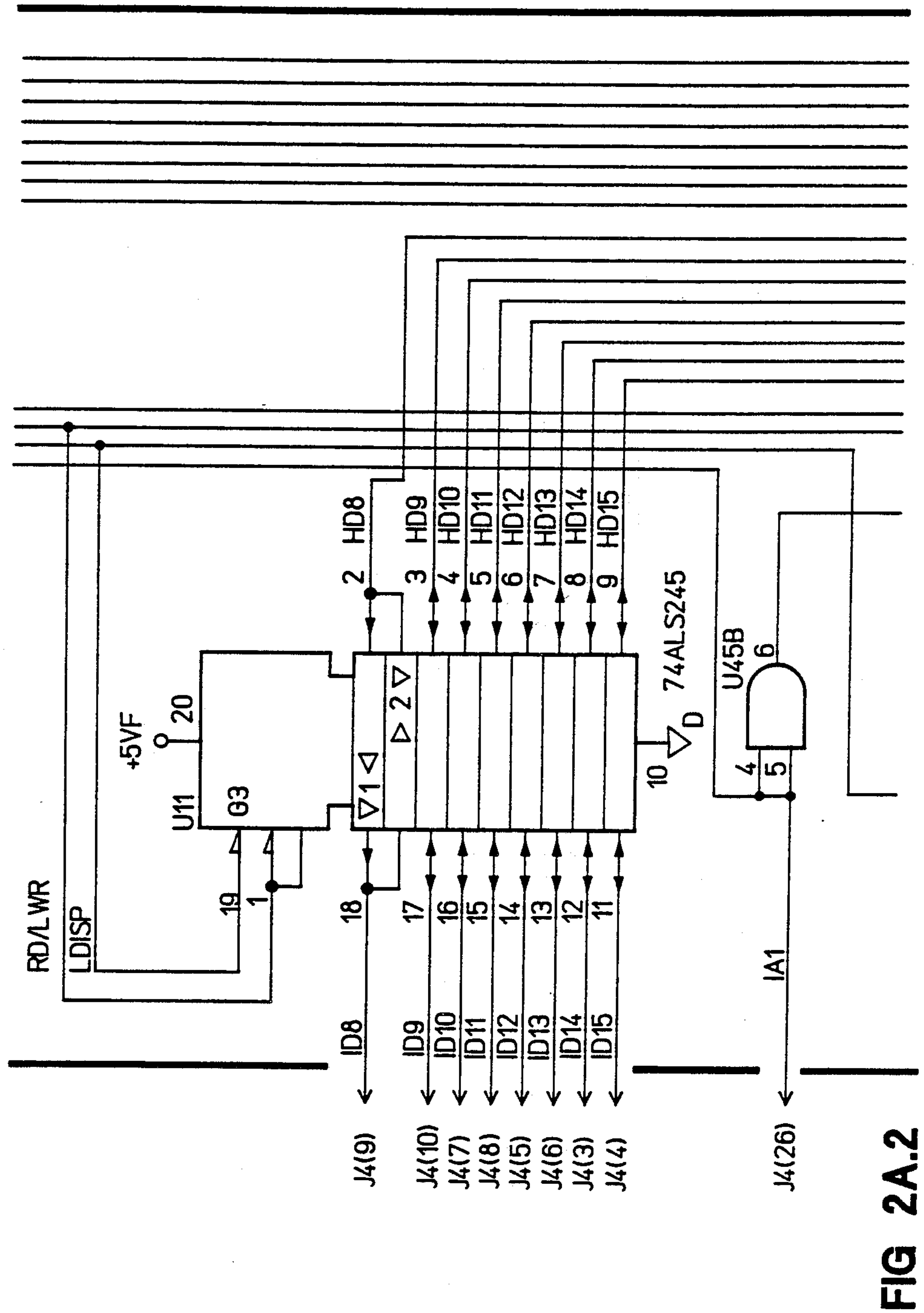
FIG 2A.2

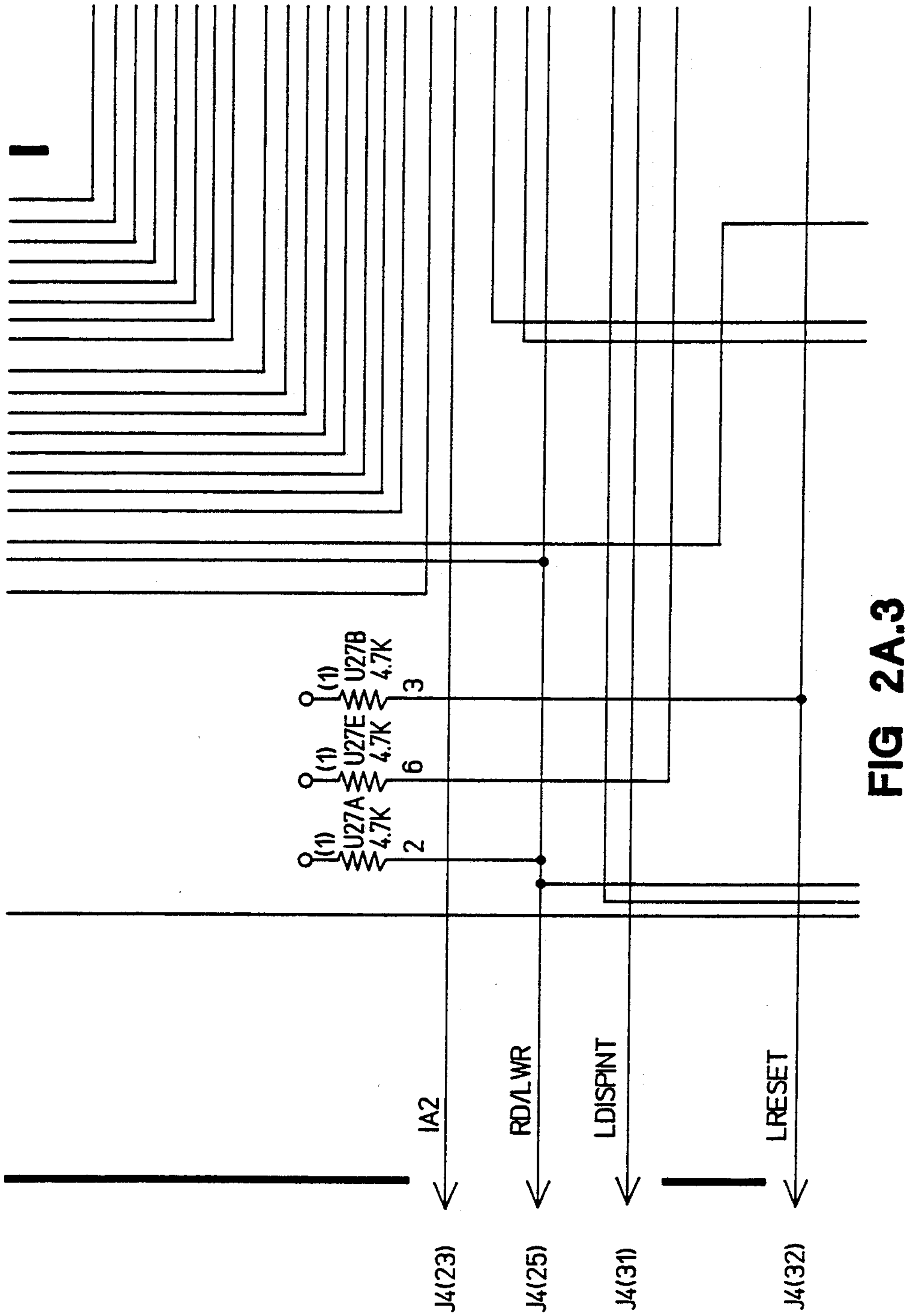
FIG 2A.3

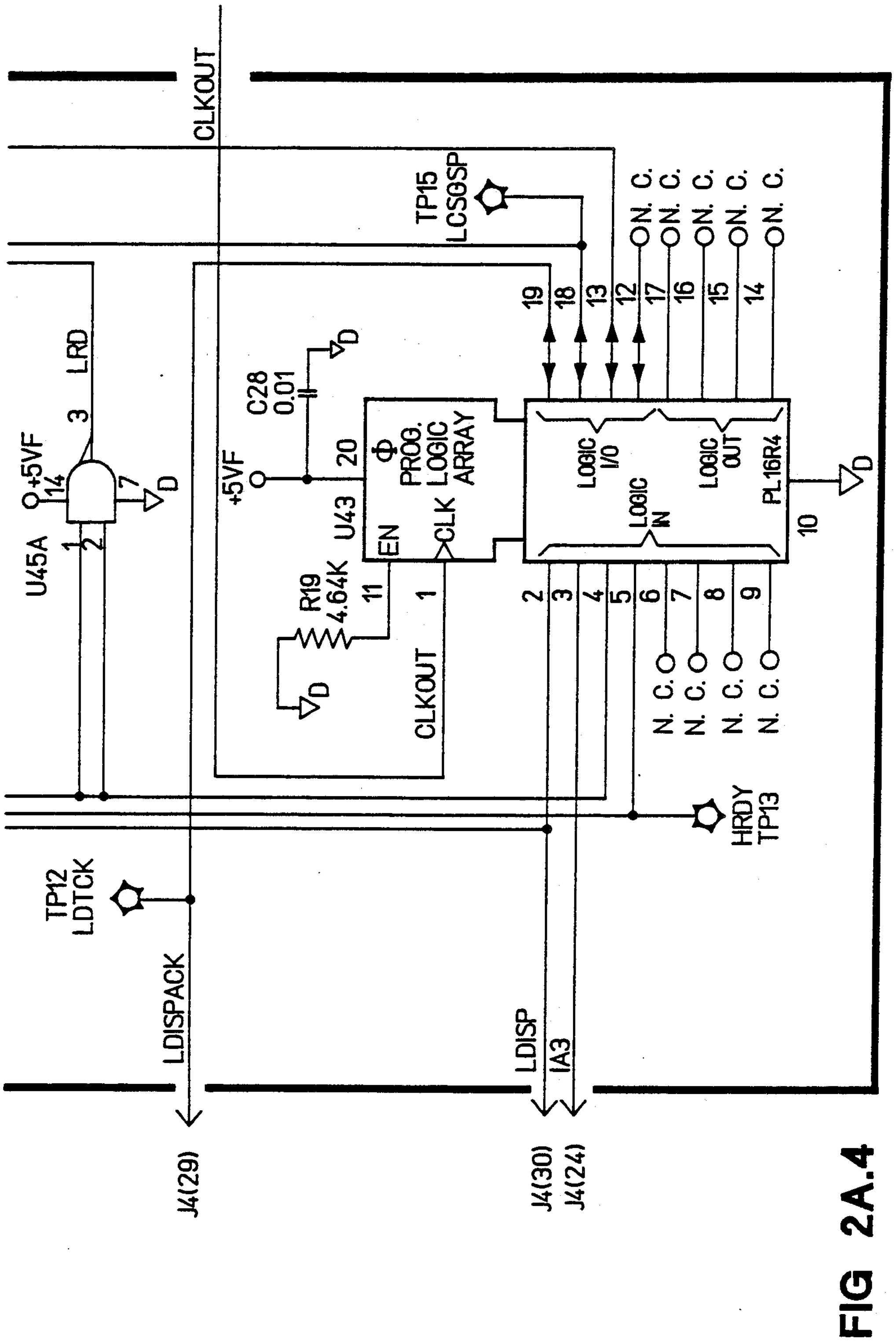
FIG 2A.4

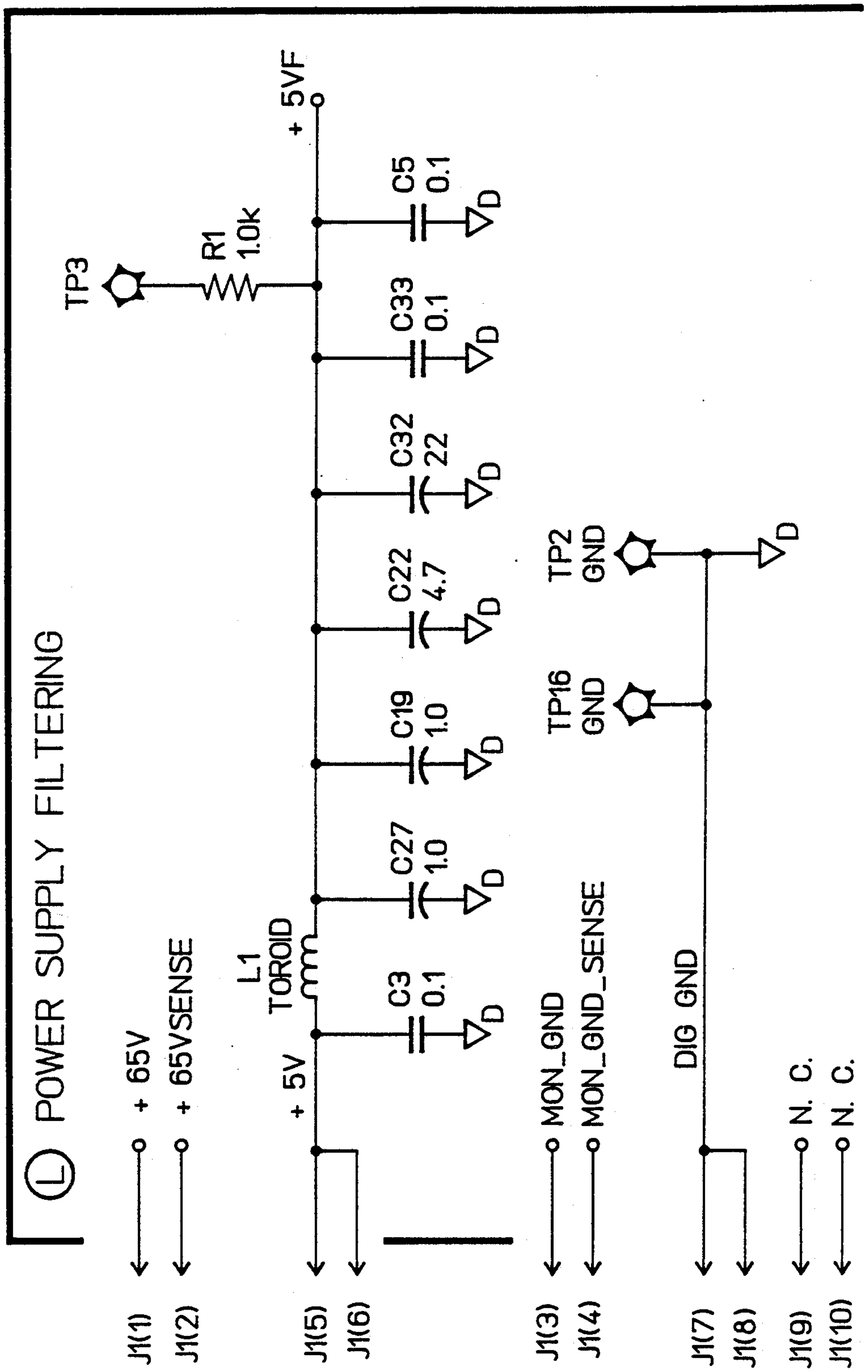
FIG 2A.5

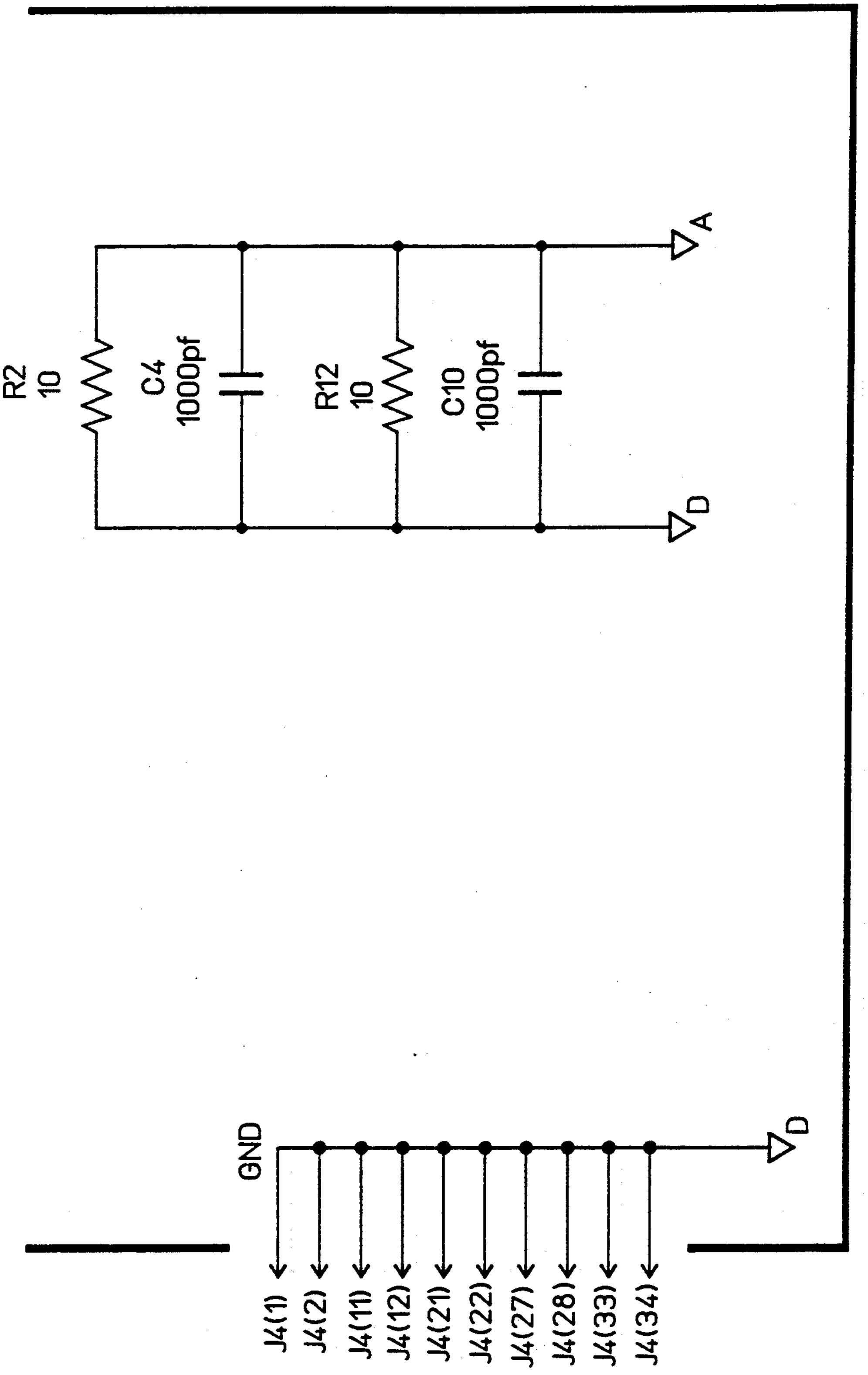
FIG 2A.6

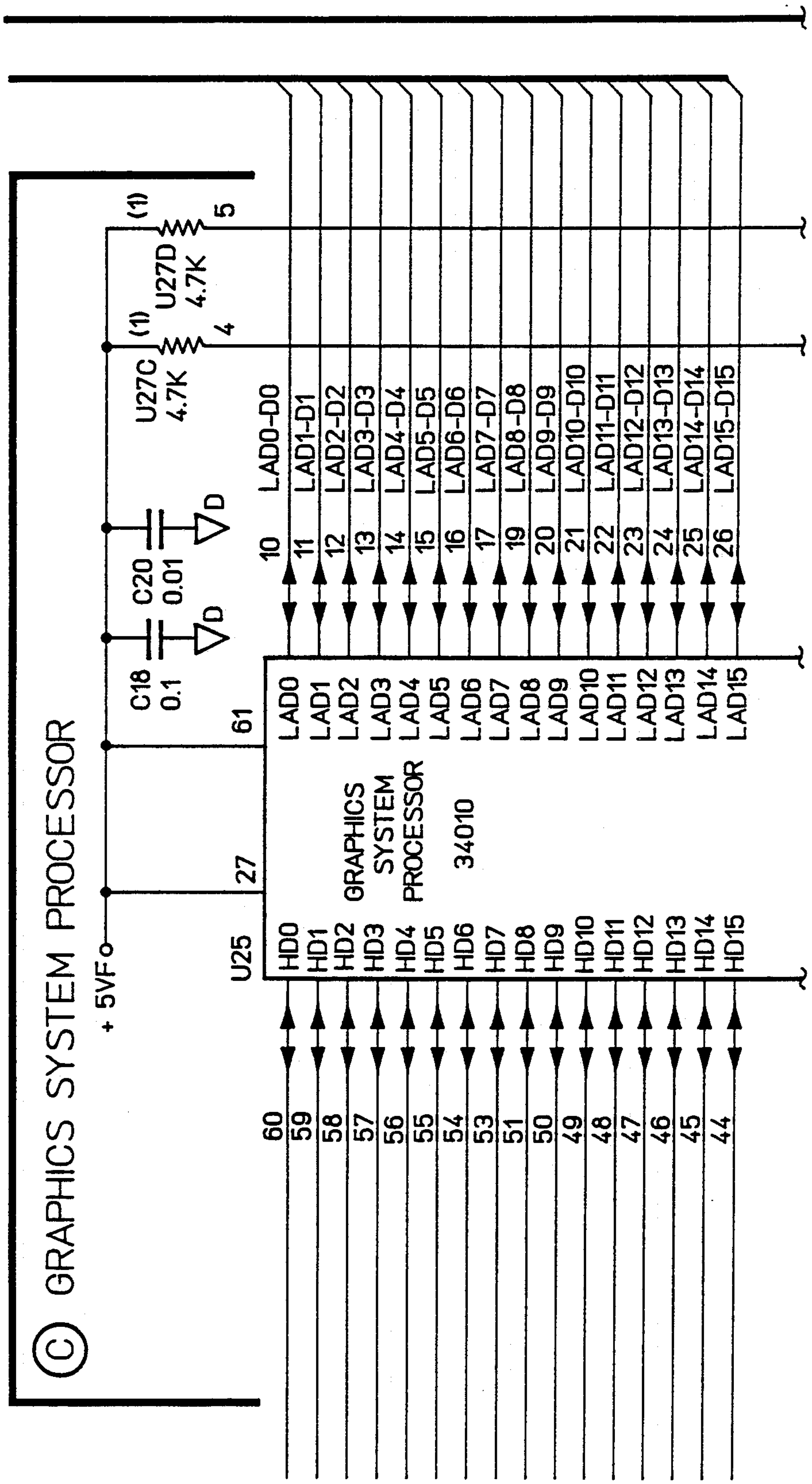
FIG 2A.71

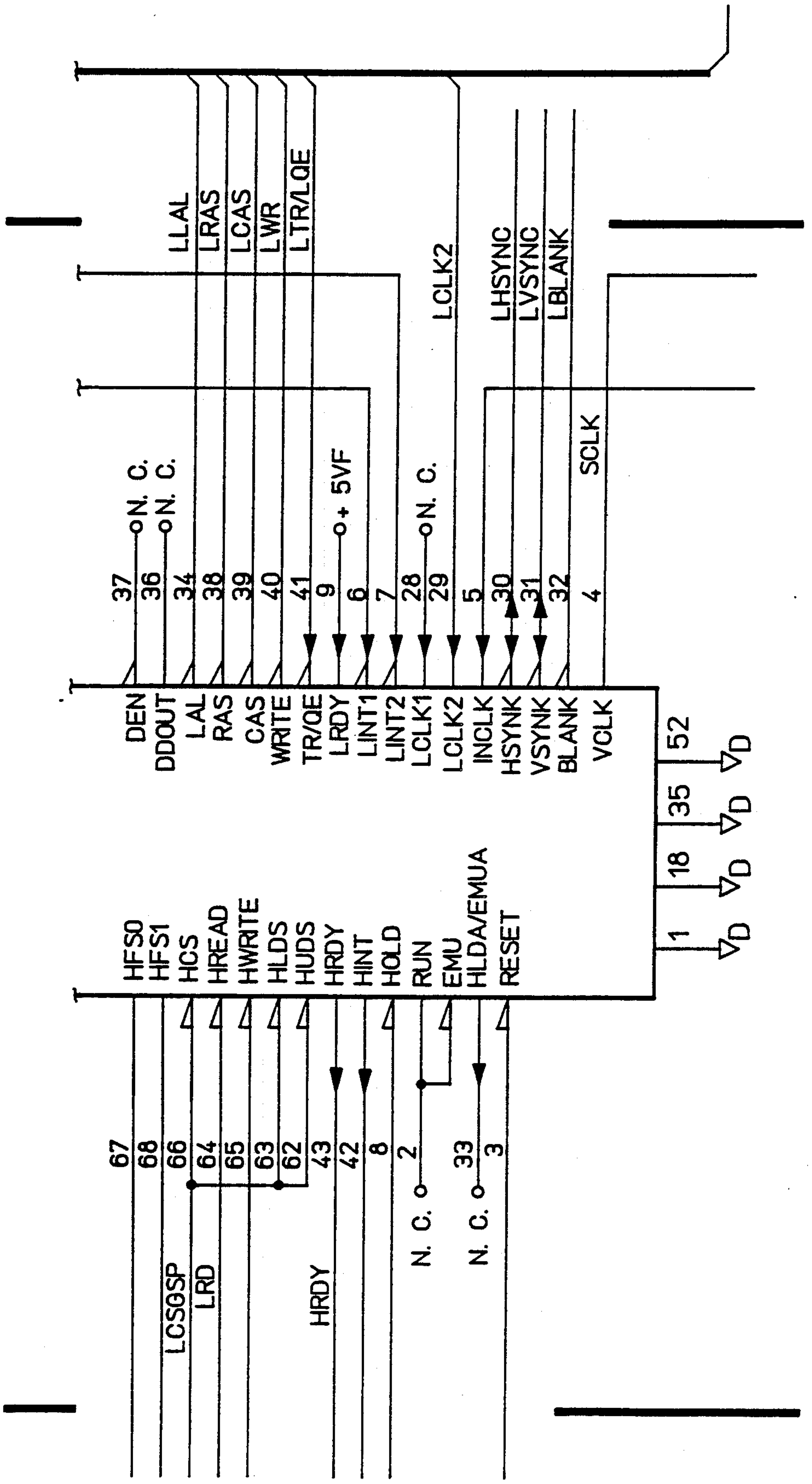
FIG 2A.72

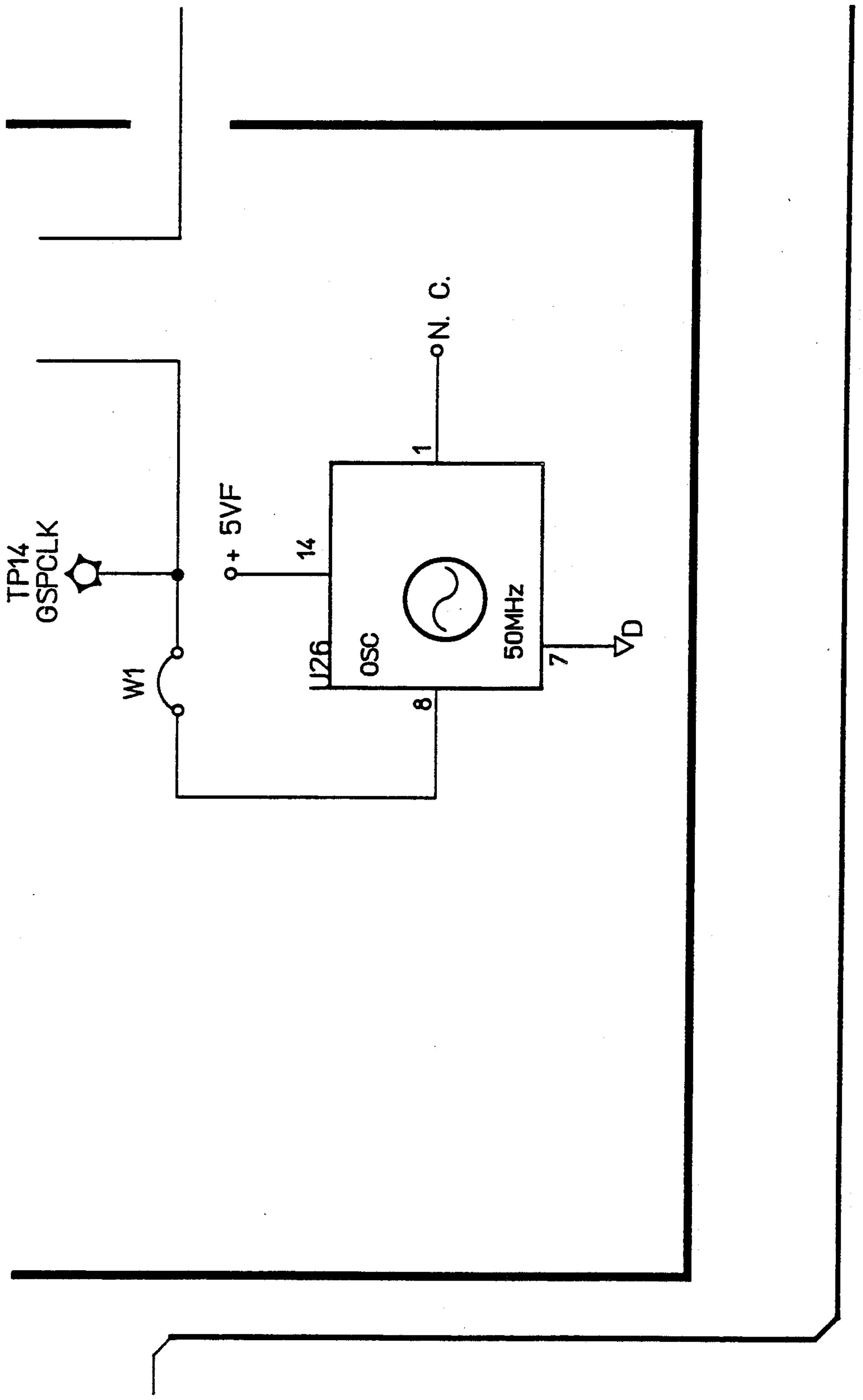
FIG 2A.8

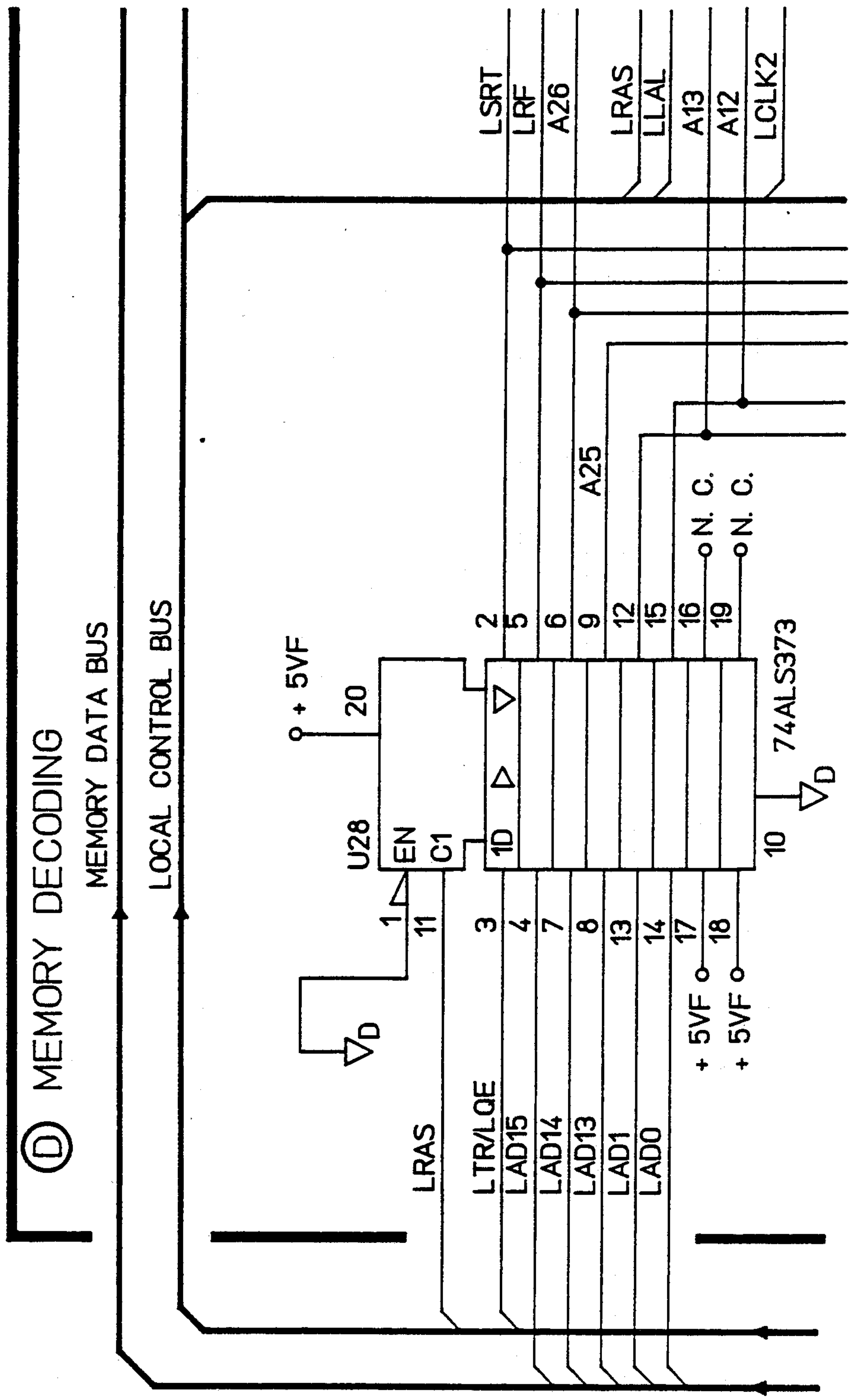
FIG 2A.9

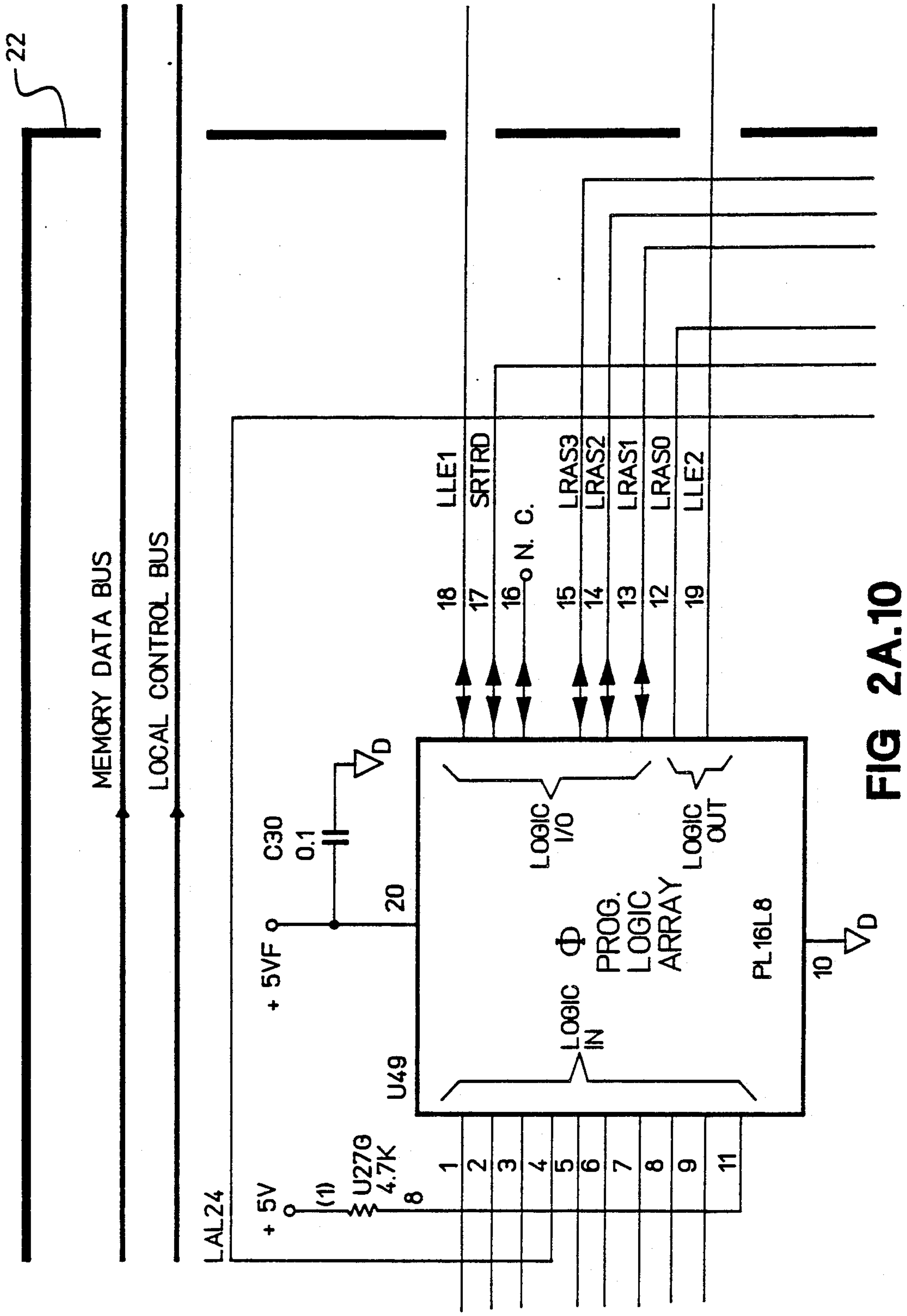
FIG 2A.10

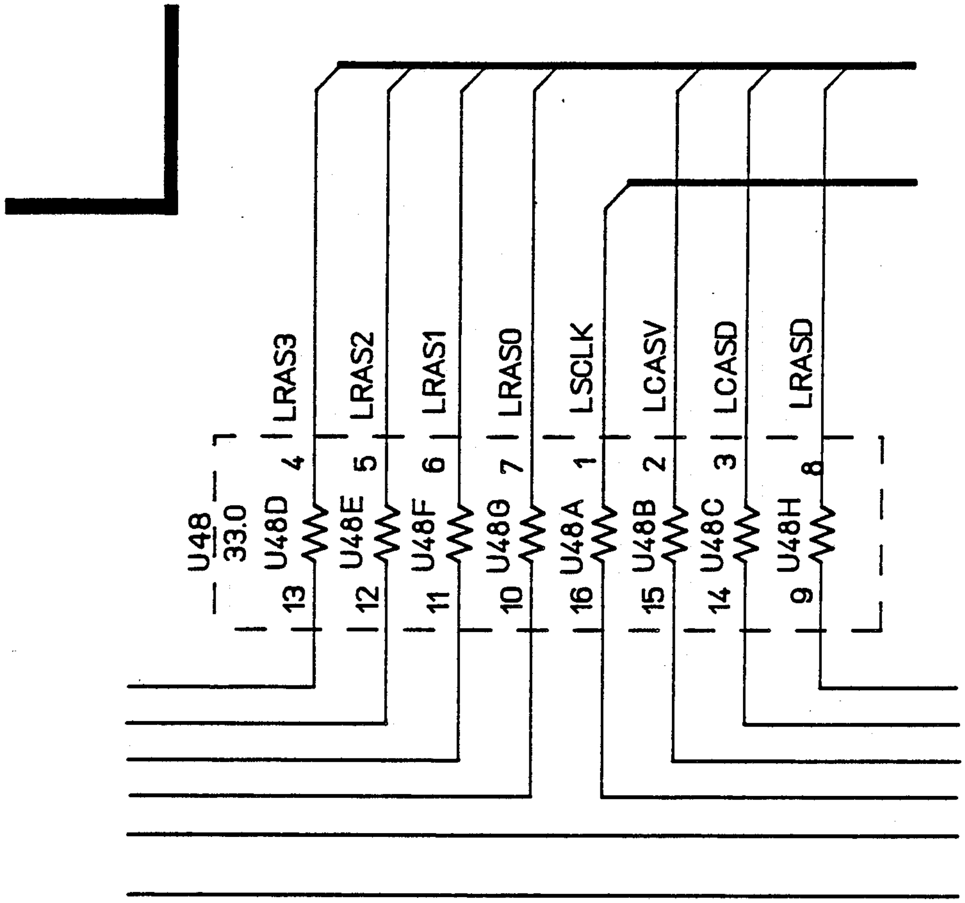
FIG 2A.11

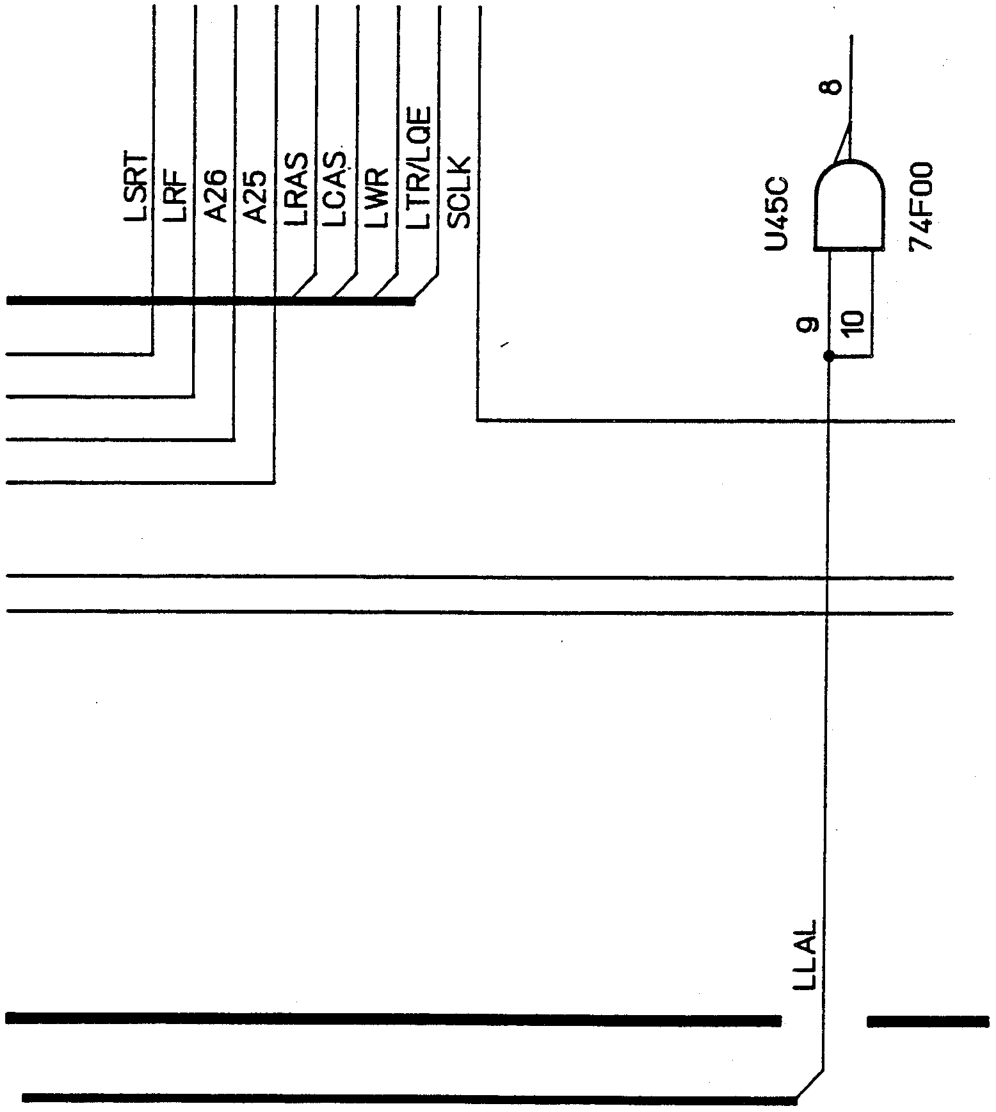
FIG 2A.12

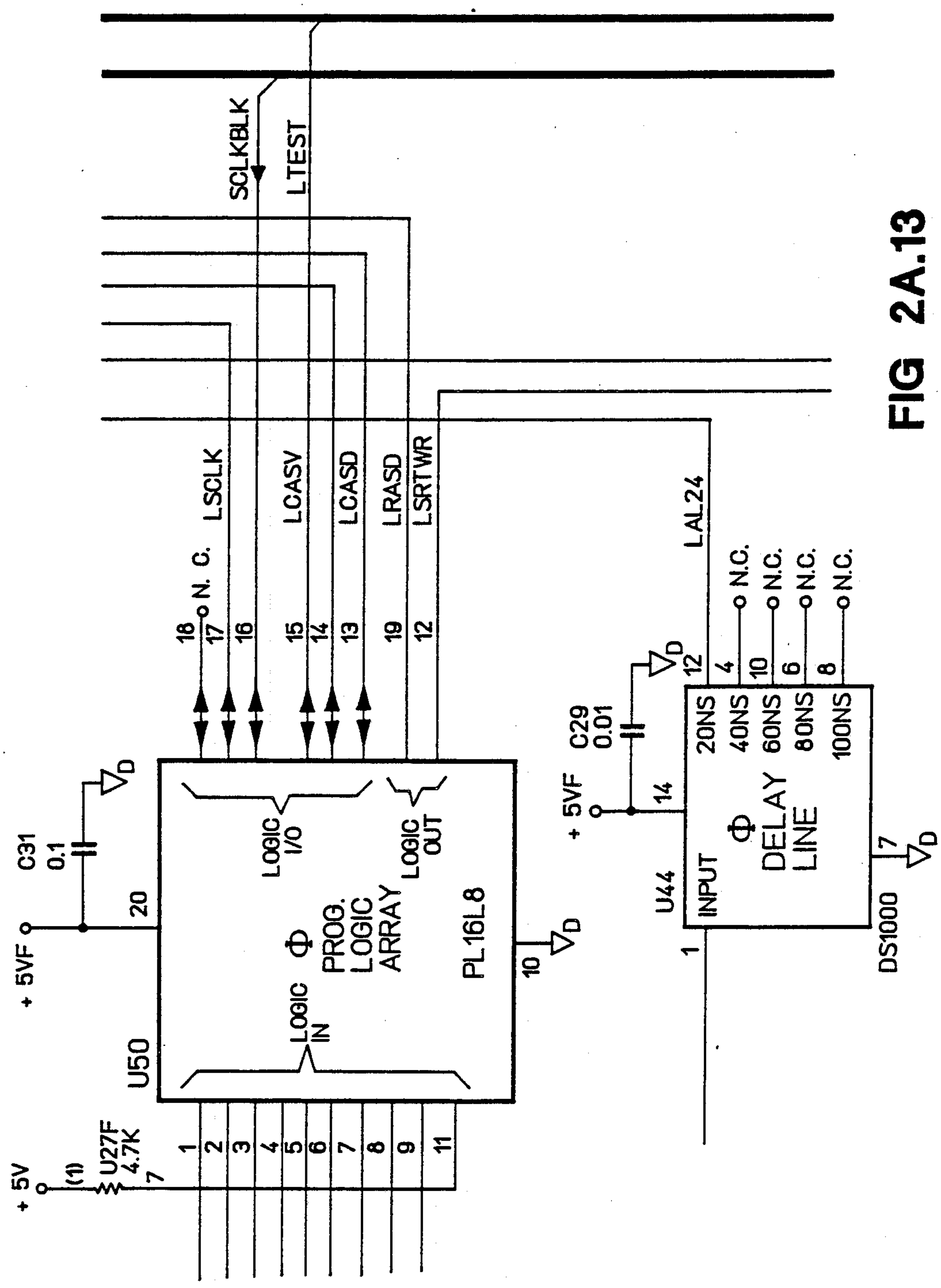
FIG 2A.13

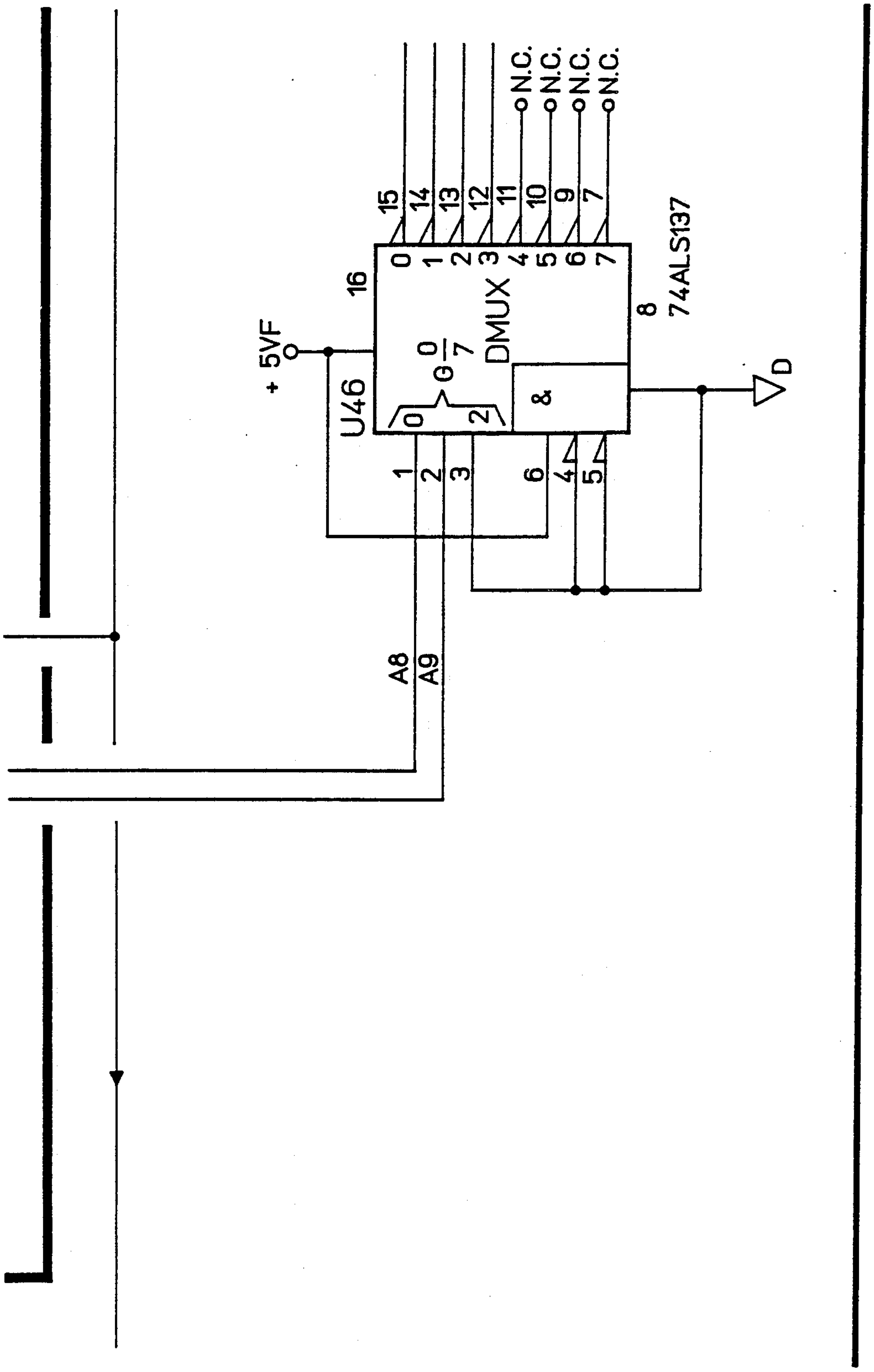
FIG 2A.14

FIG 2A.15
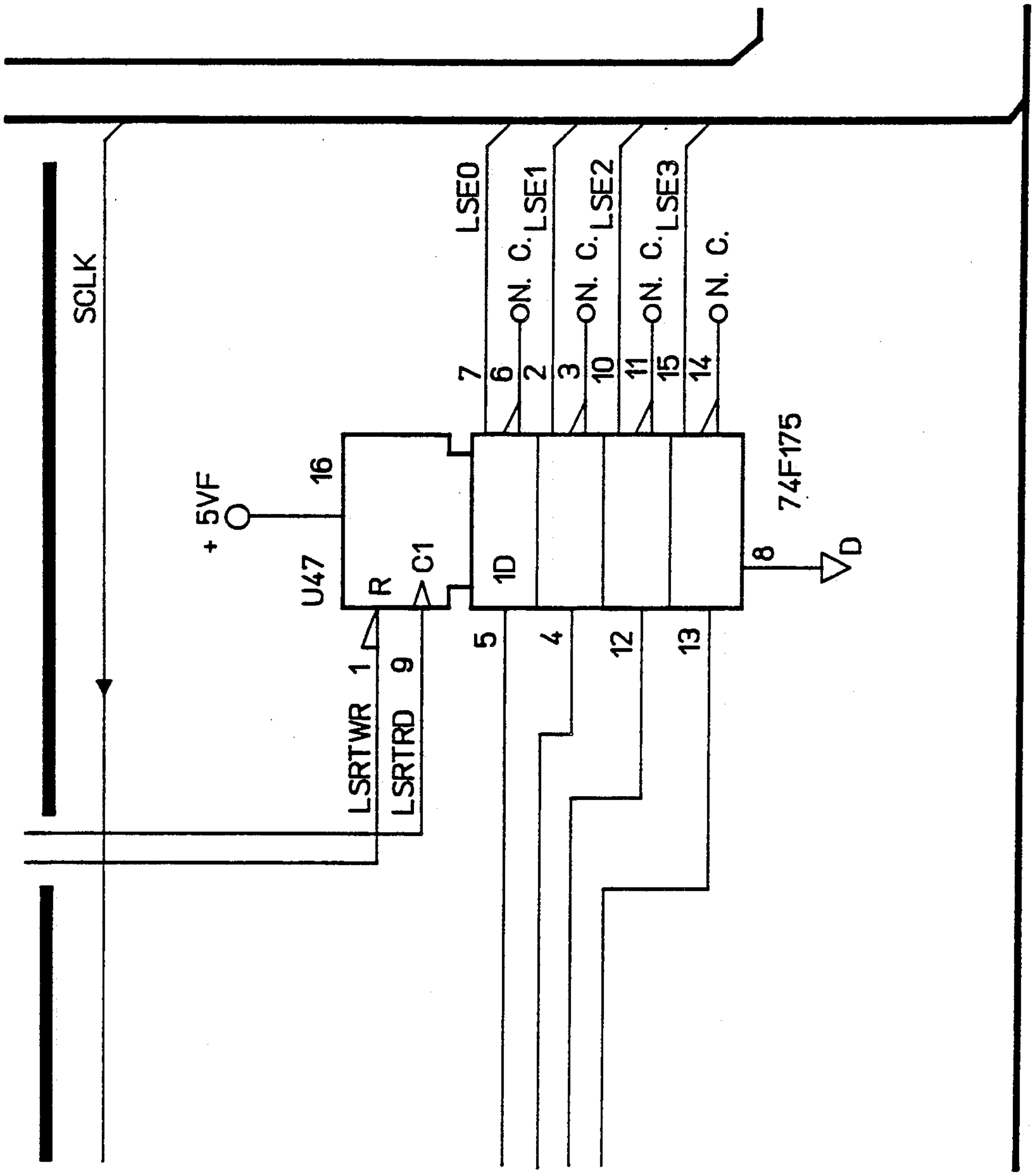

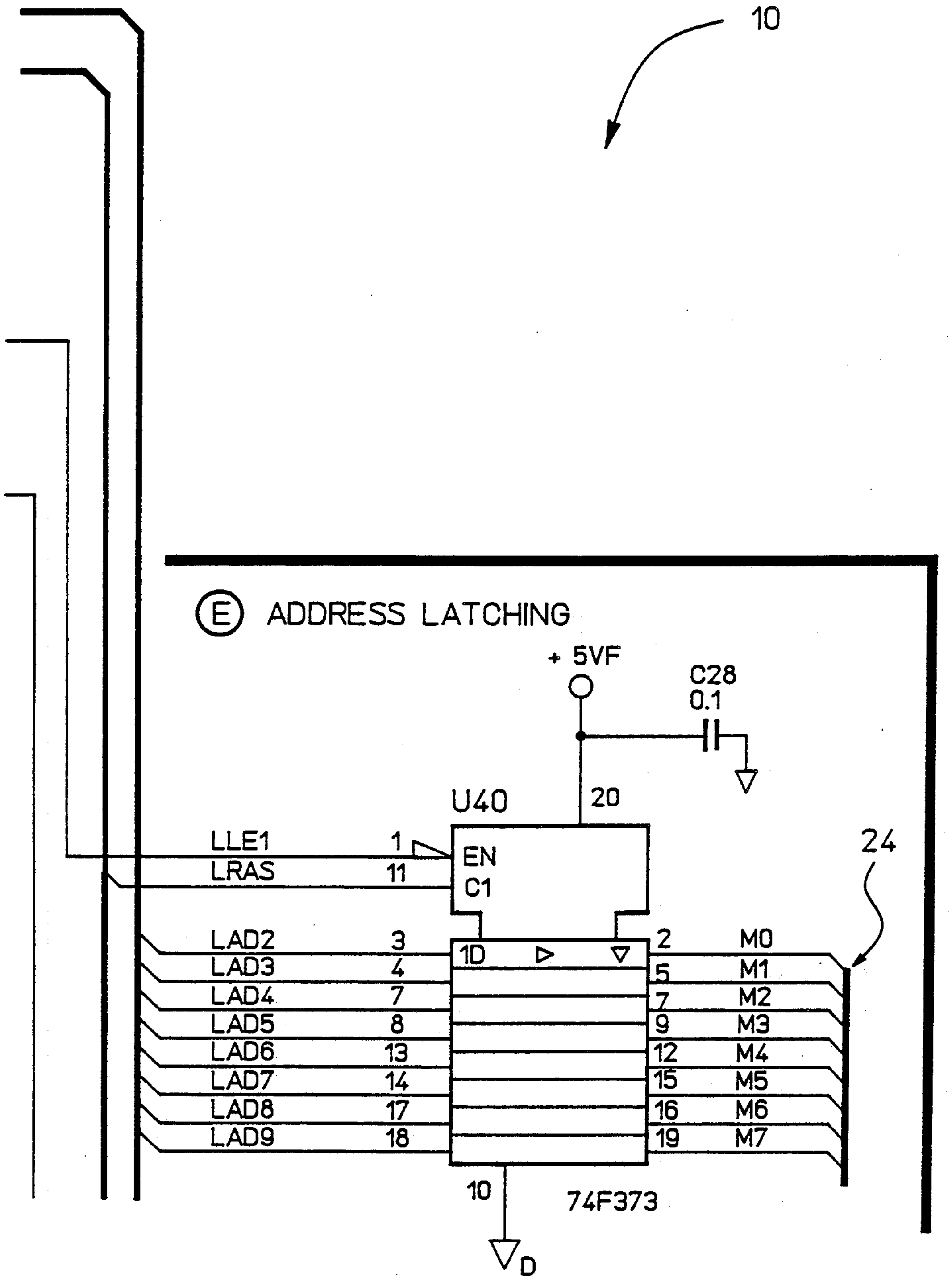
FIG 2A.16

FIG 2A.17
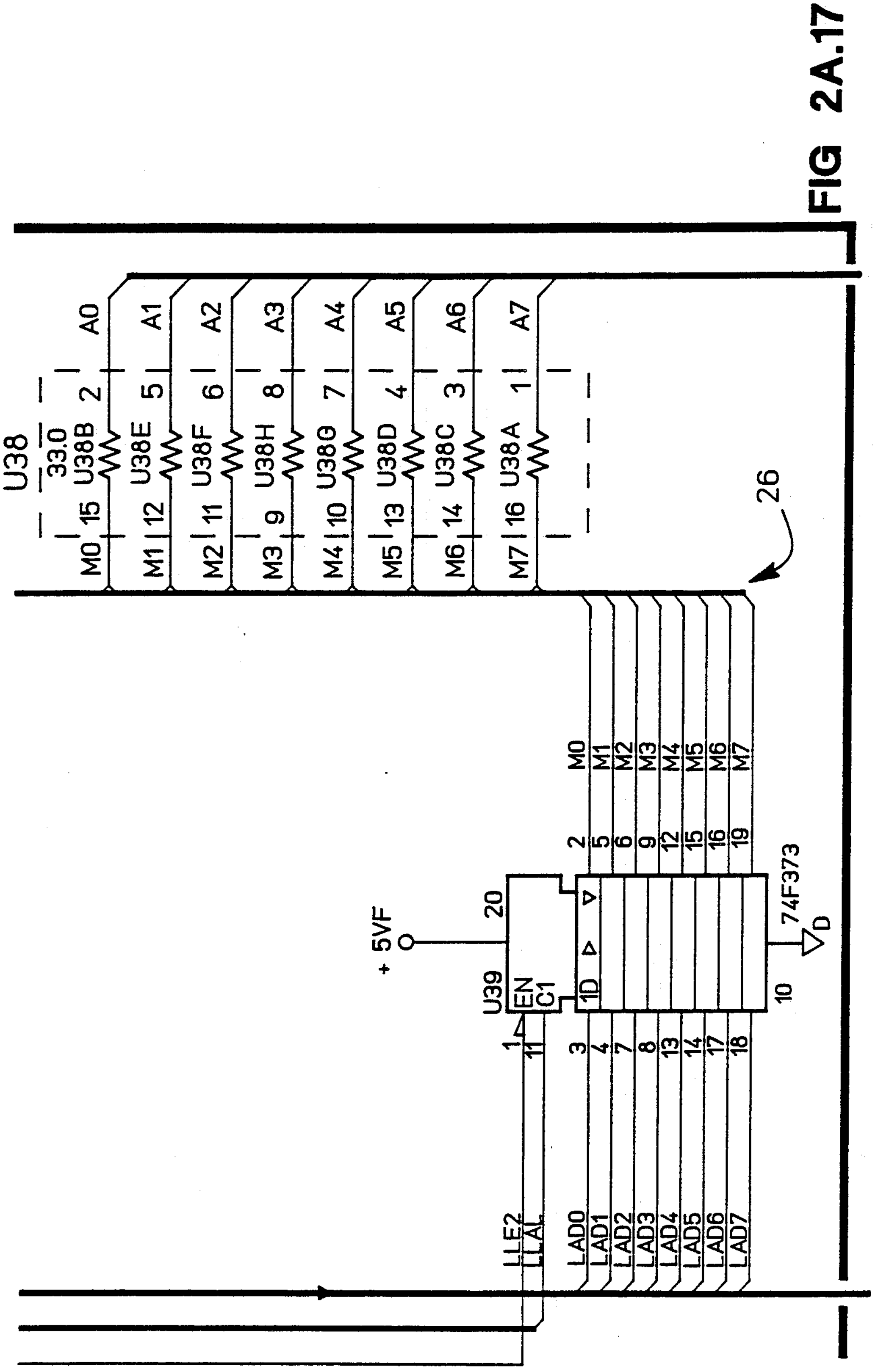

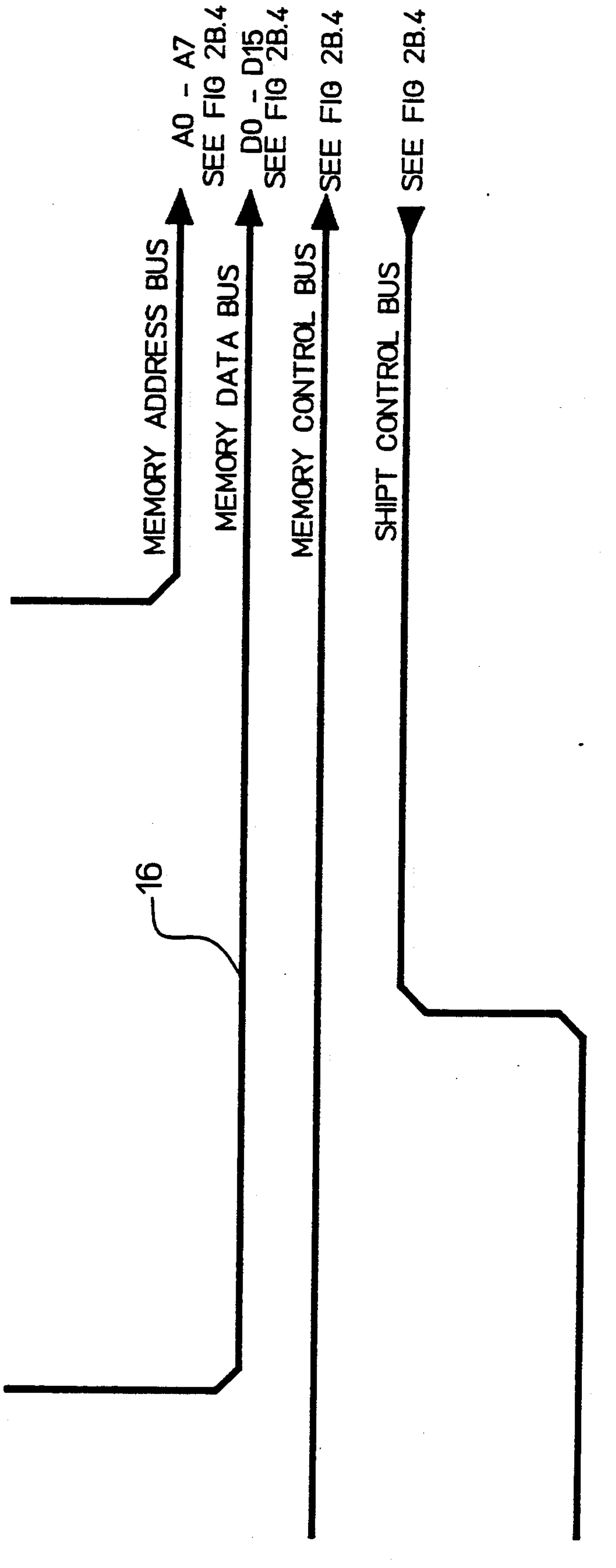
FIG 2A.18

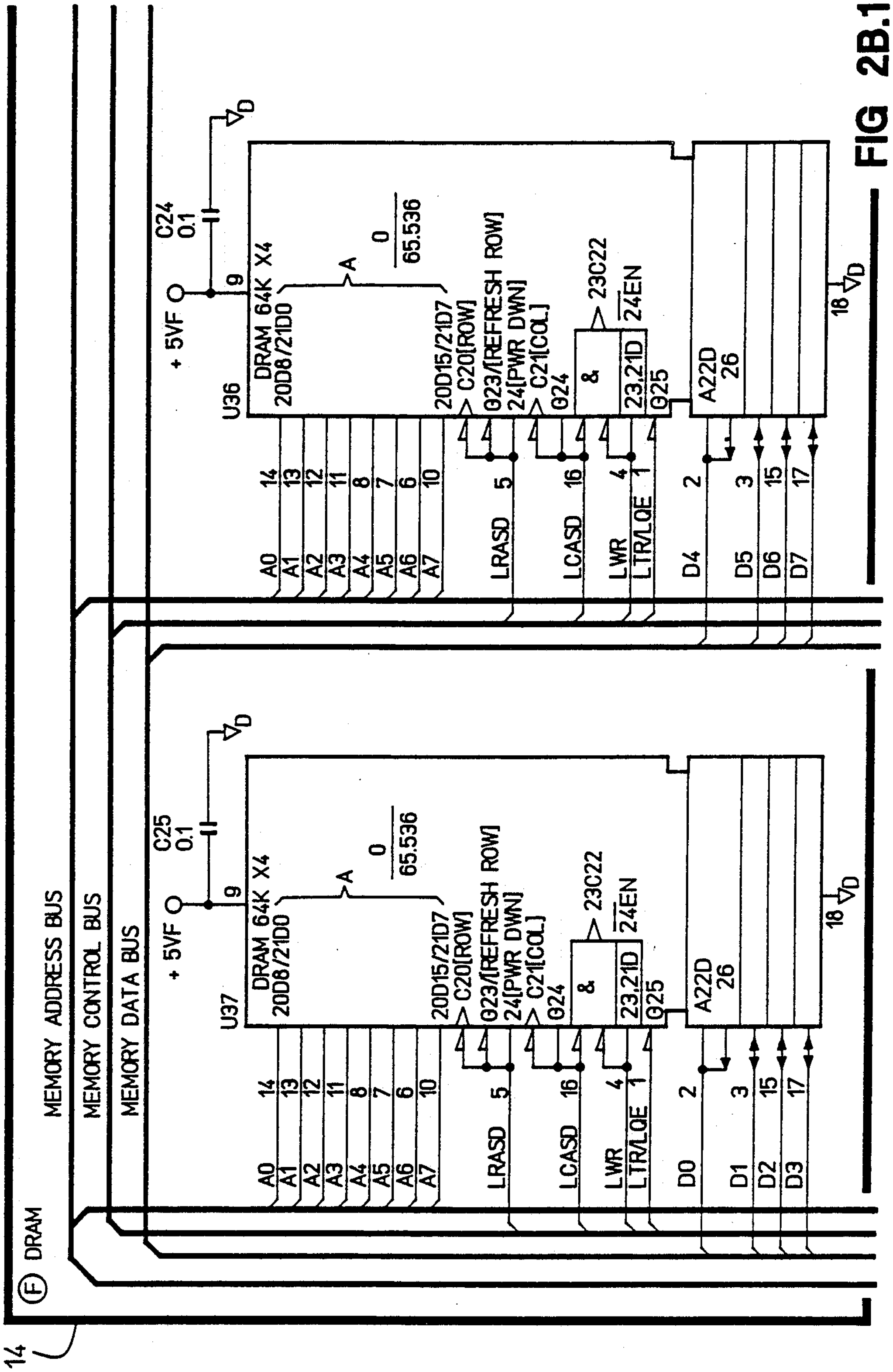
FIG 2B.1

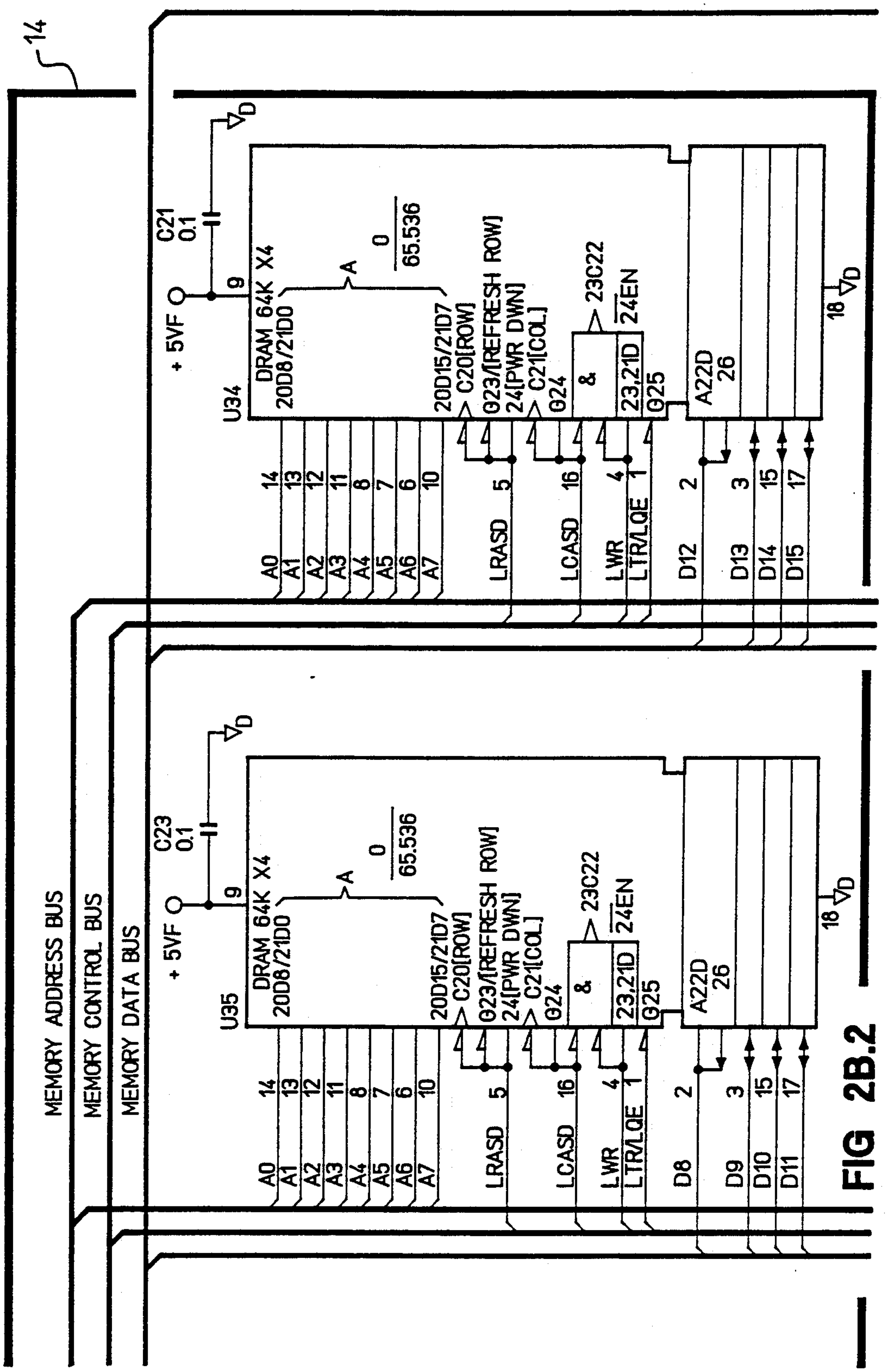
FIG 2B.2

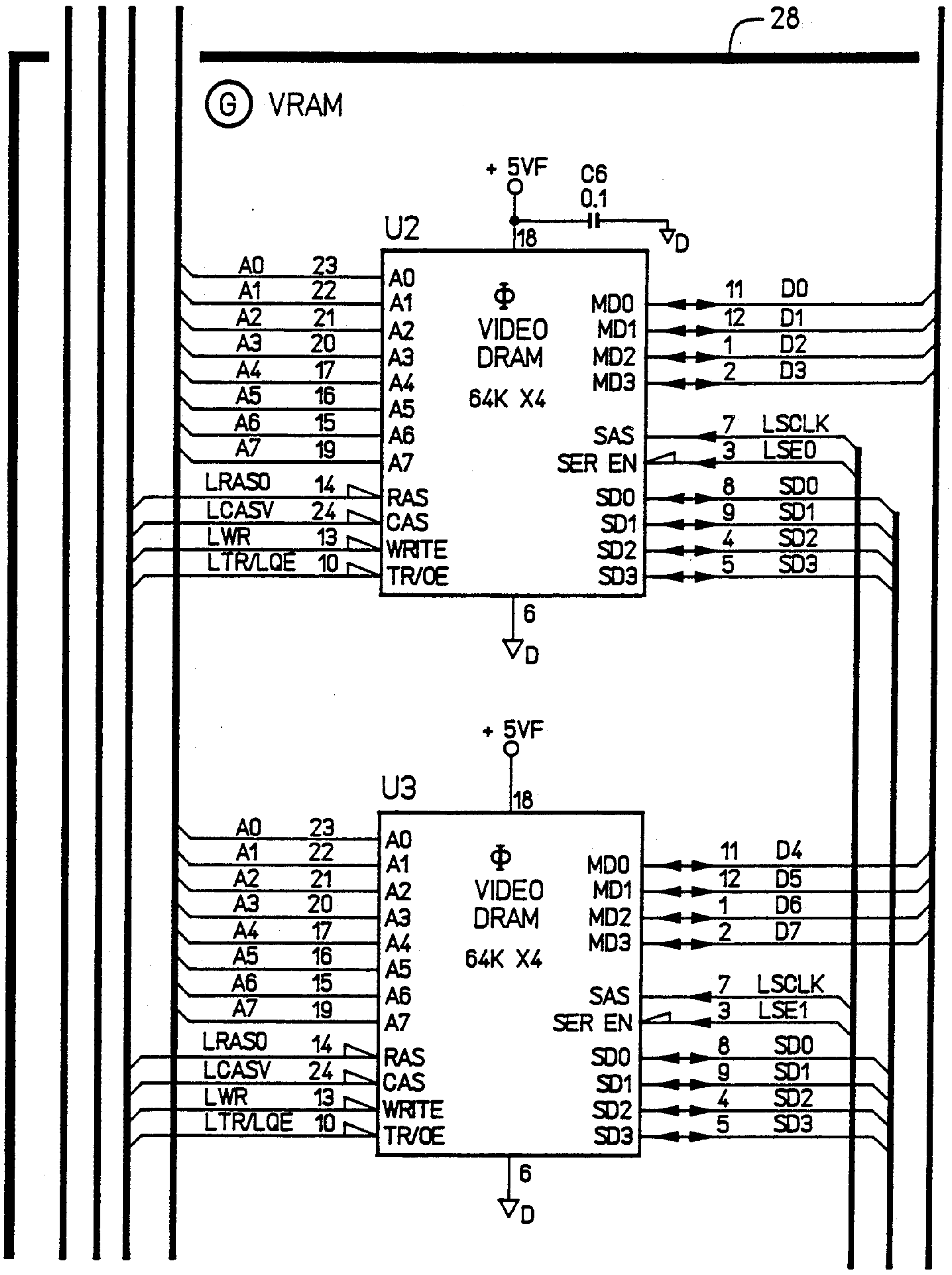
FIG 2B.3

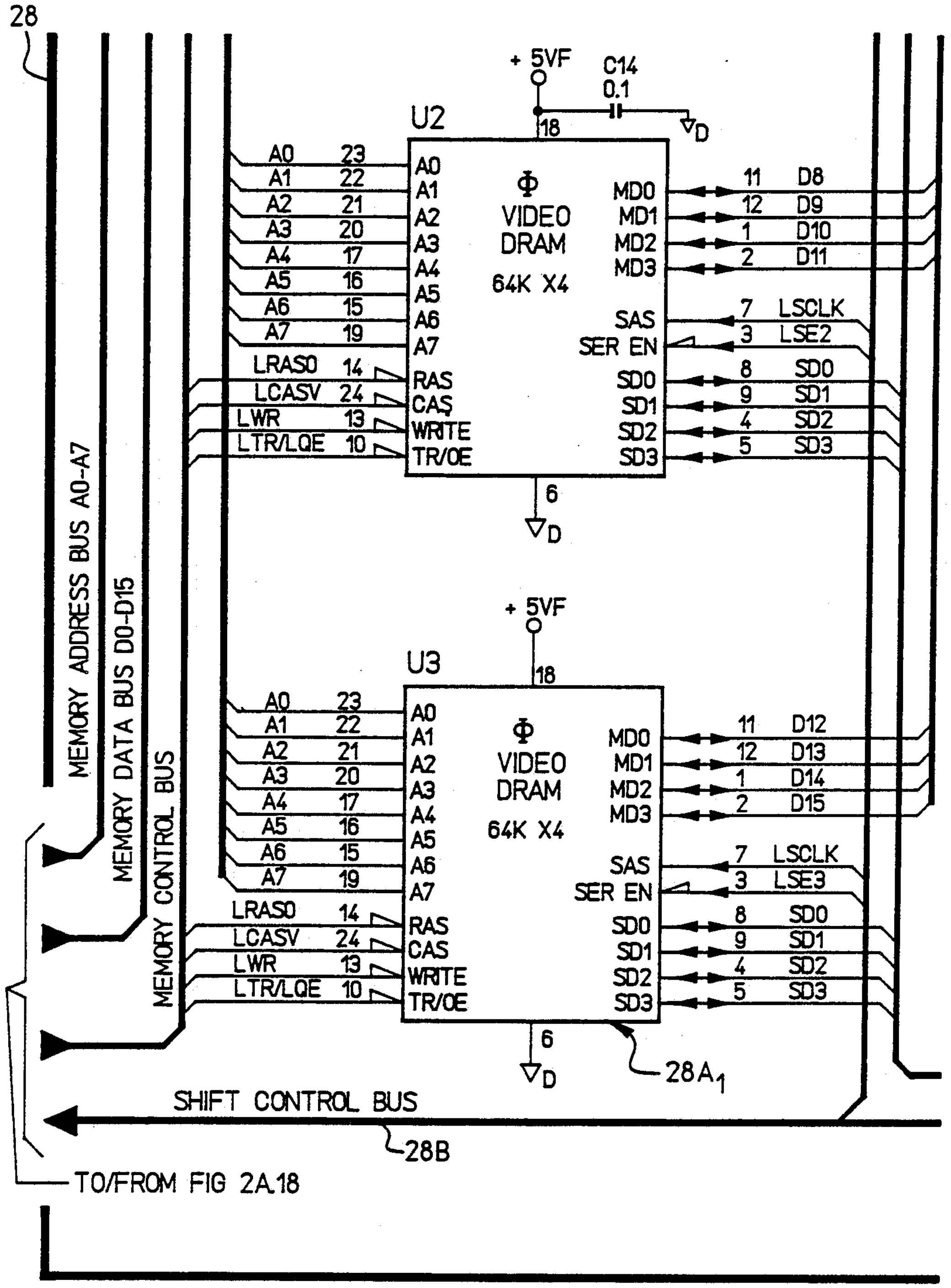
FIG 2B.4

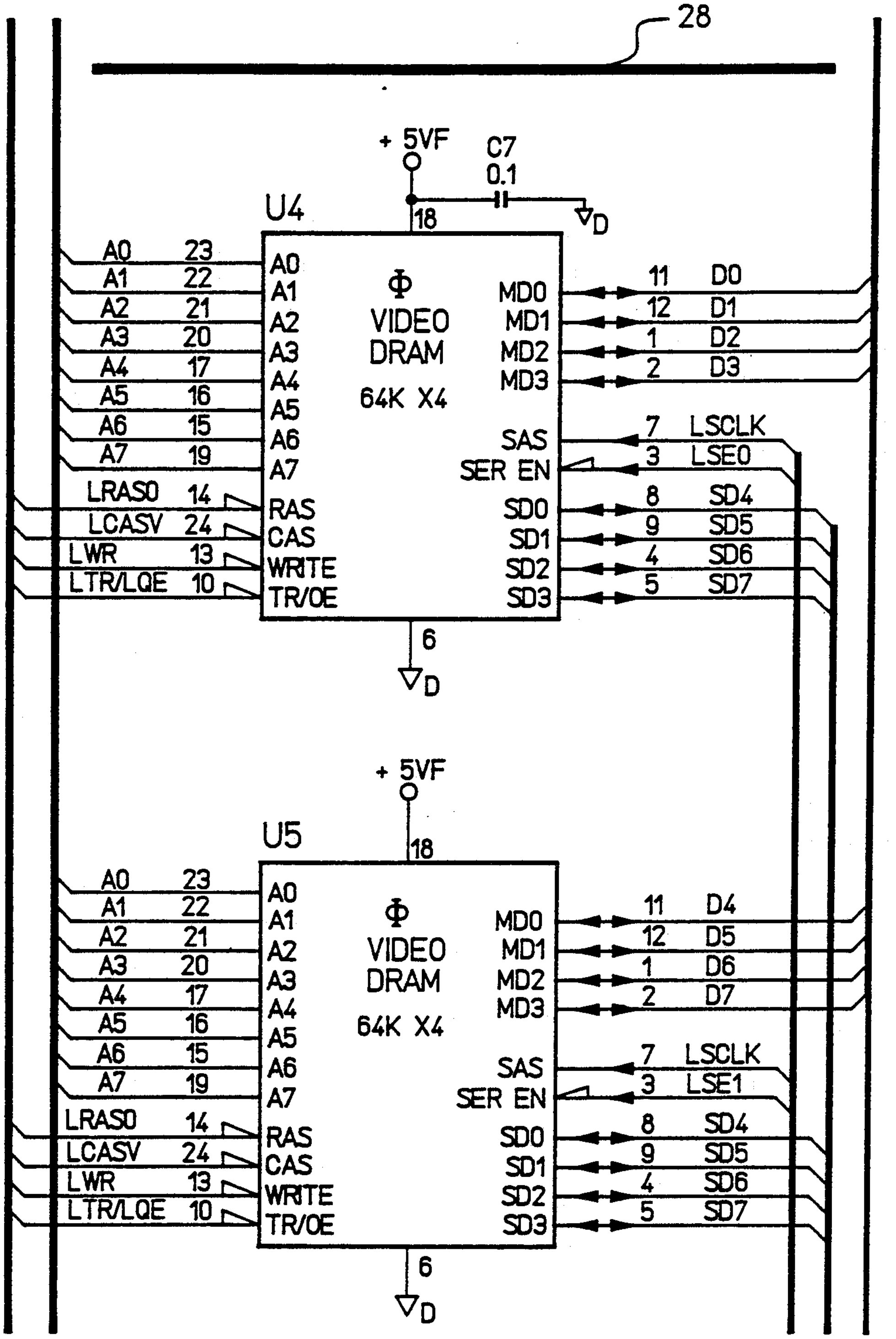
FIG 2B.5

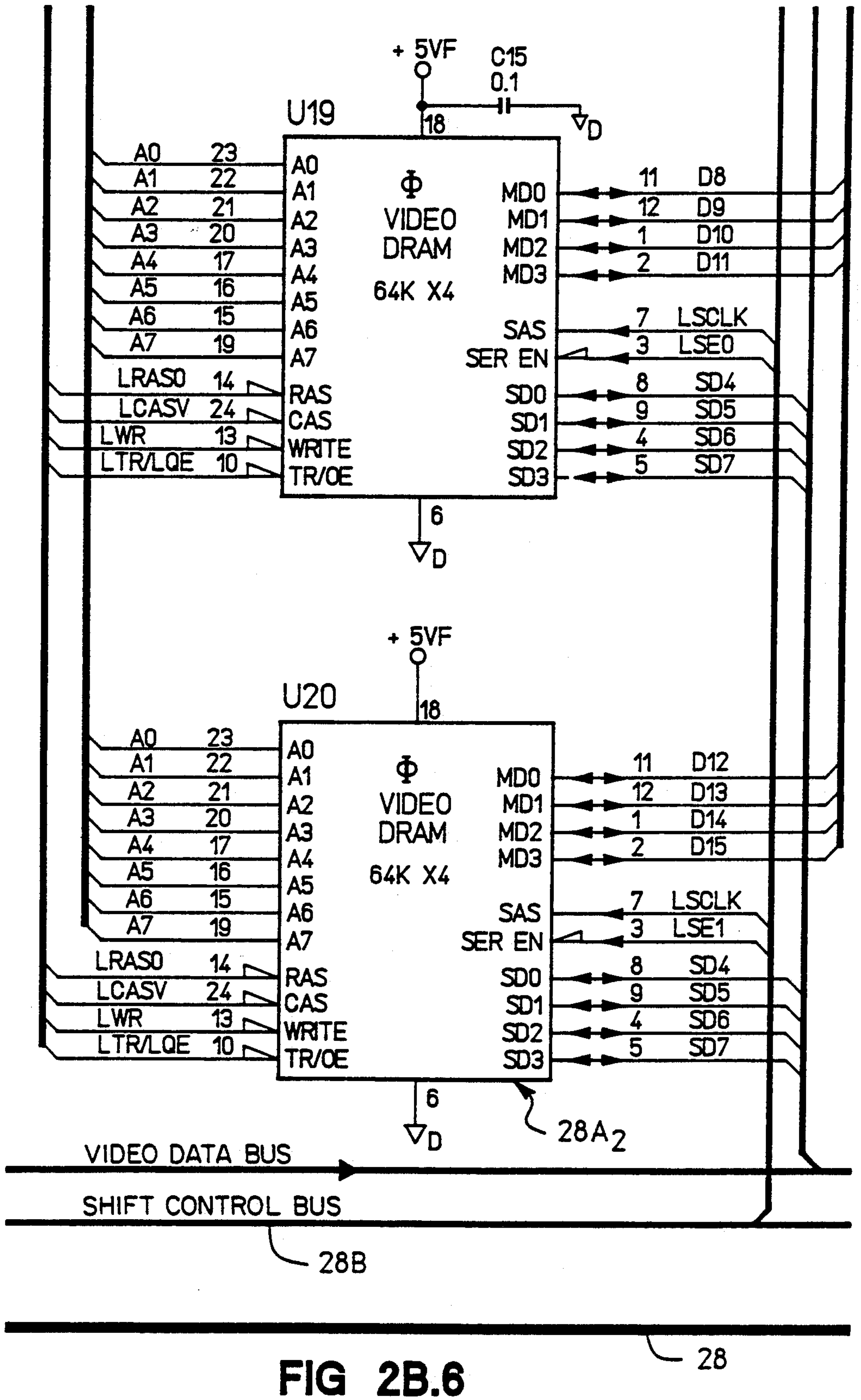
FIG 2B.6

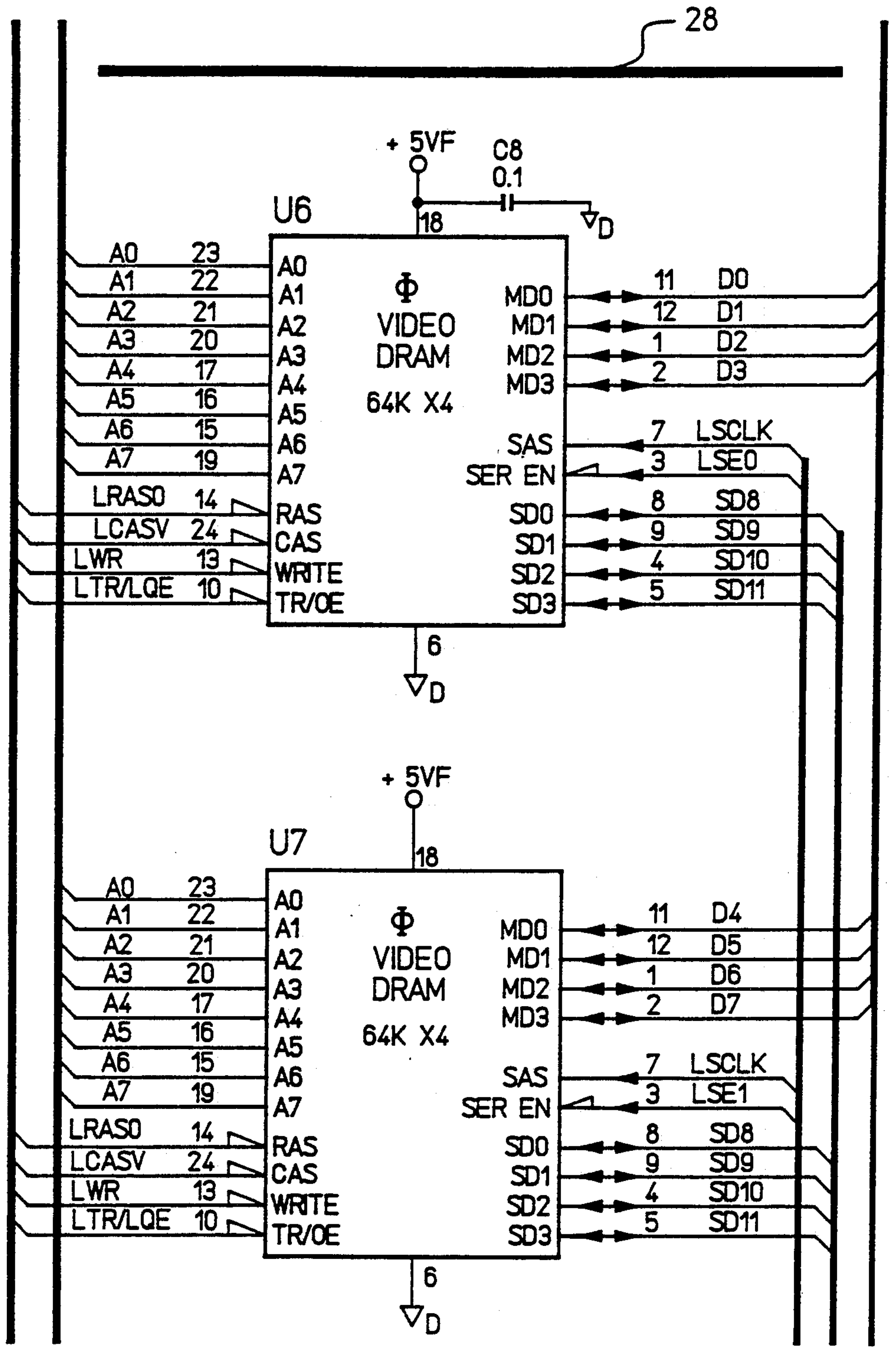
FIG 2B.7

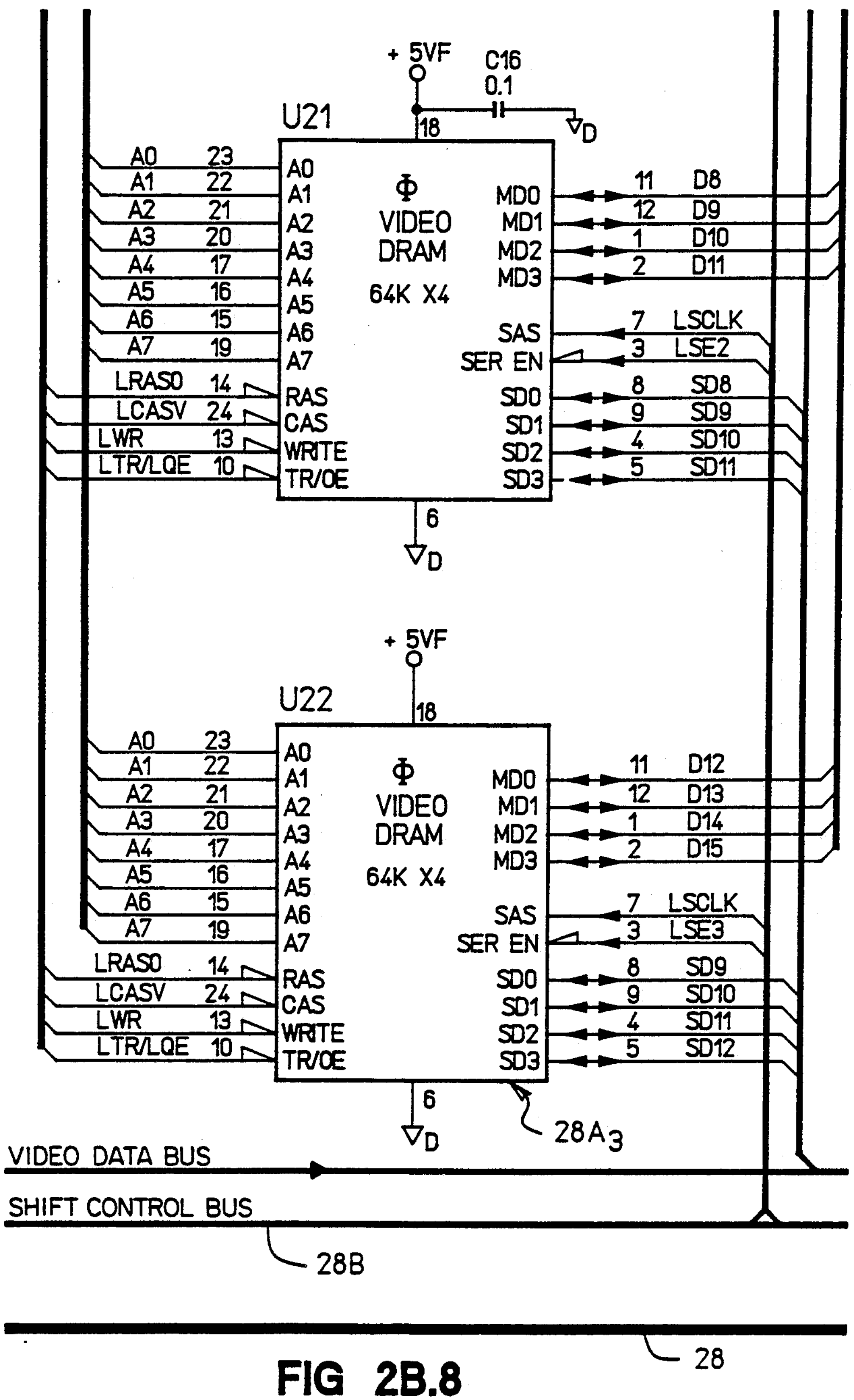
FIG 2B.8

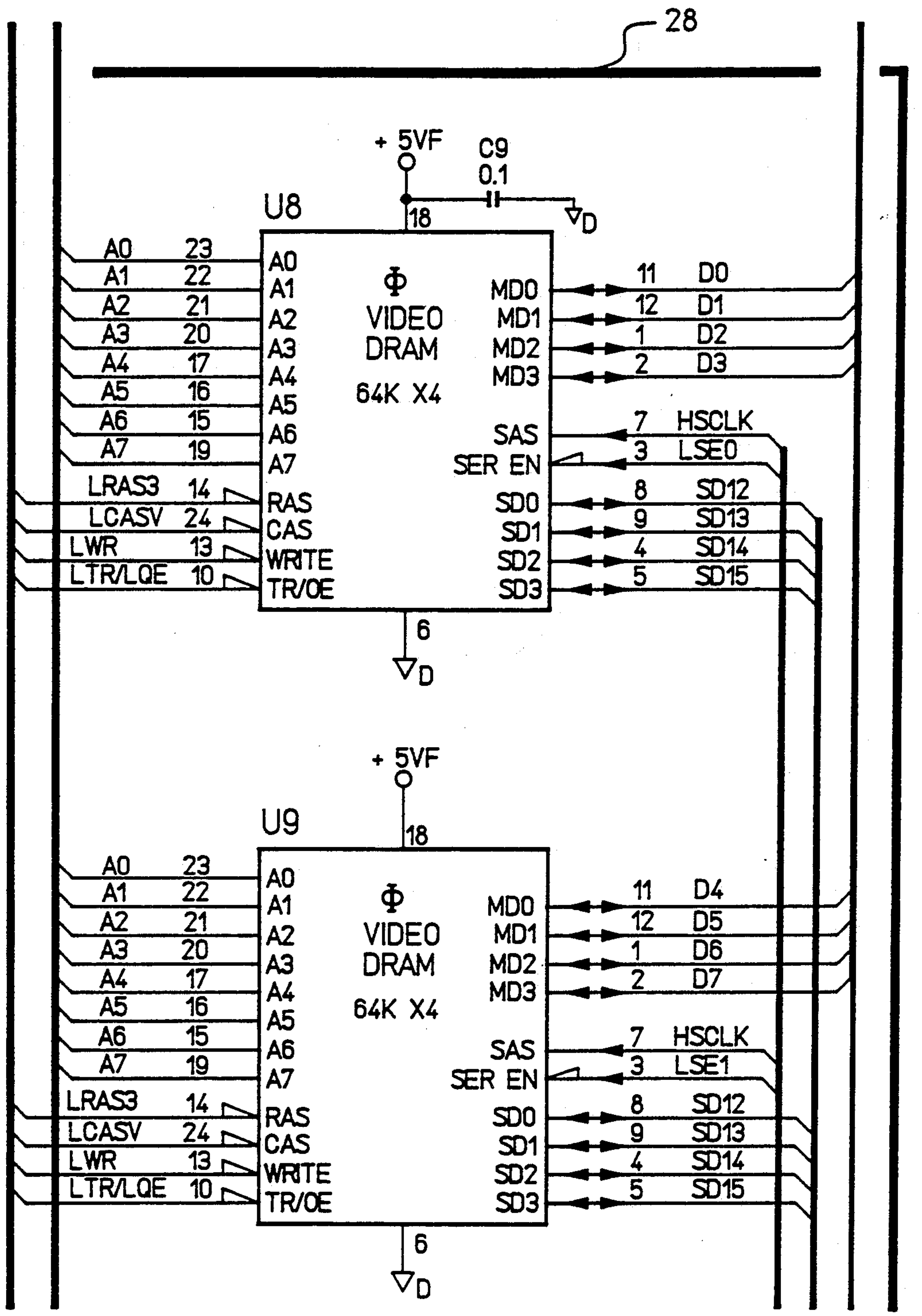
FIG 2B.9

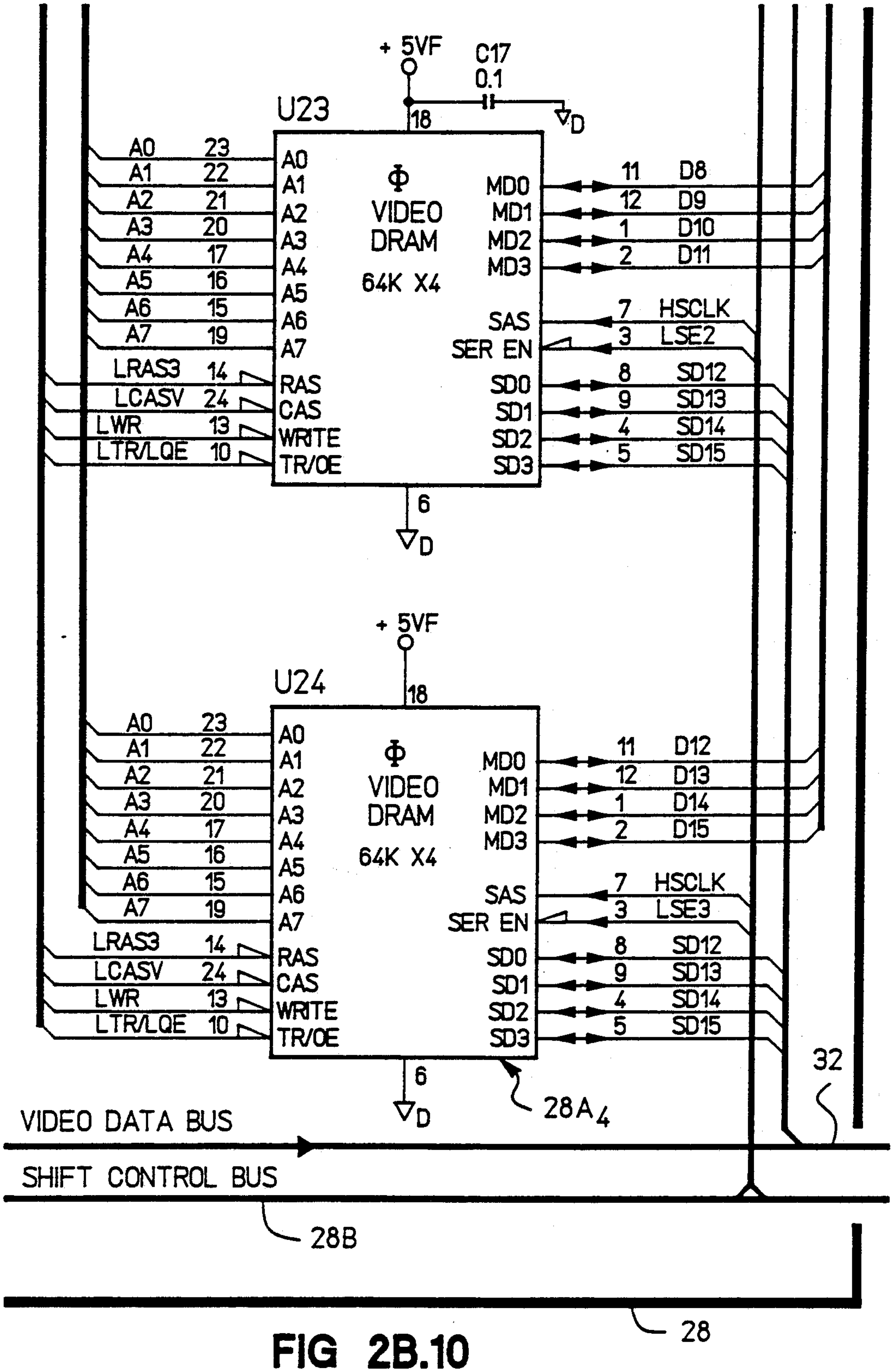
FIG 2B.10

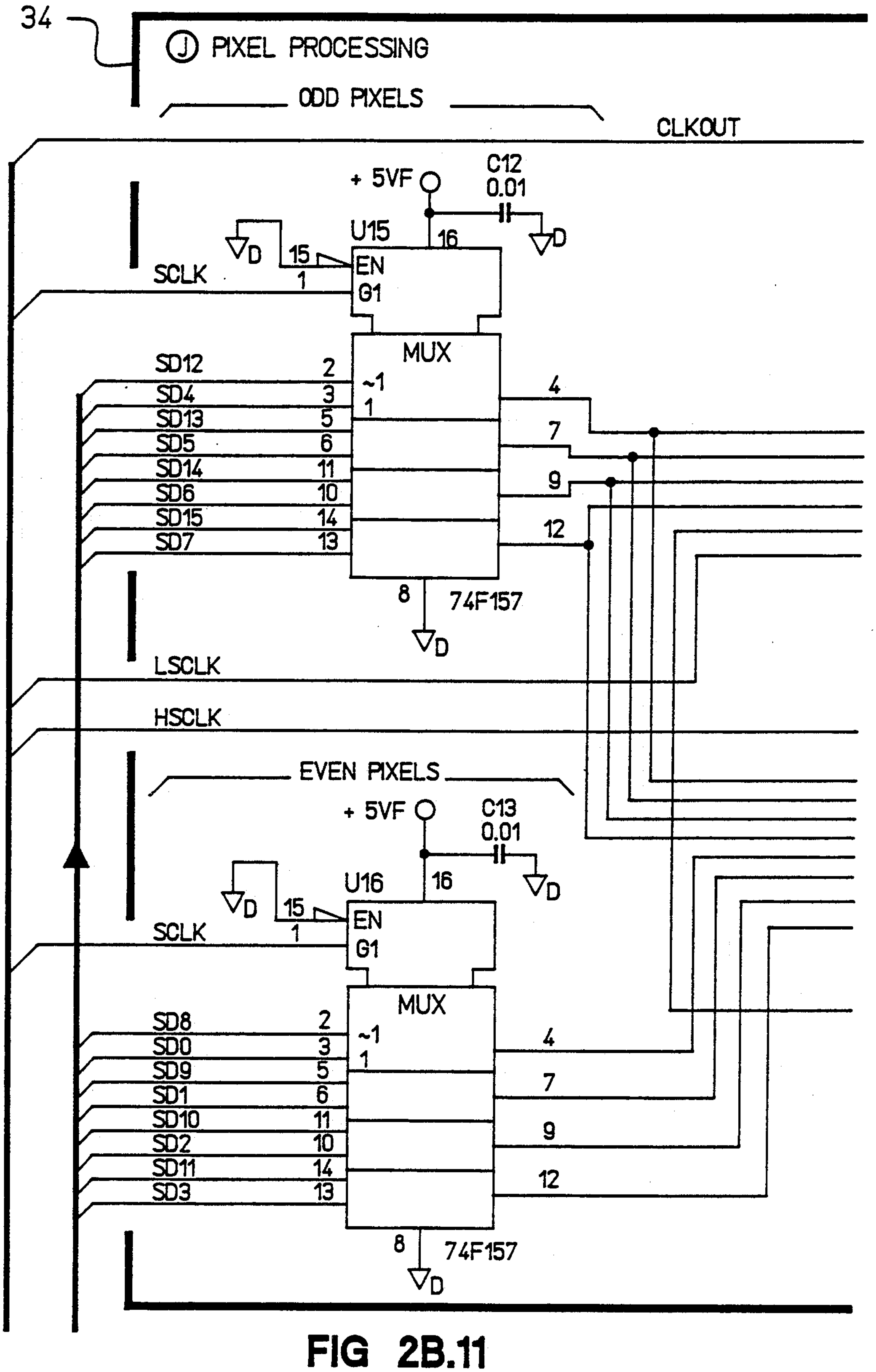
FIG 2B.11

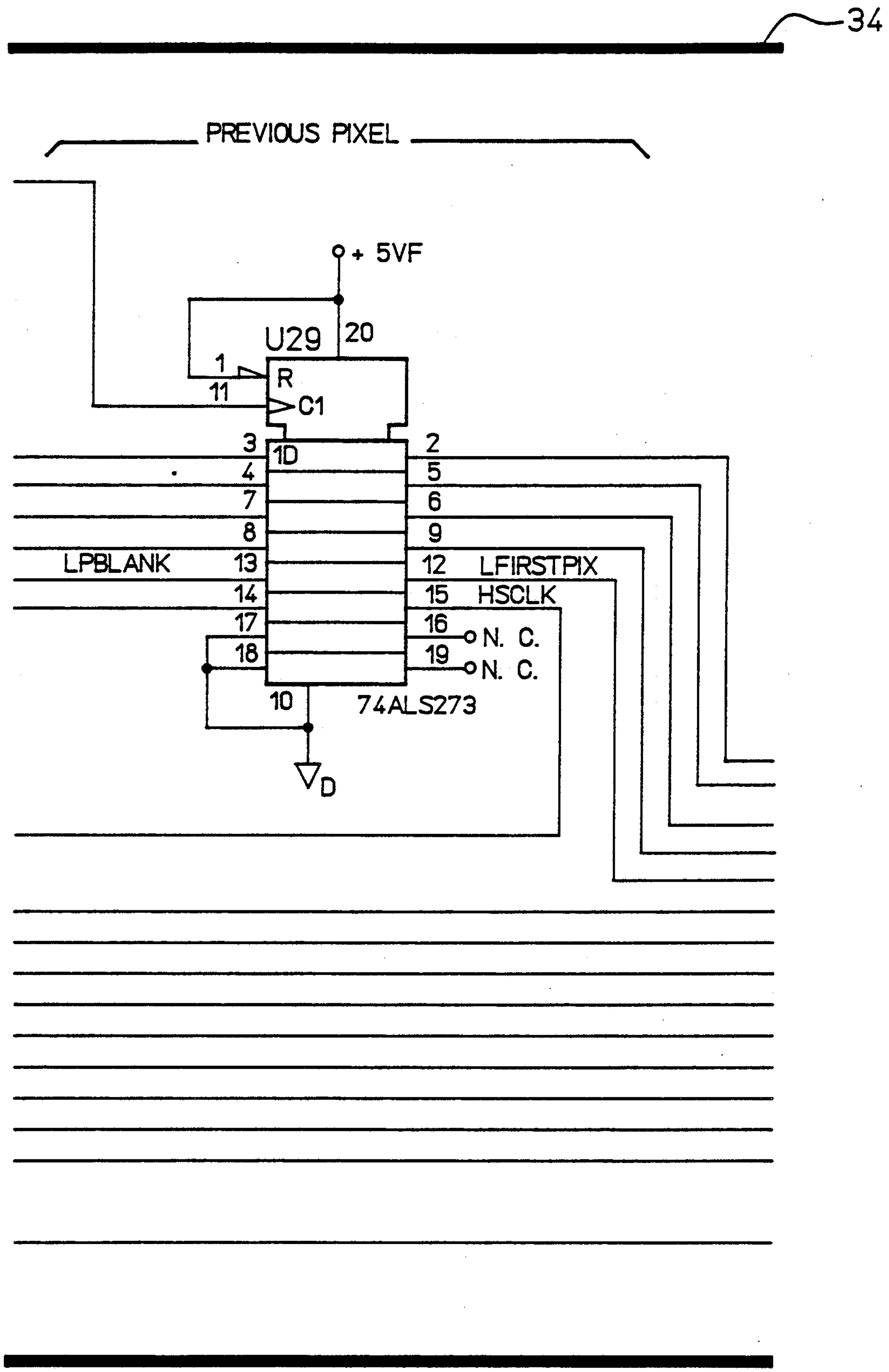
FIG 2B.12

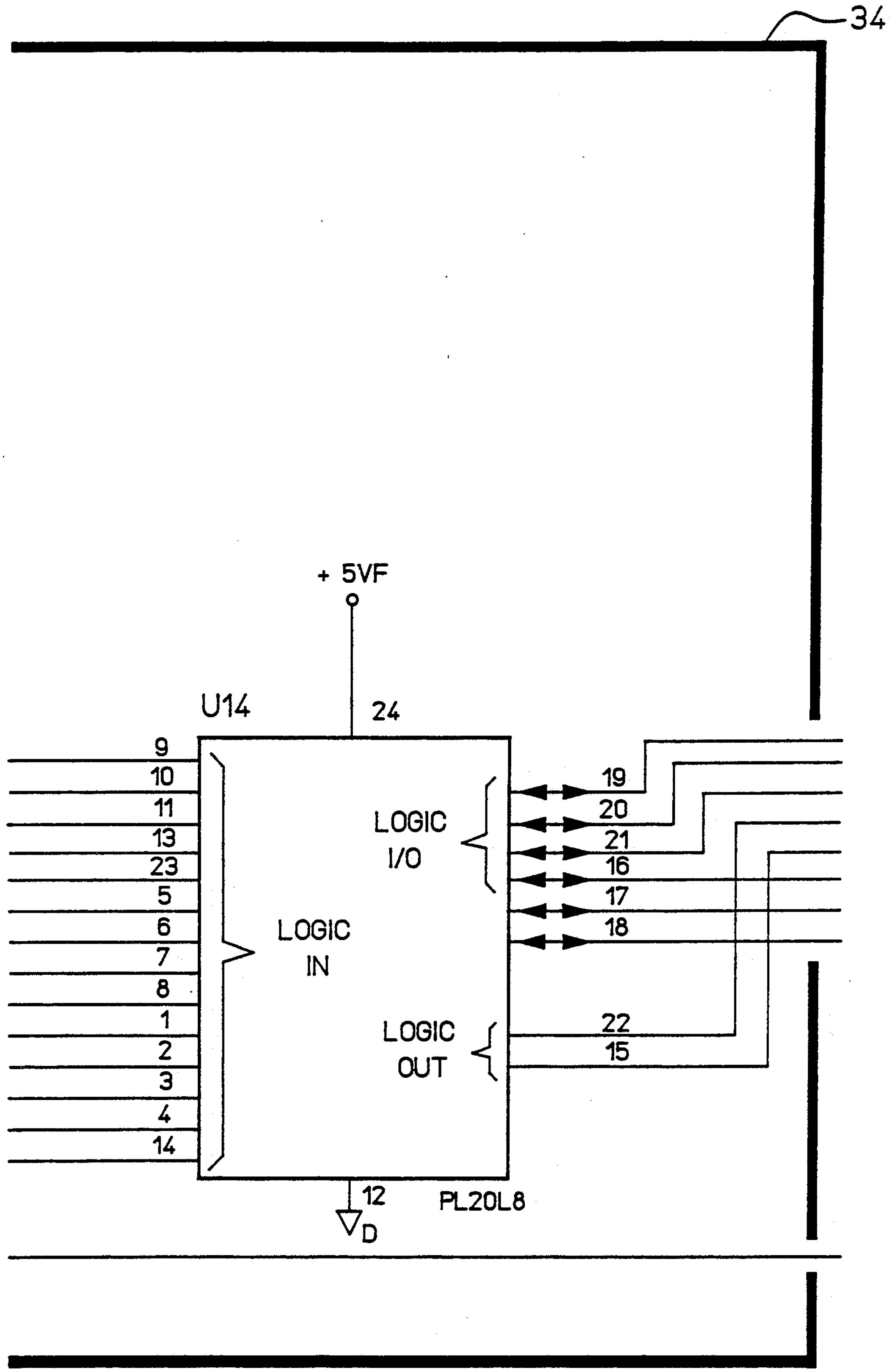
FIG 2B.13

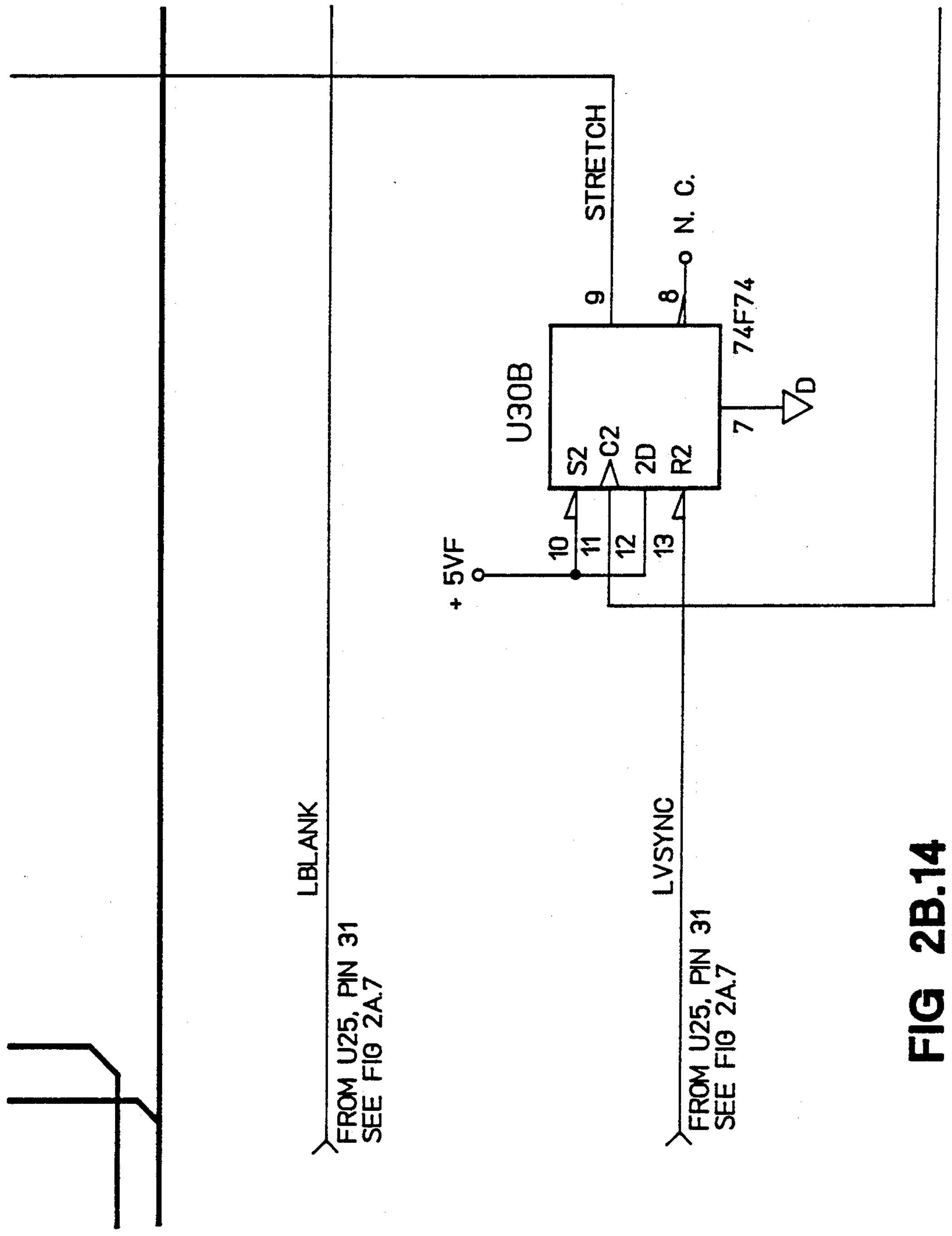
FIG 2B.14

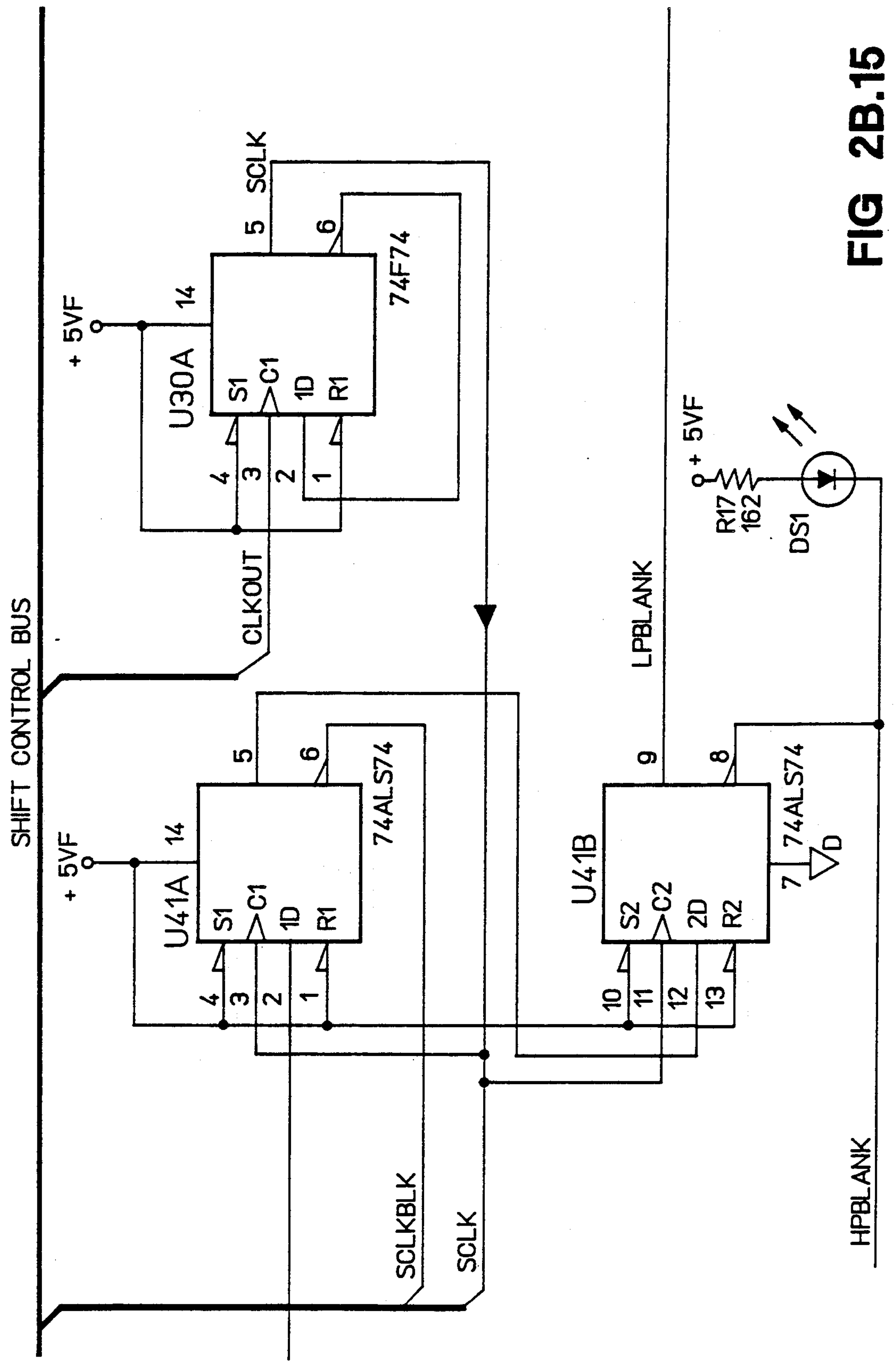
FIG 2B.15

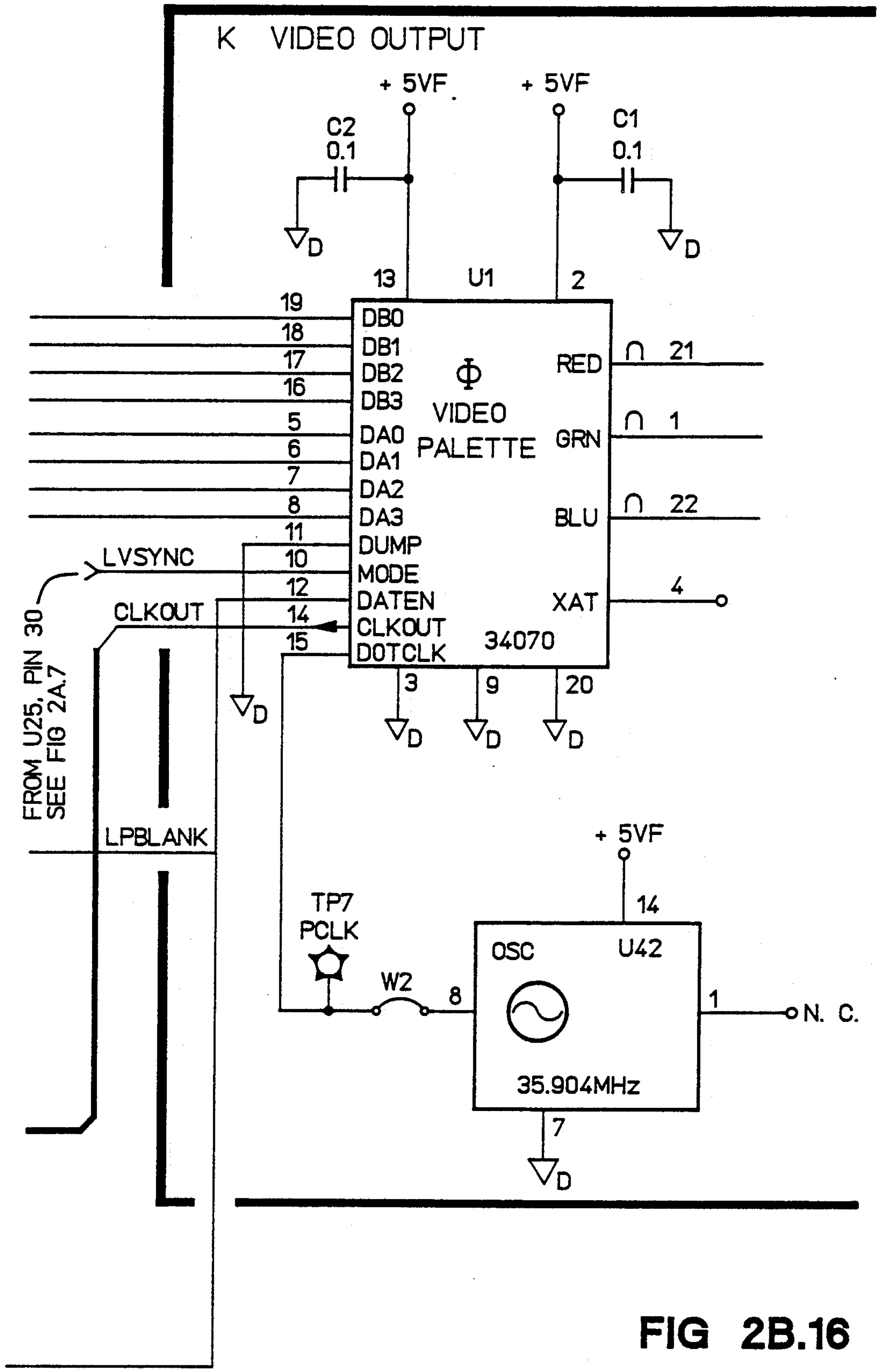
FIG 2B.16

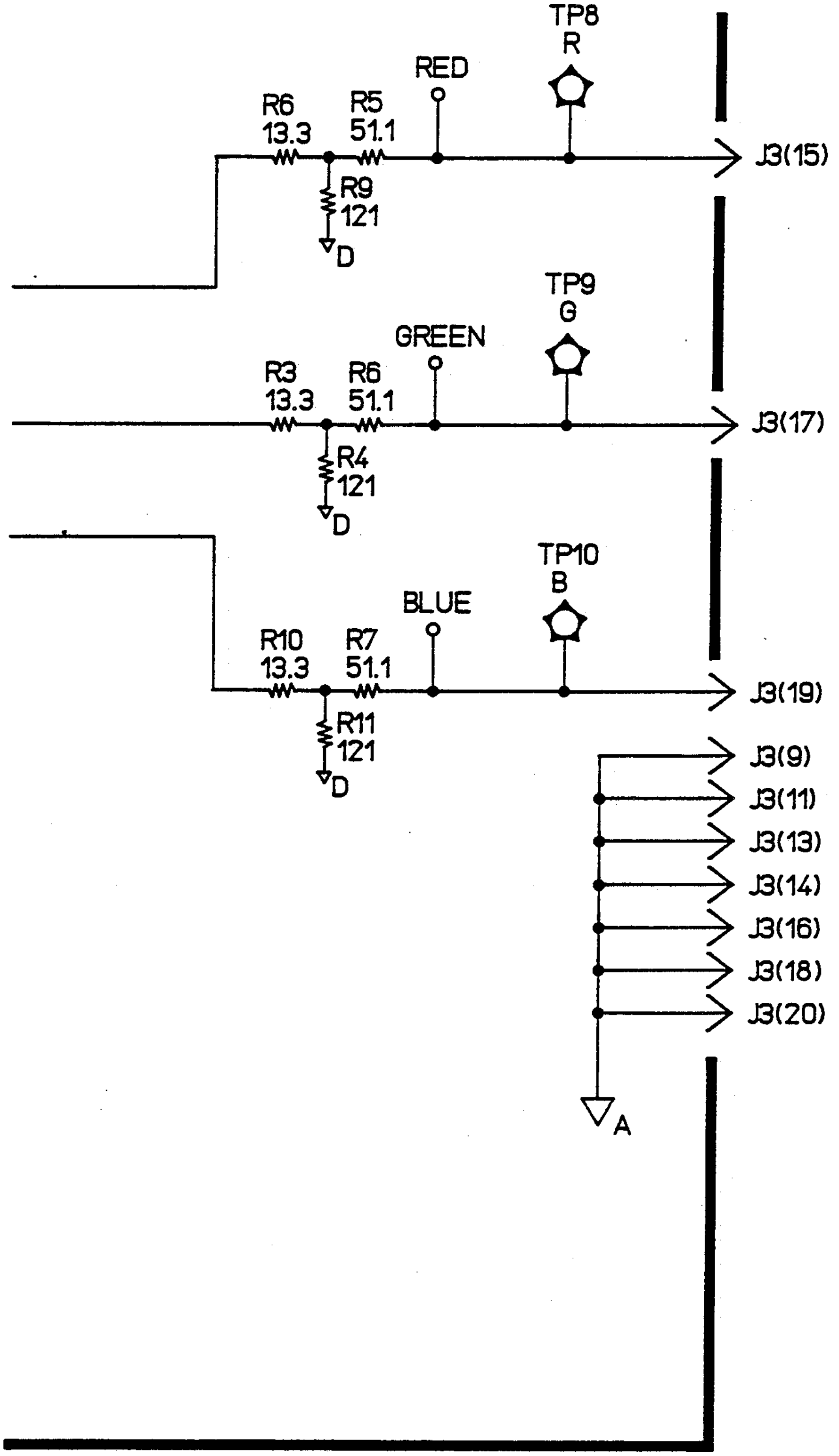
FIG 2B.17

METHOD AND APPARATUS FOR INCREASING IMAGE GENERATION SPEED ON RASTER DISPLAYS

BACKGROUND OF THE INVENTION

This invention relates to creation of images and, more particularly, to generation of images on raster displays. These images can consist of textual and/or graphical information. Specifically, the invention is directed to a method and apparatus for digitally processing image data, which increase the speed or rate of generation of corresponding images on a raster display.

One type of raster display is a cathode ray tube (CRT) on which images are displayed by a technique known as raster scanning. Raster scanning involves driving a deflection control circuit which directs an electron beam modulated by image information onto discrete areas of luminescent material on a display screen. The image information determines whether or not each discrete luminescent area is illuminated. Typically, raster scanning involves sweeping the electron beam from the upper left hand corner of the screen horizontally across the screen to the right to selectively illuminate a horizontal row of discrete luminescent areas and repeating the process for each row of the screen from top to bottom, selectively illuminating each discrete luminescent area in accordance with the corresponding image information which modulates the electron beam.

The electron beam can be modulated in various ways depending on the manner in which the CRT is being used. One example is a television in which image information is transmitted through the atmosphere and detected by a television receiver which decodes the received image information and modulates the electron beam to display images on a screen. The deflection control circuit sweeps the electron beam to generate images on a television screen as many as 60 times a second.

CRTs are also used as displays for other purposes. One such use is in computer terminals. Here, images are displayed by sweeping the electron beam in the same way as in a television. Unlike television, however, the image information is not generally transmitted through the atmosphere, but rather is input to the computer at a local or remote location and stored in a screen memory. A display control processor feeds the stored image data in the screen memory to the CRT for modulating the electron beam to generate an image corresponding to the stored image data.

Another use of a CRT is in electronic instrumentation, such as an oscilloscope, spectrum analyzer, or network analyzer. These instruments measure characteristics of received signals transmitted through the atmosphere or responses of electronic devices connected to them. Typically, the measured information is processed and stored in a screen memory, similar to the way in which image data is stored in the screen memory for display on computer terminals.

Unlike computer terminals in which data is entered and displayed at relatively low rates or speeds, instruments make measurements at significantly higher speeds. For example, data can be entered in computer terminals by a keyboard at typing speed, say at an average of 80 characters a minute, whereas sophisticated instruments make measurements at a rate of between 300 to 3,600 times a minute.

In most instruments with CRTs, standard off-the-shelf graphics system processors are used to update the display, due to their relatively low cost (compared to custom graphics system processors or dedicated graphics engines). The resultant update rate is typically two to five times a second during normal measurement operation. Examples of such instruments include the Hewlett-Packard Company HP 4195A Network/Spectrum Analyzer, HP 54110 Color Digitizing Oscilloscope, and HP 70000 Modular Measurement System, as well as the Wiltron Company 360, Wiltron 561, and Wiltron 6409 network analyzers.

Achieving a fast display update rate is very important in many instrument applications. If the display cannot be updated as fast as measurements are made, the data collection process must be slowed down, or else the user of the instrument will not see the data that has been collected. The measurement traces will be updated sluggishly, making the instrument less responsive to the user. In addition, if the display is not updated quickly, the instrument will not have a "real-time" feel; that is, the images will dance in steps to the final displayed values rather than appear to move smoothly and instantaneously to those final values as the display is updated with new measurement data that has been collected. A display update rate of at least 10 to 20 updates a second (10 to 20 Hz) is needed in order to achieve a "real-time" feel.

One disadvantage of raster displays used in instruments is that pixels on the display screen must be written by the graphics system processor into a region of screen memory. The process of writing image data corresponding to a single line into the screen memory can require the graphics system processor to access hundreds of screen memory locations, consuming a significant amount of time.

In fast instruments, which make measurements at 3,000 or so times a minute (as fast as 60 Hz), changes in the measured data are not faithfully displayed on the CRT quickly because of limitations of the graphics system processor which is not able to quickly fill video memory at a rate that can be accommodated by the 60 Hz maximum update capability of the deflection control circuit of conventional CRTs. It is desirable that the rate or speed with which image data can be processed can be better matched to the display update capability of the deflection control circuit of the raster display so that changes in images can be more quickly updated on the raster display and perceived by the user.

SUMMARY OF THE INVENTION

One embodiment of the invention increases the speed with which image data is written into a screen memory. Accordingly, the image data is stored in a manner which enables updated image data to be accessed and displayed more quickly on a raster display, such as a CRT, by the use of a conventional deflection control circuit and raster scanning technique. For example, the invention results in an eight-fold increase in the speed of updating the display of traces of measurement data in a network analyzer. This enables new measurement data to be more rapidly displayed to the user without the data trace appearing to dance on the screen.

In accordance with one embodiment of the method and apparatus in accordance with the invention, a graphics system processor receives information which is to be displayed. At least a portion of this information is in the form of X,Y coordinate data. The graphics system processor transposes each received set of X and Y coordinates so that X,Y becomes Y,X. The graphics system processor then processes adjacent pairs of transposed coordinates to generate a line segment or segments by using the first set of transposed coordinates as the starting point and the second set of transposed coordinates as the end point. Next, the graphics system processor can compute a best-fit set of points between the starting and end points to interconnect them using a conventional technique, such as Bresenham's line-drawing algorithm. Preferably, the method in accordance with one embodiment of the invention optimizes the line segment drawing process in the graphics system processor.

The graphics system processor is connected to a conventional screen or video memory which stores the image or video data produced by the graphics system processor. In order to write the image data into the video memory so that the image data is properly fed to modulate the electron beam of the CRT, an address translator circuit interfaces the graphics system processor to the video memory. The address translator circuit writes the image data in banks of vertically oriented image data, as compared to horizontally oriented banks of image data, so that image data is stored in the video memory in a conventional format for updating the display on the CRT. The address translator circuit writes into the video memory by reversing the address select lines to the video memory so that the image data is correctly stored for later access.

By first transposing the coordinates with the graphics system processor and digitally processing in a conventional horizontal mode, changes in vertical distances between adjacent points of information are more quickly written into the video memory and hence more quickly reflected on the screen of the CRT as the electron beam is modulated in the conventional way. In other words, limitations on the speed of operation of the graphics system processor are removed by allowing the graphics system processor to operate in a pseudo-horizontal mode without affecting the appropriate image data storage needed to generate the CRT display. Accordingly, the graphics system processor is able to process image data characterized by vertical excursions as fast as conventional processing of image data, such as horizontal line drawing. The address translator then reconverts the image data to the appropriate form for conventional storage in the screen memory so that a conventional CRT can be used. Also, a pulse stretching circuit is preferably provided to replicate an adjacent pixel for each pixel of each line segment to provide a smooth, high resolution trace.

BRIEF DESCRIPTION OF THE DRAWINGS

The above and other features of the invention and the concomitant advantages will be better understood and appreciated by persons skilled in the art in view of the detailed description given below in conjunction with the accompanying drawings. In the drawings:

FIG. 3, comprising

DETAILED DESCRIPTION OF THE PREFERRED EMBODIMENTS

The following additional background information is intended to facilitate an understanding of the invention. Typically, the graphics system processor and its associated video memory are optimized to operate with image data being written into horizontally adjacent memory cells in the video memory. This constraint is imposed by a conventional deflection control circuit in a CRT, which raster scans horizontally, and the required interconnection of the video memory output shift register to the deflection control circuit for modulating the electron beam of the CRT. This constraint slows the speed of the graphics system processor in processing measurement data for display, since measurement data is typified by vertical excursions as opposed to horizontal ones. Therefore, more time is required to update the video memory when sequential measurements vary.

Figure 4:
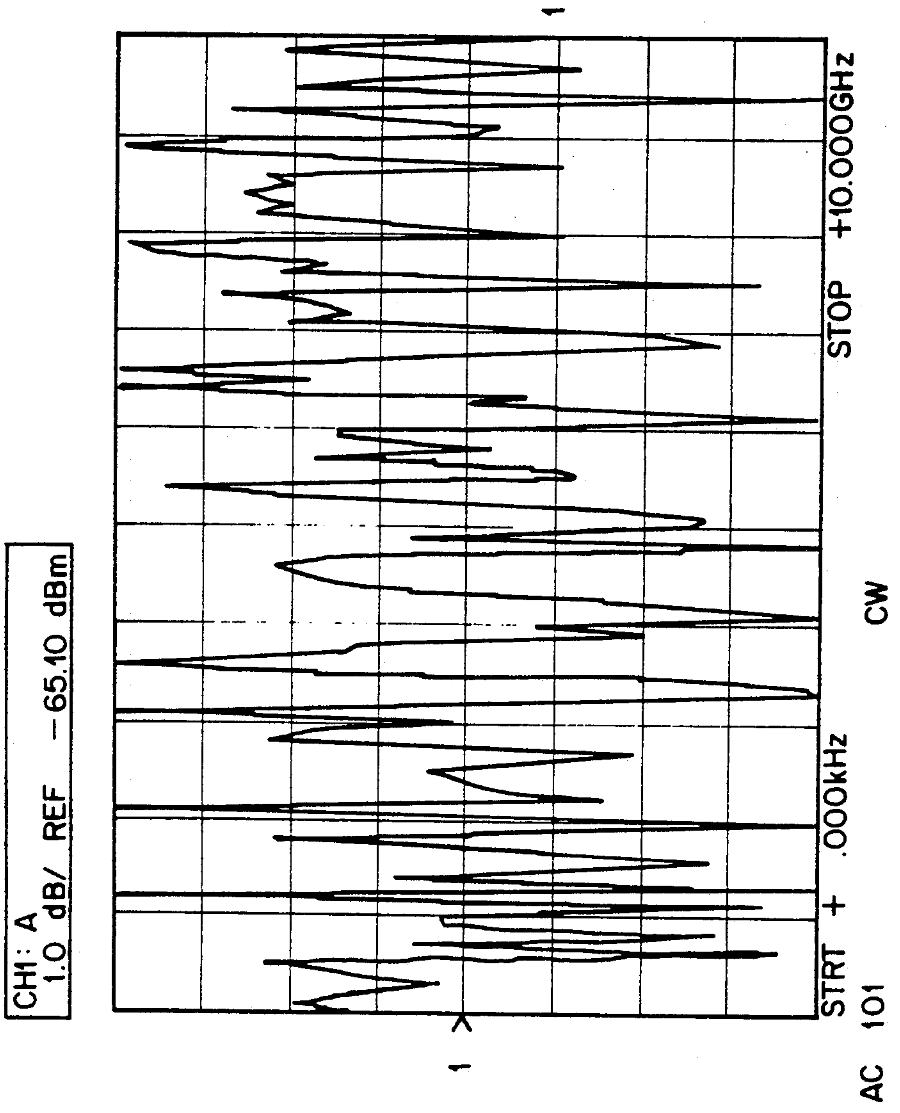
FIG. 4 illustrates an example of a trace generated from measurement data in accordance with one embodiment of the invention.

Considered in more detail, in many instrument applications, the data display is a graph, with the controlled variable drawn along the X-axis, and the independent variable drawn along the Y-axis. (See, for example, FIG. 4.) Such graphs tend to exhibit a more rapid data variation in the Y direction than in the X direction. As a result, the graph is predominantly composed of vertically oriented lines and contains far fewer horizontally oriented lines.

There are various significant disadvantages of off-the-shelf graphics systems processors. Unfortunately, presently available off-the-shelf graphics system processors are typically designed in a way that optimizes their drawing speed in the horizontal direction. This results in much lower performance when drawing in the vertical direction. Generally, horizontal lines can be drawn two to 16 times faster than vertical lines. In order to achieve a rapid display update rate, the graphics system processor must be able to draw vertical lines very quickly.

For example, one conventional graphics system processor has a 16-bit data bus, allowing it to write four 4-bit pixels to the video memory in one cycle. The graphics system processor is designed such that the four pixels it writes during a memory cycle are horizontally adjacent. Hence, the standard technique of interfacing the graphics system processor to the video memory is to have it access four 64K×4 video dynamic random access memories (VRAMs) in parallel. The result is that the adjacent pixels on a horizontal raster scan line are interleaved among the four VRAMs. When the pixels are to be shifted out of the VRAMs to the CRT, the four banks are all shifted simultaneously, and the interleaved pixels are multiplexed onto a single video bus.

Typically, the number of bits per pixel, n, is 1, 2, or 4. If, for example, 16 colors are desired on a CRT, four bits per pixel are needed to specify one of the colors. Since the graphics system processor accesses 16 bits of memory per cycle, it is able to write 16, 8, or 4 pixels to memory per cycle, respectively. Thus, m, the number of graphics system processor data outputs (16-bit data bus) divided by the number of bits per pixel, n, is 4 for a 16-color CRT. The pixels that are written together in a single memory cycle are pixels that are horizontally adjacent in video memory rather than vertically adjacent for the following reason.

The video memory is configured in such a way that the horizontally adjacent memory cells (which each contain a pixel) have adjacent addresses. That is, incrementing the video memory address by one results in the selection of the pixel immediately to the right of the current pixel.

Accordingly, graphics system processors are typically designed to work with standard video memories. This requires that they be architected in such a way that they convert the X,Y position of a pixel into a video memory address in which Y selects the most significant portion of the address and X selects the least significant portion of the address. Since the graphics system processor accesses several horizontally adjacent pixels in a single memory cycle, it is able to generate horizontal lines significantly faster than vertical lines.

The method and apparatus in accordance with the invention alter the graphics system processor to operate as though it is drawing horizontal lines, when it is actually drawing vertical lines. This is achieved by exchanging the X and Y coordinates of each line segment endpoint and computing vertical line segments in a pseudo-horizontal mode. Then, the X and Y halves of the memory address are exchanged by means of an address translator circuit so that image data is written into the video memory in the appropriate format for modulating the electron beam.

Figure 1:
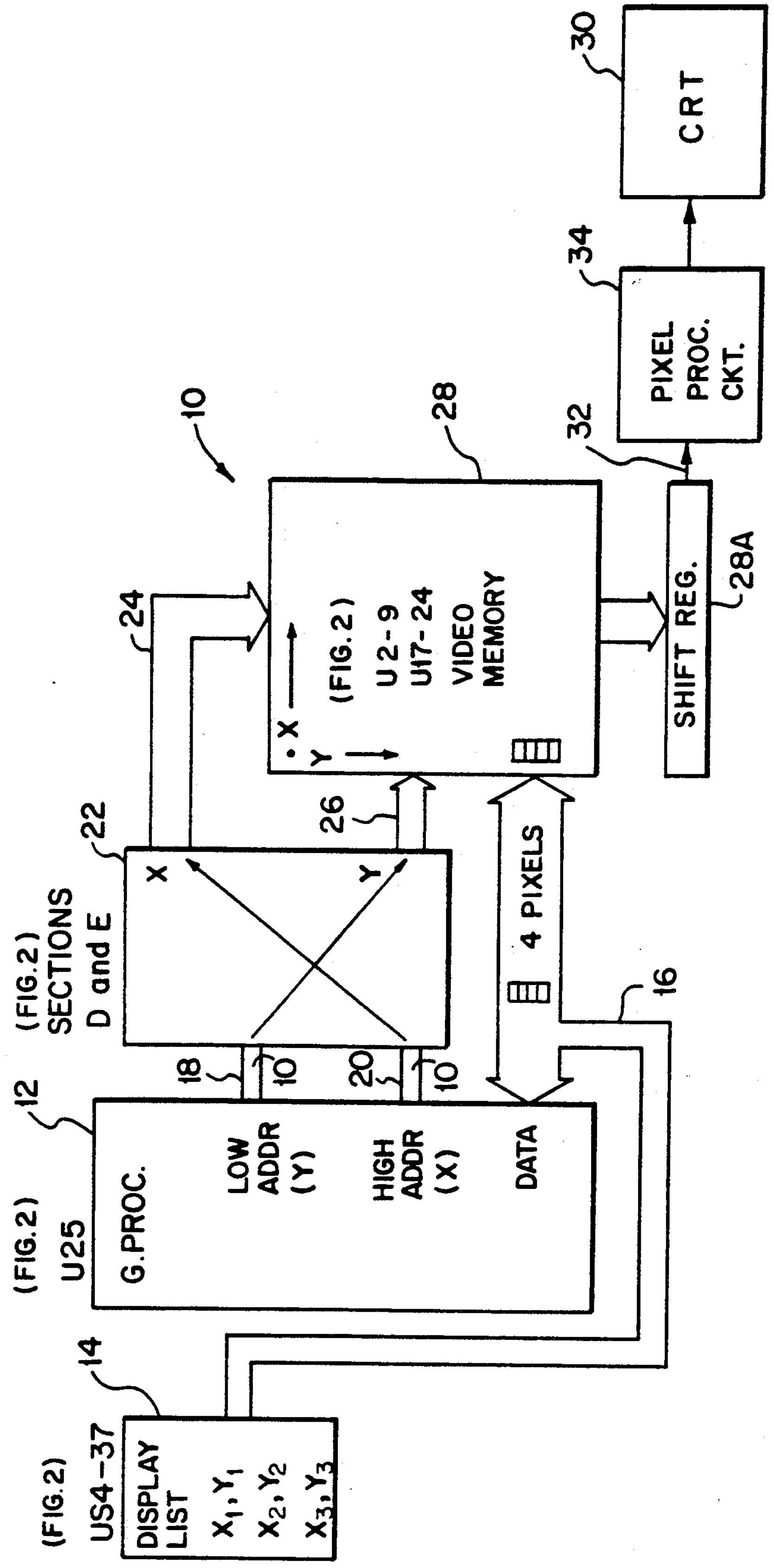
FIG. 1 is a block diagram of one embodiment of an image data generation circuit in accordance with the invention.

A preferred embodiment of the image data generation circuit in accordance with the invention, generally indicated by the numeral 10, is shown in FIG. 1. The image data generation circuit 10 comprises a graphics system processor 12. The graphics system processor 12 is preferably a conventional graphics systems processor integrated circuit, for example, a Texas Instruments TMS34010 Graphics System Processor (GSP). The operation and programming instructions for this processor are described in "Texas Instruments TMS34010 User's Guide" published in 1988 by Texas Instruments.

The graphics system processor 12 is programmed in a conventional manner to read raw data from a display list memory 14 on an I/O data bus 16 which interconnects the graphics system processor and the display list memory. At least a portion of the raw data is stored in the display list memory 14 in X,Y coordinate form.

In accordance with the invention, the first cycle of the graphics system processor 12 after reading the raw data in X,Y coordinate form is to transpose this raw data to Y,X coordinate form. The graphics system processor 12 then commences a line drawing operation which translates the raw data to a pictorial representation in the form of image data.

Considered in more detail, the graphics system processor 12 reads one X,Y coordinate from the display list memory 14 and then reads the adjacent X,Y coordinate from the display list memory. The graphics system processor 12 then transposes the X and Y coordinates for these points. Next, the graphics system processor 12 determines the horizontal separation between the points.

Preferably, if the horizontal spacing is less than a predetermined distance, for example, less than two pixels, the vertical spacing is determined. If the vertical spacing is greater than the horizontal separation, i.e., the slope is greater than 45 degrees, then the line is broken into a set of vertical line segments offset horizontally from one another by one pixel. Next, if the cumulative offset between X coordinates is one, the line is broken into two segments of equal length, ignoring round-off. If, on the other hand, the cumulative offset is two or more, the number of segments is computed to be Delta X plus 1, where Delta X equals the number of pixels separating the adjacent X coordinates. The length of each vertical segment is then determined by computing the vertical spacing so as to determine the number of pixels between the Y coordinates of the adjacent points, inclusive of the end points, and dividing the result by Delta X, ignoring round-off. Finally, the first and last segments are preferably half the length (number of pixels) of the remaining segments. This last feature is so that the broken line connects well with the preceding and/or subsequent lines, if any. Interestingly, this produces the same result as Bresenham's line-drawing algorithm, but the graphics system processor 12 performs the modified line drawing procedure in accordance with the invention considerably faster, on the average of ten times faster using the TMS34010 GSP.

To perform the actual line drawing, the graphics system processor 12 executes a routine which examines the now horizontally oriented line that has been broken into a series of individual horizontal line segments. Since these line segments are horizontal, and not just horizontally oriented, it is now possible to use the fill rectangle command ("FILL") of the graphics system processor 12, which is very fast at drawing horizontal lines.

As the graphics system processor 12 generates the horizontal line segments of each line, it takes each group of m horizontally adjacent pixels and attempts to write them to video memory in a single cycle. (m can be calculated as the width of the data bus of the graphics system processor 12 divided by the number of bits per pixel, and, typically, $m=4$, 8, or 16. In an exemplary application of the invention in which 16 colors are available, $m=16/4=4$.) This technique of writing multiple horizontally adjacent pixels in each memory cycle is what makes horizontal line drawing fast. Table I below is a listing of the source code for a Texas Instruments TMS34010 GSP, which performs this line drawing operation.

TABLE I

```
*****************************************************************************
* File:          1349d.asm
* Description:   GSP 1349D Emulator
* Author:        Roger Petersen
* Created:       May 1987
* Modified:      Sun Nov 28 22:52:28 1988 (Roger Petersen)
*
*****************************************************************************
*****************************************************************************
*             GSP LINE DRAWING PROGRAM                                      *
* Copyright (c) 1988 Hewlett Packard Company                                *
* Written by Roger J. Petersen                                              *
```

TABLE I-continued

```
* Created: May 1987                                                        *
* Operation:                                                               *
* The host 68000 writes XY values into a previously agreed upon place in GSP *
* RAM. This RAM is called display list memory because it stores a list of  *
* values to be displayed. The GSP reads commands out of the display list,  *
* interpets them, and draws the specified item on the screen. This system  *
* uses double buffering. This means that at the end of the display list, the *
* GSP swaps the newly drawn frame in to be displayed. It then clears the frame *
* not being displayed, and begins again from the start, reading the display *
* list and executing the drawing commands.                                 *
****************************************************************************
* ADDITIONAL INITIALIZATION DEFINITONS
I_PLANE_MASK    .set    00h   ; PLANE MASK
I_OFFSETVAL     .set    00h
* SCREEN DEFINITIONS
PIXEL_SIZE      .set    4     ; PIXEL SIZE
* SCREEN INITIALIZATIONS
I_SRCEPITCH     .set    1024*PIXEL_SIZE
I_DESTPITCH     .set    1024*PIXEL_SIZE
SCRN_PITCH      .set    1024*PIXEL_SIZE
* DEDICATED REGISTER DEFINITIONS
SADDR           .set    B0
SPTCH           .set    B1
DADDR           .set    B2
DPTCH           .set    B3
OFFSET          .set    B4
WSTART          .set    B5
WEND            .set    B6
DYDX            .set    B7
COLOR0          .set    B8
COLOR1          .set    B9
* I/O REGISTER DEFINITIONS
HESYNC          .set    0C0000000h
HEBLNK          .set    0C0000010h
HSBLNK          .set    0C0000020h
HTOTAL          .set    0C0000030h
VESYNC          .set    0C0000040h
VEBLNK          .set    OC0000050h
VSBLNK          .set    0C0000060h
VTOTAL          .set    0C0000070h
DPYCTL          .set    0CO000080h
DPYSTRT         .set    0C0000090h
DPYINT          .set    0C00000A0h
CONTROL         .set    0C00000B0h
HSTDATA         .set    0C00000C0h
HSTADRL         .set    0C00000D0h
HSTADRH         .set    0C00000E0h
HSTCTLL         .set    0C00000F0h
HSTCTLH         .set    0C0000100h
INTENB          .set    0C0000110h
INTPEND         .set    0C0000120h
CONVSP          .set    0C0000130h
CONVDP          .set    0C0000140h
PSIZE           .set    0C0000150h
PMASK           .set    0C0000160h
* RESERVED      .set    0C0000170h
* RESERVED      .set    0C0000180h
* RESERVED      .set    0C0000190h
* RESERVED      .set    0C00001A0h
DPYTAP          .set    0C00001B0h
HCOUNT          .set    0C00001C0h
VCOUNT          .set    0C00001D0h
DPYADR          .set    0C00001E0h
REFCNT          .set    0C00001F0h
*
* Constants
*
dl_size   .set   8192  ; Size of display list
*
* Register name declarations
*
SCRATCH   .set   A0    ; Temporary register.
TEMP      .set   A1    ; Temporary register.
TEMP2     .set   A2    ; Temporary register.
CTLSAVE   .set   A3    ;
CURXY     .set   A5    ; Contains current XY posn.
NEWXY     .set   A6    ; Contains new XY posn.
SEG3      .set   A7    ; Length of line segment
DLPC      .set   A8    ; Display list pointer.
X1        .set   A9    ; Register value of [1,0]
SEG       .set   A10   ; Length of line segment
COUNT     .set   A12   ; General purpose counter
```

TABLE I-continued

```
STARTXY     .set   A13   ; Used in line drawing
DELTAXY     .set   A14   ; Used in line drawing
TEMPB       .set   B14   ; Temporary register
FRAME0_OFFSET           .set   0 * PIXEL_SIZE
FRAME0_END_OFFSET       .set   400 * PIXEL_SIZE
FRAME1_OFFSET           .set   404 * PIXEL_SIZE
FRAME1_END_OFFSET       .set   804 * PIXEL_SIZE
FRAME0_DPYSTRT          .set   (FRAME0_END_OFFSET << 2)
FRAME1_DPYSTRT          .set   (FRAME1_END_OFFSET << 2)
FRAME0_CLS_OFFSET       .set   (FRAME0_OFFSET << 10)
FRAME1_CLS_OFFSET       .set   (FRAME1_OFFSET << 10)
INIT_DPYCTL             .set   0F410h
*************************************************************************
***                   BEGINNING OF PROGRAM                            ***
*************************************************************************
.text
start:
*
* Disable interrupts
*
DINT
*
* Set memory access field sizes.
*
setf    16,0,0
setf    32,0,1
*
* Initialize stack pointer
* Enable cache!
* Initialize video registers.
* Turn off video until screen is cleared.
*
movi    stack_top,SP                 ; Must be done befor
callr   cache_on
callr   init_video                   ; Initialize video I
callr   blank_video                  ; Don't display any
*
* Initialize drawing registers
*
movi    I_SRCEPITCH,SPTCH            ; Set linear source
movi    I_DESTPITCH,DPTCH            ; Set linear destina
movi    FRAME0_OFFSET,OFFSET         ; Prepare to draw in
clr     COLOR0                       ; Set background col
move    SPTCH,A0                     ; Get SPTCH register
lmo     A0,A0                        ; Convert in tempora
move    A0,@CONVSP                   ; Move to CONVSP io
move    DPTCH,A0                     ; Get DADDR register
lmo     A0,A0                        ; Convert in tempora
move    A0,@CONVDP                   ; Move to CONVDP io
movk    PIXEL_SIZE,A0                ; Set pixel size to
move    A0,@PSIZE
movi    I_PLANE_MASK,A0              ; Set plane mask to
move    A0,@PMASK
*
* Clear screens
*
callr   draw_frame0
callr   cls_fast
callr   draw_frame1
callr   cls_fast
*
* Turn video on
*
callr   enable_video
*************************************************************************
***                   1349D INITIALIZATIONS                           ***
*************************************************************************
*
* Establish double buffering
*
callr   disp_frame1
callr   draw_frame0
*
* Load palette with colors
*
movi    palette_data_1349,A14
callr   load_palette
*
* Turn off clear screen request
*
clr     TEMP
move    TEMP,@clear_screen_flag
```

TABLE I-continued

```
********************************************************************************
***                        Start Reading Display List                       ***
********************************************************************************x
restart:
*
* Set up interrupts
*
move    @VSBLNK,@DPYINT
movi    0600h,TEMP
move    TEMP,@INTENB
*
* Set drawing mode
*
movi    [0,0],WSTART              ; Set up window
movi    [1023,399],WEND
callr   window__on
callr   trans__off
*
* Initialize registers, variables
*
clr     CURXY
clr     NEWXY
movi    [1,0],X1
movi    0FFFFFFFFh,COLOR1         ; Color = White
*
* Initialize display__list PC to start of list
movi    dl__start,DLPC
*= = = = = = = = = = = = = = = = = = = = = = = = = = = = = = = = = = = = = = = = *
*                        FETCH NEXT XY VALUE                                  *
*= = = = = = = = = = = = = = = = = = = = = = = = = = = = = = = = = = = = = = = = *
* While not end-of-display-list {
* Read new XY position.
* Draw line from CUR XY position to NEWXY position.
* CUR XY position = NEW XY position.
* }
* Swap new frame in for display (double buffering).
* Repeat from start.
*
next__xy__value:
    ;Check to see if we're at the end of the disp. list
    cmpi    dl__start+(dl__size*32),DLPC
    jrge    end__of__list
    move    *DLPC+,NEWXY,1                ; Fetch XY value.
    rl      16,NEWXY                      ; Swap X and Y.
    callr   draw__next__line__segment     ; Draw line
    move    NEWXY,CURXY                   ; Update CURXY
    jruc    next__xy__value               ; Repeat
end__of__list:
    callr   swap__frames
    jruc    restart
*= = = = = = = = = = = = = = = = = = = = = = = = = = = = = = = = = = = = = = = =
*       DRAW LINE from CURRENT XY position to NEW XY position
*= = = = = = = = = = = = = = = = = = = = = = = = = = = = = = = = = = = = = = = =
draw__next__line__segment:
*
* The line to be drawn starts at CURXY,
* and ends at NEWXY.
* Using CURXY and NEWXY, create STARTXY and DELTAXY.
* DELTAXY = NEWXY - CURXY.
*
    move    CURXY,STARTXY
    move    NEWXY,DELTAXY
    subxy   STARTXY,DELTAXY
*
* Choose best action based on line's direction and length.
*
* Line's direction is determined by looking at flags after performing a SUBXY.
* Remember, X and Y are reversed.
* (i.e. the jrx and jry opcodes are reversed).
* So jrx refers to a Y test, and jry refers to an X test.
*
* If DY == 0, line is horizontal.
*
    jrxz    horiz__line    ;draw horiz line
*
* Make DELTAY always positive
* (as a result, delta X may become negative).
*
* If DELTAY > 0, lines direction = NorthEast
* and all is ok.
* If DELTAY < 0, lines direction = SouthEast
* and so we need to reverse the starting and ending points,
```

TABLE I-continued

```
* so its direction is NorthWest (like this:   ),
* and it has DELTAY positive, and DELTAX negative.
*
        jrxnn   dy__pos
dy__neg:
        move    DELTAXY,TEMP
        clr     DELTAXY
        subxy   TEMP,DELTAXY          ; DELTAXY = Abs(DELTAXY)
        ; set starting point to the former ending point.
        move    NEWXY,STARTXY         ; STARTXY = [NEWXY[X] / 2,
                                      ; NEWXY[Y]]
dy__pos:
*
CALL PROPER LINE DRAWING ROUTINE,
* based on absolute value of DELTAX.
*
        move    DELTAXY,TEMP
        sra     16,TEMP               ; TEMP = DELTAX
        abs     TEMP                  ; TEMP = abs(DELTAX)
        jrz     dx__zero
        subk    1,TEMP
        jrz     dx__one
        subk    1,TEMP
        jrz     dx__two
        jruc    use__line__command    ; DELTAX > 2.
                                      ; Use LINE command
*
* DELTA X = 2: USE FAST FILL
*
dx__two:
        ;Segment 1
        move    DELTAXY,TEMP          ; Divide DELTAXY[X] by 2.
        sra     1,TEMP                ; TEMP[X] /= 2.
        movy    TEMP,DELTAXY          ; DELTAXY = [+/-1, DELTAY],
                                      ; in pixels.
        move    STARTXY,DADDR
        clr     SEG
        movx    DELTAXY,SEG           ; SEG = [0,DeltaY]
        srl     2,SEG                 ; SEG = [0,DeltaY div 4]
        inc     SEG                   ; SEG = [0,DeltaY div 4 +1]
                                      ; = segment 1 length
        move    SEG,SCRATCH
        add     X1,SEG                ; SEG = [1,DeltaY div 4 +1]
        move    SEG,DYDX              ; DYDX = [1, SEG]
        FILL    XY
        ;Segment 2
        ;Calculate new start position
        movy    DELTAXY,SEG           ; SEG = [Delta X (signed),
                                      ; seg 1 length]
        add     SEG,STARTXY
        move    STARTXY,DADDR
        ;from above, SCRATCH = Segment 1 length
        ;Compute Seg 3 length first.
        clr     SEG3
        movx    DELTAXY,SEG3          ; SEG3 = [0, Delta Y]
        addk    3,SEG3                ; SEG3 = [0, Delta Y + 3]
        srl     2,SEG3                ; SEG3 = [0,
                                      (Delta Y + 3) div 4]
                                      ; = seg 3 length
        ;Length of segment 2 = DeltaY + 1 - seg1 - seg3
        add     SEG3,SCRATCH          ; SCRATCH = [0,
                                      ; Seg 1 + Seg 3]
        clr     SEG                   ; SEG = [0, 0]
        movx    DELTAXY,SEG           ; SEG = [0, Delta Y]
        addk    1,SEG                 ; SEG = [0, Delta Y + 1]
        sub     SCRATCH,SEG           ; SEG = [0, Delta Y + 1
                                      - Seg 1 - Seg 3]
                                      ; = seg 2 length
        jrz     dx__two__dy__one      ; Special case: DX=2, DY=1
                                      ; Line almost horiz.
        add     X1,SEG                ; SEG = [1, Delta Y + 1
                                      - Seg 1 - Seg 3]
        move    SEG,DYDX              ; DYDX = [1, seg 2]
        FILL    XY
        ;Segment 3
        movy    DELTAXY,SEG           ; SEG = [DeltaX (signed),
                                      Seg 2 length]
        add     SEG,STARTXY           ; add this length to form
                                      ; new start pos.
        move    STARTXY,DADDR
        add     X1,SEG3               ; SEG 3 was = Seg3 Y length
                                      ; (X was 0)
```

TABLE I-continued

```
    move    SEG3,DYDX             ; SEG 3 = (deltaY+3) div 4
                                  ; from above
    FILL    XY
    RETS
*
* DELTA X = 1: USE FAST FILL
*
dx_one:
    move    STARTXY,DADDR
    addk    1,DELTAXY             ;Length = DeltaY + 1.
    clr     TEMP
    movx    DELTAXY,TEMP          ;DYDX = DELTAY, 1
    srl     1,TEMP                ;TEMP = Delta Y / 2
    add     X1,TEMP               ;TEMP = Delta Y / 2, 1
    move    TEMP,DYDX
    FILL    XY                    ;Draw line.
    ;calculate new DYDX
    move    DELTAXY,TEMP
    sll     31,TEMP               ;zero top 31 bits
    srl     31,TEMP               ;TEMP = DeltaY mod 2, 0
    addxy   TEMP,DELTAXY          ;Calculate 2nd segment size
    ;calculate new DADDR
    move    DYDX,TEMP             ;TEMP = DY/2, 1
    movy    DELTAXY,TEMP          ;TEMP = DY/2, DX (signed)
    add     TEMP,STARTXY
    move    STARTXY,DADDR
    FILL    XY
    RETS
*
* DY = 0: HORIZONTAL LINE
*
horiz_line:
    jrynn       horiz_left_to_right
    ; Reverse start and end
    addxy       DELTAXY,STARTXY
    clr         TEMP
    subxy       DELTAXY,TEMP
    move        TEMP,DELTAXY
horiz_left_to_right:
    move        STARTXY,DADDR
    ;Add [1,1] to include endpoints, and make FILL
    ;draw the proper line.
    add         X1,DELTAXY
    addk        1,DELTAXY
    move        DELTAXY,DYDX
    FILL        XY
    RETS
*
* DX == +/-2, DY == 1. SPECIAL CASE.
*
* Segment 1 has already been drawn.
* STARTXY = starting point of segment 2.
* DELTAXY = line's DeltaY,X values.
* If X < 0, draw toward left.
*
* Line could look like either        23      or      32
*                                   1                  1
*
* where 1,2,3 are the segment
numbers of the line.
* All we need to do is draw segments
#2 and #3 now.
* First, we'll adjust the starting point
for the 2nd case (32,1), if needed.
* Then, we'll draw both segments
with a single FILL XY command.
dx_two_dy_one:
    ;If deltax < 0, do negative x routine.
    btst        31,DELTAXY
    jrz         dx_plus_two_dy_one
*dx_minus_two_dy_one:
    subxy       X1,STARTXY        ; Shift starting point 1
                                  ; pixel left
    dx_plus_two_dy_one:
    move        STARTXY,DADDR ; Draw segments 2 and 3,
                                  ; side by side.
    movi        [2,1],DYDX
    FILL        XY
    RETS
*
* DELTA X = 0: VERTICAL LINE
*
```

TABLE I-continued

```
dx__zero:
    move     STARTXY,DADDR
    addxy    X1,DELTAXY          ; DX = 1 = width of line.
    addk     1,DELTAXY
    move     DELTAXY,DYDX
    FILL     XY
    RETS
*
* DRAW LINE: from STARTXY to STARTXY + DELTAXY
&
use__line__command:
    move     STARTXY,DADDR ; [Xs, Ys] = STARTXY
    move     DELTAXY,SADDR
    addxy    DADDR,SADDR    ; [Xe, Ye] = STARTXY +
                            ; DELTAXY
    subxy    DADDR,SADDR
    subb     B11,B11
    movk     1,B10
    clr      DYDX
    subxy    SADDR,DYDX
    jrnc     graph__L1
    ; Deal with case b >= 0
    movy     SADDR,DYDX
    not      B11
    srl      15,B11
graph__L1:
    jrnv     graph__L2
    ; Deal with case a >= 0.
    movx     SADDR,DYDX
    movx     B10,B11
graph__L2:
    ; Compare magnitudes of a and b.
    clr      B12
    move     DYDX,SADDR
    srl      16,SADDR
    cmpxy    SADDR,DYDX
    jrv      graph__L3
    ; Case: a >= b.
    movx     B11,B12
    jruc     graph__L4
    ; Case: a < b
graph__L3:
    movx     DYDX,SADDR
    rl       16,DYDX
    movy     B11,B12
    ; Calculate initial values of decision variable, d
    ; and loop counter
graph__L4:
    add      SADDR,SADDR
    movx     DYDX,B10
    sub      B10,SADDR
    addk     1,B10
    ; Draw line and return
    LINE     0
    RETS
*================================*
*        SWAP FRAMES & CLEAR SCREEN        *
*================================*
* This routine checks which frame is being displayed
* (by reading @DPYSTRT).
*
* If Frame 1 is being displayed,
* Frame 0 is swapped in for displaying
* Frame 1 is swapped in for drawing
*
* If Frame 0 is being displayed,
* Frame 1 is swapped in for displaying
* Frame 0 is swapped in for drawing
*
swap__frames:
    DINT                                ; Disable interrupts.
    move     @DPYSTRT,TEMP              ; Read starting line of
                                        ; currently displayed frame
    cmpi     FRAME0__DPYSTRT,TEMP       ; If frame = 0 . . .
    jreq     swap__in__1                ; . . . then swap in frame 1
                                        ; else swap in frame 0.
swap__in__0:
    callr    disp__frame0
    callr    draw__frame1
    jruc     end__swap
swap__in__1:
    callr    disp__frame1
```

TABLE I-continued

```
    callr       draw__frame0
end__swap:
*
* Set clear screen flag,
* signaling Display Interrupt routine to clear screen.
*
    movk        1,TEMP
    move        TEMP,@clear__screen__flag
    EINT
    *
    *           Wait for display-line interrupt
    *
Wait__for__display__line__int:
    move        @clear__screen__flag,TEMP2
    jrnz        wait__for__display__line__int
    RETS
******************************************************************************
****                          END TEXT AREA                             *****
******************************************************************************

******************************************************************************
***                           SUBROUTINES                               ***
******************************************************************************
*
*                             Blank video
*
blank__video:
    mmtm        SP,A0
    move        @DPYCTL,A0
    andni       08000h,A0           ;Clear bit 15
    move        A0,@DPYCTL          ;Disable Video
    mmfm        SP,A0
    RETS
*
*                             Turn on cache!
*
cache__on:
    mmtm        SP,A0
    move        @CONTROL,A0
    andni       08000h,A0           ;Bit 15 = 0 enables cache
    move        A0,@CONTROL
    mmfm        SP,A0
    RETS
*
*           Clear Current Frame Quickly, using reverse SRTs.
*
cls__fast:
    mmtm        SP,CTLSAVE,TEMP,TEMP2
    mmtm        SP,SADDR,SPTCH,DADDR,DYDX,DPTCH,OFFSET,COLOR1
*
* Wait for end of refresh of current screen
wait__end__screen:
    move        @VSBLNK,TEMP
    move        @VCOUNT,TEMP2
    cmp         TEMP,TEMP2
    jrne        wait__end__screen   ; wait until
                                    ; VCOUNT >= VSBLNK
*
* CLEAR THE SCREEN, NOW.
*
*
* Turn off transparency (bit 5 = 0)
* Turn off windowing (bits 6,7 = 0)
* Set PixOp to D <-- S (bits 14..10 = 0)
*
    move        @CONTROL,CTLSAVE
    move        CTLSAVE,TEMP
    andni       07CE0h,TEMP
    move        TEMP,@CONTROL
* Clear a small 4 line block
* (this block will be replicated using SRTs)
    clr         COLOR1              ; choose background color
    movi        [0,0],DADDR
    movi        [1024,4],DYDX
    FILL        XY
* Set VRAM access mode to SRT accesses
    move        @DPYCTL,TEMP
    ori         0800h,TEMP
    move        TEMP,@DPYCTL
* Check which frame is active. Clear it.
    move        OFFSET,OFFSET
    jrz         offset__ok
```

TABLE I-continued

```
      movi     FRAME1_CLS_OFFSET,OFFSET
offset_ok:
* Perform reverse SRT to clear other 396 lines of scree
* Note: SRT is performed without transposed memory styl
* access, so X and Y are swapped from their transposed format.
* memory address = (Y * CONVDP) or (X * PIXSIZE) + OFFS
* = OYYYYYYYYYXXXXXXXXXXXX00     (0 = OFFSET. 0 = must be 0!
* = 1098765432109876543210        <----- Logical Address bit
* = 9876543210                    <----- LAD pin # during ROW
* =          76543210             <----- LAD pin # during COL
* During the SRT cycle, a standard XY address is used.
* Accessing the XY address sends the address out on the
* LAD pins as shown above. During ROW time, LAD9..2 ar
* sent to the VRAMs as A7..0. Also during ROW time,
* LAD1..0 are used by PAL1 to select a VRAM bank.
* During COL time, LAD7..0 are sent to the VRAMs as A7.
*
* The requirement is that the VRAMs receive a COL addre
* 00000000, so that they will not pan the screen image the right.
*
* During a SRT read cycle, only one bank of VRAM is
* accessed, and that bank performs a transfer from RAM
* the shift register. The bank selected is also latche
* so that it will remain enabled throughout the video l
*
* When LBLANK is asserted, the SCLK signals to the VRAM
* held low, and the VRAM's shift registers do not shift
* Therefore, during vertical retrace, the VRAM's serial
* ports are not clocked, and so they do not change.
*
* Force DPYADR to current frame.
*
      move     @DPYSTRT,@DPYADR
*
* Transfer cleared memory from screen into all 4 shift
* registers by performing an SRT read on the VRAM.
*
      movi     [0,0],TEMP
      pixt     *TEMP.XY,TEMP
*
* Set PITCH to proper value for SRT cycles.
*
      sll      2,DPTCH
      move     DPTCH,TEMP
      lmo      TEMP,TEMP
      move     TEMP,@CONVDP,0
*
* Transfer all 4 shift registers back into all of memory, 99 times.
*
      movi     [1,0],DADDR              ; starting posn is top left
      movi     [99,4],DYDX              ; number of rows to xfer
      FILL     XY
*
* Restore PITCH to proper value for normal drawing.
*
      srl      2,DPTCH
      move     DPTCH,TEMP
      lmo      TEMP,TEMP
      move     TEMP,@CONVDP,0
*
* Restore previous frame 1 OFFSET value, if necessary
*
*
      cmpi     FRAME1_CLS_OFFSET,OFFSET
      jrne     end_clear_screen
      movi     FRAME1_OFFSET,OFFSET
end_clear_screen:
*
* Restore old CONTROL value
*
      move     CTLSAVE,@CONTROL
*
* Set VRAM access mode to normal access (not SRT)
      move     @DPYCTL,TEMP
      andni    0800h,TEMP
      move     TEMP,@DPYCTL
*
* Return
*
      mmfm     SP,SADDR,SPTCH,DADDR,DYDX,DPTCH,OFFSET,COLOR1
      mmfm     SP,CTLSAVE,TEMP,TEMP2
      RETS
```

TABLE I-continued

```
*
*                       DISPLAY FRAME 0
*
disp_frame0:
     mmtm      SP,A0
     movi      FRAME0_DPYSTRT,A0
     move      A0,@DPYSTRT              ; Frame 1
     mmfm      SP,A0
     RETS
*
*                       DISPLAY FRAME 1
*
disp_frame1:
     mmtm      SP,A0
     movi      FRAME1_DPYSTRT,A0
     move      A0,@DPSTRT               ; Frame 1
     mmfm:     SP,A0
     RETS
*
*                  DRAW in FRAME 0 subroutine
*
draw_frame0:
     movi      FRAME0_OFFSET,OFFSET
     RETS
*
*                  DRAW in FRAME 1 subroutine
*
draw_frame1:
     movi      FRAME1_OFFSET,OFFSET
     RETS
*
*                         Enable video
*
enable_video:
un_blank_video:
     mmtm      SP,A0
     move      @DPYCTL,A0
     ori       08000h,A0                ;Clear bit 15
     move      A0,@DPYCTL               ;Enable Video
     mmfm      SP,A0
     RETS
*
*                       INIT VIDEO routine
*
*
* Initialize I/O registers (GSP manual, Chapter 6)
* Timing is for 7.5 inch Sony monitor.
* Values are based upon monitor timing specification.
*
init_video:
     mmtm      SP,A0
     movi      27,A0
     move      A0,@HESYNC
     movi      67,A0
     move      A0,@HEBLNK
     movi      323,A0
     move      A0,@HSBLNK
     movi      351,A0
     move      A0,@HTOTAL
*
* VERTICAL timing registers:
*
     movi      2,A0
     move      A0,@VESYNC
     movi      20,A0
     move      A0,@VEBLNK
     movi      421,A0
     move      A0,@VSBLNK
     movi      424,A0
     move      A0,@VTOTAL
     movi      INIT_DPYCTL,A0
     move      A0,@DPYCTL
     movi      FRAME0_DPYSTRT,TEMP
     move      TEMP,@DPYSTRT
     clr       A0
     move      A0,@DPYTAP
     mmfm      SP,A0
     RETS
*
*                        Transparency Off
*
trans_off:
```

TABLE I-continued

```
    mmtm     SP,A0
    move     @CONTROL,A0
    andni    00020h,A0
    move     A0,@CONTROL
    mmfm     SP,A0
    RETS
*
*                        Transparency On
*
trans_on:
    mmtm     SP,A0
    move     @CONTROL,A0
    ori      00020h,A0
    move     A0,@CONTROL
    mmfm     SP,A0
    RET
*
*                        Windowing Off
*
window_off:
    mmm      SP,A0
    move     @CONTROL,A0
    andni    000C0h,A0
    move     A0,@CONTROL
    mmfm     SP,A0
    RETS
*
*                        Windowing On
*
window_on:
    mmtm     SP,A0
    move     @CONTROL,A0
    ori      0C0h,A0
    move     A0,@CONTROL
    mmfm     SP,A0
    RETS
*
* Load palette with data found at memory address contained in register A14.
* Data at *A14 must be stored as 16 bits per color item.
*
load_palette:
    mmtm     SP,COUNT
    mmtm     SP,OFFSET,DADDR,B10,B11,B14
    move     A14,B14
    move     @CONTROL,B11              ; Save CONTROL register.
    callr    window_off
    callr    trans_off
    movi     [0,400],DADDR             ; Point to first location
    movi     64,COUNT
next_color_load:
    move     *B14+,B10                 ; Fetch color
    callr    draw_frame0
    PIXT     B10,DADDR.XY              ; Store into palette
    callr    draw_frame1
    PIXT     B10,*DADDR.XY             ; Store into palette
    addi     [1,0],DADDR
    dsjs     COUNT,next_color_load
    move     B11,@CONTROL              ; Restore CONTROL register
    mmfm     SP,OFFSET,DADDR,B10,B11,B14
    mmfm     SP,COUNT
    RETS
*****************************************************************************
***                 DISPLAY LINE INTERRUPT ROUTINE                      ***
*****************************************************************************
* This routine is called when DPYINT = VSBLNK
* (start of vertical blanking (end of active video))
* Set DPYINT to VSBLNK.
*
* This routine checks the @clear_screen_flag flag.
* If this flag is set, the screen is cleared.
*
display_line_interrupt:
    mmtm     SP,TEMP,TEMP2,SCRATCH,CTLSAVE
    mmtm     SP,COLOR1,DADDR,DYDX,DPTCH,OFFSET
    mmtm     SP,B10,B11,B12,B13,B14
* Clear display line interrupt
    move     @INTPEND,TEMP
    andni    00400h,TEMP
    move     TEMP,@INTPEND
* Check to see if clear screen is required.
    move     @clear_screen_flag,TEMP
    jrz      end_display_line_interrupt
```

TABLE I-continued

```
* Clear Current Frame
    callr       cls__fast
* Reset clear screen flag
    clr         TEMP
    move        TEMP,@clear__screen__flag
end__display__line__interrupt:
    mmfm        SP,B10,B11,B12,B13,B14
    mmfm        SP,COLOR1,DADDR,DYDX,DPTCH,OFFSET
    mmfm        SP,TEMP,TEMP2,SCRATCH,CTLSAVE
    RETI
*****************************************************************************
*****************************************************************************
***                           DATA AREA                                   ***
*****************************************************************************
*****************************************************************************
    .data
*
* Palette color data
*
palette__data__1349:
    .word 0,  0,  0,  0   ;Color 0, Black
    .word 0,  1,  1,  1   ;Color 1, DIM GRAY
    .word 0,  6,  6,  6   ;Color 2, SK GRAY
    .word 0,  6,  6,  6   ;Color 3, GRAT GRAY
    .word 0,  0,  6,  0   ;Color 4, DIM
    .word 0,  0,  10, 0   ;Color 5, HALF
    .word 0,  0,  15, 0   ;Color 6, FULL
    .word 0,  0,  12, 15  ;Color 7, CYAN
    .word 0,  0,  14, 4   ;Color 8, GREEN
    .word 0,  13, 13, 0   ;Color 9, YELLOW
    .word 0,  15, 13, 0   ;Color 10, GOLD
    .word 0,  14, 8,  0   ;Color 11, ORANGE
    .word 0,  15, 0,  0   ;Color 12, RED
    .word 0,  0,  0,  15  ;Color 13
    .word 0,  0,  8,  15  ;Color 14, Blue
    .word 0,  15, 15, 15  ;Color 15, white
*=================================*
*             RAM VARIABLES             *
*=================================*
    .sect  "ramvars"
clear__screen__flag     .word   0
*=================================*
*             GSP Stack Area            *
*=================================*
    .sect  "stack"
stack__bottom:
stack__top:     .set    stack__bottom+010000h
*****************************************************************************
*                          Display list
*****************************************************************************
    .sect  "displist"
*
* Below are some sample values.
* In normal operation, the main processor would
* constantly fill the display list with the values it desires.
*
* The values are XY pairs.
* X occupies the least significant word in memory.
* Y occupies the most significant word in memory.
* Values correspond to screen positions,
* numbered from [0,0] to [1023,399],
* with [0,0] being the lower left of the screen.
*
dl__start:
    .word   300
    .word   350
    .word   150
    .word   150
    .word   225
    .word   250
    .word   525
    .word   250
    .word   450
    .word   150
    .word   550
    .word   150
    .word   625
    .word   150
    .word   700
    .word   250
    .word   925
    .word   250
```

TABLE I-continued

```
    .word   850
    .word   150
    .word   625
    .word   150
    .word   550
    .word   50
    .word   0
    .word   0
    .word   0
    .word   0
    .word   0
    .word   0
    .word   0
    .word   0
    .word   0
    .word   0
dl_end:   .set   dl_start+(dl_size*32)
**************************************************************************
*                        Interrupt vectors
**************************************************************************
    .sect   "vectors"
    .long   start                     ;Trap 31
    .long   start                     ;ILLOP
    .long   start                     ;Trap 29
    .long   start                     ;Trap 28
    .long   start                     ;Trap 27
    .long   start                     ;Trap 26
    .long   start                     ;Trap 25
    .long   start                     ;Trap 24
    .long   start                     ;Trap 23
    .long   start                     ;Trap 22
    .long   start                     ;Trap 21
    .long   start                     ;Trap 20
    .long   start                     ;Trap 19
    .long   start                     ;Trap 18
    .long   start                     ;Trap 17
    .long   start                     ;Trap 16
    .long   start                     ;Trap 15
    .long   start                     ;Trap 14
    .long   start                     ;Trap 13
    .long   start                     ;Trap 12
    .long   start                     ;WV
    .long   display_line_interrupt    ;DI
    .long   start                     ;HI
    .long   start                     ;NMI
    .long   start                     ;Trap 7
    .long   start                     ;Trap 6
    .long   start                     ;Trap 5
    .long   start                     ;Trap 4
    .long   start                     ;Trap 3
    .long   start                     ;INT 2
    .long   start                     ;INT 1
    .long   start                     ;Reset
    .end
```

The image data generated by the graphics system processor 12 appears on the I/O data bus 16 in Y,X coordinate form with the Y,X coordinate address information appearing on output address lines 18 and 20 of the graphics system processor. Conventionally, when the graphics system processor 12 converts the X,Y pixel location into a video memory address, it uses the X value as the least significant portion of the video memory address and the Y value as the most significant portion of the video memory address. But since the X and Y values have been exchanged, the video memory address that is generated will have the least significant portion generated from the Y value, and the most significant portion generated from the X value.

In order to write the pixels into the proper, conventional locations in a video memory 28, it is now necessary to exchange the upper and lower portions of the address bus before presenting the address to the video memory. The Y coordinate address line 18 and X coordinate address line 20 are therefore connected to an address translator circuit 22 included in the image data generation circuit 10. The address translator circuit 22 converts the address information on the Y and X coordinate address lines 18 and 20 to X and Y coordinate information on address lines 24 and 26, respectively. Thus, when the graphics system processor 12 outputs the video memory address, the address translator circuit 22 reverses it again. The result is that the Y-half (low order bits now) determine the row address in the video memory 28, and the X-half of the address (higher order bits now) determine the column address in the video memory.

The X and Y coordinate address lines 24 and 26 are connected to the video memory 28 which also receives image data on the data I/O bus 16. The video memory 28 stores image data in memory locations identified by the address information on the X and Y coordinate address lines 24 and 26 to write the image data into the appropriate memory locations for generating a raster display.

In accordance with the invention, the video memory 28 preferably comprises 16 VRAMs, arranged as four banks of four. For example, the video memory 28 can comprise conventional 256K-bit video memories arranged as 64K×4 VRAMs available from any one of a number of integrated circuit manufacturers.

The video memory 28 also comprises a video memory shift register 28A into which image data for drawing each individual row of the raster display is sequentially written and subsequently fed on a video data bus 32 to a CRT 30 to modulate the electron beam. For example, the CRT 30 can be a Sony Part Number CHM-7501-00 color monitor.

Accordingly, the graphics system processor 12 accesses the video memory 28 in groups of either vertically adjacent memory cells or horizontally adjacent memory cells. During drawing, the video memory 28 is accessed vertically, resulting in the writing of four vertically adjacent pixels a memory cycle. During screen update or refresh, the video memory shift register 28A is accessed horizontally, shifting out four horizontally adjacent pixels per shift cycle to the CRT 30. The effect of this dual access is that it allows faster writing of vertical lines, yet it still allows conventional transfers of pixels to the CRT 30 for screen update or refresh.

Figure 2A:
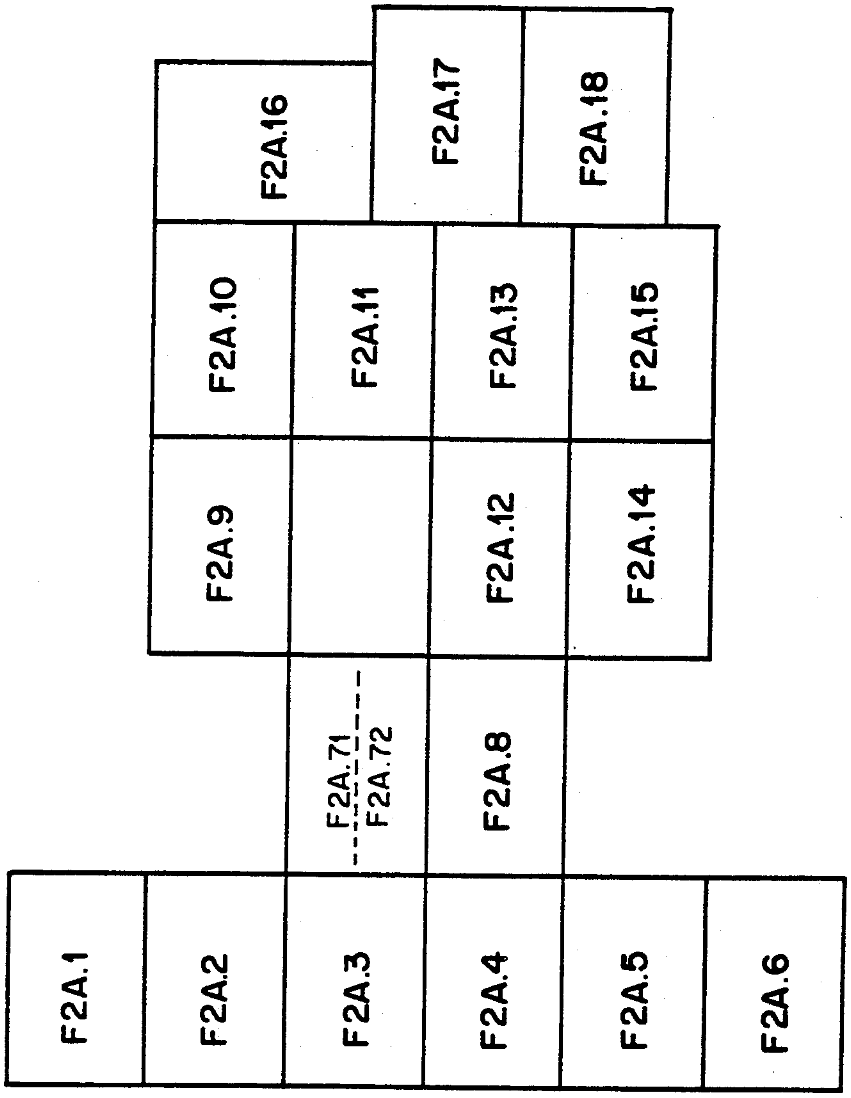
FIG. 2, comprising FIGS. 2A, 2A.1–2A.18, 2B, and 2B.1–2B.17, is a detailed schematic drawing of one implementation of the image data generation circuit shown in FIG. 1.
Figure 2B:
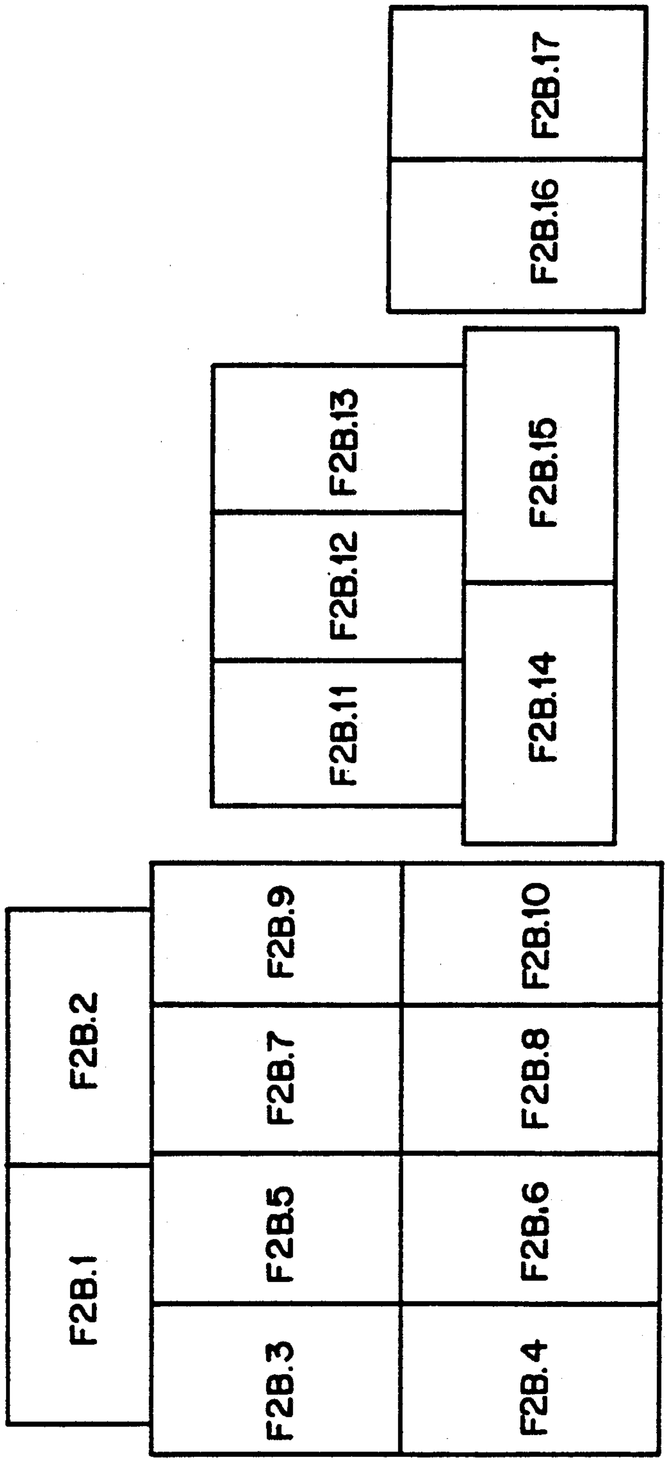

FIG. 2, comprising FIGS. 2A and 2B, shows a detailed implementation of the image data generation circuit 10 shown in FIG. 1. The correspondence between the elements of the block diagram in FIG. 1 and the corresponding implementation shown in FIG. 2 is indicated by labeled boxes in FIGS. 2A and 2B.

As shown in FIG. 2A, measurement data is preferably entered through the graphics system processor 12 to the display list memory 14 shown in FIG. 2B, rather than directly to the display list memory. During this operation, the graphics system processor 12 serves as a slave processor, and this operation does not form any part of the image data generation method in accordance with the invention.

Referring to FIG. 2A, the high address information (X coordinate information) on address lines 20 appears at pins LAD 2 through LAD 11. The low address (Y coordinate information) appears on pins LAD 0 through LAD 9. Image data appears on pins LAD 0 through LAD 15. This occurs during three sequential output periods of the graphics system processor 12.

Generally, the circuitry which performs the video memory interface is shown on the right half of FIG. 2A. The VRAMs of the video memory 28 are shown on the left half of FIG. 2B. The hardware is all standard off-the-shelf components. The component types are indicated in FIGS. 2A and 2B.

The address translator circuit 22 is preferably implemented by two PALs U49 and U50. This logic controls accesses to the video memory 28, choosing the proper VRAMs for a given memory cycle. This hardware latches the row address from the graphics system processor 12, using LRAS. Next, it sends the column address from the graphics system processor 12 to the VRAMs of the video memory 28, followed immediately by a LRAS signal. (This LRAS signal will come from the LCAS signal of the graphics system processor 12.) Thus, the VRAMs of the video memory 28 will use the column address as their row address. Next, the hardware waits 24 nS, determined using the LCLK1 and LCLK2 outputs from the graphics system processor 12. Finally, it sends the row address (latched in the first step above) to the VRAMs of the video memory 28 followed immediately by a LCAS signal. (This LCAS signal will come from the LCAS signal of the graphics system processor 12, delayed 24 nS.) Thus, the VRAMs of the video memory 28 will use the row address from the graphics system processor 12 as their column address. The equations for the logic implemented in the two PALs U49 and U50 which implement the address translator circuit 22 are shown in Table II below.

TABLE II

```
/*-------------------------------------------------------------------------------*/
/*--------------------- GSP Memory Decode PAL ---------------------*/
/*-------------------------------------------------------------------------------*/
/* PAL 1G, IC U49        */
/* pal_type 'PAL16L8'    */
/* Designed by Roger Petersen          */
/* Copyright © Hewlett-Packard 1988    */
/*--------------------- Declaration of Pin Names ---------------------*/
dummy main(
    LSRT, LRF, A26, LAL24, LRAS, LLAL,
    A9, A8, LCLK2, OE,
    LLE1, LLE2, SRTRD,
    LRAS0, LRAS1, LRAS2, LRAS3, XTRAO
)
input    LSRT, LRF, A26, LAL24, LRAS, LLAL,
         A9, A8, LCLK2, OE ;
output   LRAS0, LRAS1, LRAS2, LRAS3, XTRAO,
         SRTRD, LLE1, LLE2;
{
    /*
    * Format: The outputs are defined
    *    as boolean equations which
    *    depend on the values of the inputs.
    * Notation:
    *        ! means logical NOT (inversion)
    *        & means logical AND
    *        | means logical OR
    */
/*-------------------------- Macro Definitions --------------------------*/
/* These are intermediate variables,                    */
/* used in the final equations.                         */
node     refresh, sr_xfer, access, vram,
         bank0, bank1, bank2, bank3 ;
refresh  = (!LRF & LSRT) ;
sr_xfer  = (LRF & !LSRT) ;
access   = (LRF & LSRT) ;
vram     = (!A26) ;
bank0    = (!A9 & !A8) ;
bank1    = (!A9 & A8) ;
bank2    = ( A9 & !A8) ;
bank3    = ( A9 & A8) ;
/*---------------------------- Main Equations ----------------------------*/
node     lras0, lras1, lras2, lras3,
         srtrd, lle1, lle2;
lras0 = !( refresh & !LRAS
         | sr_xfer & !LRAS
         | access & vram & bank0 & !LRAS & !LLAL) ;
lras1 = !( refresh & !LRAS
         | sr_xfer & !LRAS
         | access & vram & bank1 & !LRAS & !LLAL) ;
lras2 = !( refresh & !LRAS
         | sr_xfer & !LRAS
         | access & vram & bank2 & !LRAS & !LLAL) ;
lras3 = !( refresh & !LRAS
         | sr_xfer & !LRAS
         | access & vram & bank3 & !LRAS & !LLAL) ;
/*
* LLE2 is enabled all of the time . . .
* except during the following cycles:
*    1.   VRAM access cycles,
*         when LLE1 is enabled during VRAM ROW time.
*    2.   VRAM SRT cycles,
*         when LLE1 is enabled during VRAM ROW time.
*/
lle2 = ( access & vram & !LRAS & LAL24
       | sr_xfer & LCLK2 ) ;
lle1 = !( access & vram & !LRAS & LAL24
        | sr_xfer & LCLK2 ) ;
/* Latch shift-bank address on RAS of SRT cycle. */
srtrd = ( !LSRT & vram & !LRAS & !LLAL ) ;
/*--------------------- Tristate Output Equations ---------------------*/
LRAS0    = tri(lras0, OE) ;
LRAS1    = tri(lras1, OE) ;
LRAS2    = tri(lras2, OE) ;
LRAS3    = tri(lras3, OE) ;
SRTRD    = tri(srtrd, OE) ;
```

TABLE II-continued

```
LLE1     = tri(lle1, OE) ;
LLE2     = tri(lle2, OE) ;
XTRAO    = tri(vcc( ), vcc( )) ;
}
/*-----------------------------------------------------------------------*/
/*---------------------- GSP Memory Decode PAL ----------------------*/
/*-----------------------------------------------------------------------*/
/* PAL 2I, IC U50          */
/* pal_type 'PAL16L8'      */
/* Designed by Roger Petersen        */
/* Copyright © Hewlett-Packard 1988  */
/*---------------------- Declaration of Pin Names ----------------------*/
dummy main(
     LSRT, LRF, A26, A25, LRAS, LCAS,
     LWR, LTRQE, SCLK, SCLKBLK, OE,
     LSCLK, LTEST, LRASD, LCASD, LCASV,
     LSRTWR, XTRAO
     )
input    LSRT, LRF, A26, A25, LRAS, LCAS,
         LWR, LTRQE, SCLK, SCLKBLK, OE ;
output   LSCLK, LTEST, LRASD, LCASD, LCASV,
         LSRTWR, XTRAO ;
{
     /*
     * Format: The outputs are defined as
     *    boolean equations which
     *    depend on the values of the inputs.
     * Notation:
     *        ! means logical NOT (inversion)
     *        & means logical AND
     *        | means logical OR
      */
/*--------------------------- Macro Definitions ---------------------------*/
/* These are intermediate variables,                 */
/* used in the final equations.                      */
node      refresh, sr_xfer, access,
          vram, dram, test ;
refresh   = (!LRF & LSRT) ;
sr_xfer   = (LRF & !LSRT) ;
access    = (LRF & LSRT) ;
vram      = (!A26) ;
dram      = (A26 & A25) ;
test      = (A26 & !A25) ;
/*----------------------------- Main Equations -----------------------------*/
node     lrasd, lcasd, lcasv, ltest, lsclk, lsrtwr ;
lrasd    = !( refresh & !LRAS
         | access & dram & !LRAS );
lcasd    = !( access & dram & !LRAS & !LCAS );
lcasv    = !( access & vram & !LRAS & !LTRQE & LWR
         | access & vram & !LRAS & !LWR & LTRQE
         | sr_xfer & !LRAS & !LCAS );
ltest    = !( access & test & !LRAS & LWR );
lsclk    = ( !SCLKBLK & !SCLK );
lsrtwr   = !( !LWR & !LTRQE );
/*---------------------- Tristate Output Equations ----------------------*/
LRASD     = tri(lrasd, OE) ;
LCASD     = tri(lcasd, OE) ;
LCASV     = tri(lcasv, OE) ;
LTEST     = tri(ltest, OE) ;
LSCLK     = tri(lsclk, OE) ;
LSRTWR    = tri(lsrtwr, OE) ;
XTRAO     = tri(vcc( ),vcc( )) ;
```

As shown in the right hand portion of the block 22 in FIG. 2A, the address information which appears on the address lines 24 and 26 is preferably multiplexed to the video memory 28 (FIG. 2B) on lines A0 through A7. A DMUX U46 and latch U47, shown below block 22 in FIG. 2A, interconnect the graphics system processor 12 and the video memory 28 (FIG. 2B) to control loading and shifting of the video memory shift register 28A whose outputs appear on lines SD0 through SD15 from the video memory, which form the video data bus 32. The four D flip-flops U30A, U30B, U41A, and U41B, shown below the block 34 in FIG. 2B, provide the required timing on a shift control bus 38B that controls the shifting of image data from the shift register 28A.

In summary, in the graphics system processor 12, the X-half of an X,Y register constitutes the lowest order bits of the video memory address, and the Y-half of the X,Y register constitutes the higher order bits. In order to draw vertical lines quickly, the X and Y halves of the X,Y register need to be arranged exactly the opposite. The solution is to reverse the X and Y positions in the registers of the graphics system processor 12, and then to reverse the row and column address lines going to the VRAMs of the video memory 28.

Accordingly, the X and Y pixel coordinates are reversed in software, defining the lower half of each X,Y register as the Y half and the upper half as the X half. Transposing the X and Y addresses requires additional hardware to reverse the row and column addresses supplied by the graphics system processor 12 before they are presented to the VRAMs of the video memory 28. Accordingly, the address translator circuit 22 reverses the X and Y pixel address coordinates during drawing cycles of the graphics system processor 12, but maintains standard addressing for screen update or refresh and memory update or refresh.

Doing so, the pixels end up being stored in VRAM with their X and Y values oriented in a standard manner. It is now possible to shift these pixels out to the CRT 30 in a standard fashion.

As shown in FIG. 1, the image data generation circuit 10 also preferably includes a pixel processing circuit 34 connected between the video memory shift register 28A and the CRT 30. The pixel processing circuit 34 replicates pixels based on the image data that appears on the video data bus 32 to double the width of the trace displayed on the CRT 30.

Pixel stretching is a method of doubling pixel positionability in the horizontal direction, while not actually doubling the resolution requirements of the CRT 30. To implement pixel stretching, the horizontal resolution of the raster display is doubled, resulting in much smoother appearing, near-vertical lines.

In doubling the horizontal resolution alone, a problem occurs. Vertically oriented lines are now twice as thin as horizontal lines, and so they appear much dimmer. To compensate for this dimming, each pixel is stretched to twice its width in the horizontal direction. The result is vertically oriented lines of proper brightness and with improved smoothness.

A resolution of 512×400 (identical to a Series 300 Bobcat computer with medium resolution graphics and 35741 display) is initially chosen. In accordance with pixel stretching, the resolution is doubled to 1024×400. In spite of the doubled horizontal resolution and video rate, the same 512×400 CRT can be used. The reason is that the video input signal to the CRT is still composed of standard 1/512 width pixels (1/1024 * 2). The only difference is that the pixels are sometimes offset half a pixel width, due to 1/1024 positionability. Note that since each pixel is still 1/512th of a line wide, and not 1/1024th, the bandwidth requirements of the CRT are not increased.

Table III below illustrates an example of how a vertically oriented line would appear using various display techniques. Each "X" represents 1/1024th of the screen width.

TABLE III

| 512 horiz. pixels no stretching | 1024 horiz. pixels no stretching (or before stretching) | 1024 horiz. pixels with stretching |
|---|---|---|
| XX | X | XX |
| XX | X | XX |
| XX | X | XX |
| XX | X | XX |
| XX | X | XX |
| XX | X | XX |
| XX | X | XX |
| XX | X | XX |
| XX | X | XX |
| XX | X | XX |
| XX | X | XX |
| XX | X | XX |
| XX | X | XX |
| XX | X | XX |
| XX | X | XX |
| XX | X | XX |

Since the CRT has a horizontal resolution of only 512 pixels, the question arises whether or not 1024 pixels can be mapped onto it. Won't some pixels land between the colored phosphors?

The answer is that the screen of a color RGB monitor can be thought of as a continuous field of RGB phosphor and not discrete colored phosphor trios. This conceptualization is valid because the electron beam which strikes the phosphor has a Gaussian distribution about its center. This distribution causes approximately 2.67 phosphor trios on the face of the CRT to glow. (A portion of this wide distribution is caused by the inability to turn the electron beam on or off instantaneously.) When viewed by the human eye, the brain quantifies the spot, making it appear to be emanating from a single point, not 2.67 individual phosphor trios. Thus, the exact point of electron beam landing, be it centered on a trio or in between two trios, has little effect on the resultant image.

Pixel stretching is preferably implemented in hardware. As shown in FIG. 2B, the pixel processing circuit 34 comprises two multiplexers U15 and U16 for a 16-to-8-bit data reduction connected to a latch U29 and a PAL U14. Each adjacent pair of pixels enters the pixel stretching PAL U14. This PAL uses the following stretching algorithm. IF the current pixel is a background color (0000), THEN output the previous value of the pixel (stretch it). IF the current pixel is NOT a background color (0001 . . . 1111), THEN output the current pixel (don't stretch the previous pixel). An example of pixel stretching follows.

| | | |
|---|---|---|
| input: | ......R...G.B....... | (R,G,B = colors) |
| result: | ......RR..GGBB...... | (. = background) |

It is possible for a group of non-background color pixels to be packed so closely together that some of them cannot be stretched. For example, let's suppose that there were three adjacent red, green, and blue pixels.

| | |
|---|---|
| input: | .......RGB.......... |
| result: | .......RGBB......... |

Note that the red and green pixels cannot be stretched to their full width, but they are still displayed at their unstretched width (limited somewhat by CRT bandwidth). On a 512-pixel wide screen, however, only two pixels could have been displayed in the same case, due to its lower resolution. Hence, pixel stretching is still advantageous. The PAL equations for the PAL U14 appear in Table IV below.

TABLE IV

```
/*----------------------------------------------------------------------------------------------*/
/*------------------------------ GSP Pixel Stretching PAL ------------------------------*/
/*----------------------------------------------------------------------------------------------*/
/* pal_type 'PAL20L8' */
/* Designed by Roger Petersen        */
/* Copyright © Hewlett-Packard 1988  */
/*---------------------------- Declaration of Pin Names --------------------------------*/
dummy main(
PIXA0, PIXA1, PIXA2, PIXA3, PIXB0, PIXB1, PIXB2, PIXB3,
PIXD0, PIXD1, PIXD2, PIXD3, LFIRST, STRETCH,
OUTA0, OUTA1, OUTA2, OUTA3, OUTB0, OUTB1, OUTB2, OUTB3
)
input   PIXA0,  PIXA1,  PIXA2,  PIXA3,
        PIXB0,  PIXB1,  PIXB2,  PIXB3,
        PIXD0,  PIXD1,  PIXD2,  PIXD3,   LFIRST, STRETCH ;
output  OUTA0,  OUTA1,  OUTA2,  OUTA3,
        OUTB0,  OUTB1,  OUTB2,  OUTB3 ;
{
/*
* Format: The outputs are defined as boolean equations *
* which depend on the values of the inputs. *
* Notation:
    *     ! means logical NOT (inversion)
    *     & means logical AND
    *     | means logical OR
    */
/*------------------------------------ Macro Definitions ------------------------------------*/
/* These are intermediate variables, used in the                                      */
/* final equations. */
node A_backgnd, B_backgnd, ok_to_stretch_A,
ok_to_stretch_B ;
A_backgnd = (!PIXA0 & !PIXA1 & !PIXA2 & !PIXA3) ;
B_backgnd = (!PIXB0 & !PIXB1 & !PIXB2 & !PIXB3) ;
ok_to_stretch_A = (LFIRST & STRETCH) ;
ok_to_stretch_B = (STRETCH) ;
/*------------------------------------ Main Equations ------------------------------------*/
/*
```

TABLE IV-continued

```
* Algorithm:
*   If Pixel_A is a background pixel, and it's          *
ok_to_stretch_A, then use previous pixel (which is      *
Pixel_D) else use current pixel (which is
*   Pixel_A) */
 OUTA0 = !( !PIXD0   & A_backgnd & ok_to_stretch_A
          | !PIXA0   & !A_backgnd
          | !PIXA0   & !ok_to_stretch_A );
 OUTA1 = !( !PIXD1   & A_backgnd & ok_to_stretch_A
          | !PIXA1   & !A_backgnd
          | !PIXA1   & !ok_to_stretch_A );
 OUTA2 = !( !PIXD2   & A_backgnd & ok_to_stretch_A
          | !PIXA2   & !A_backgnd
          | !PIXA2   & !ok_to_stretch_A );
 OUTA3 = !( !PIXD3   & A_backgnd & ok_to_stretch_A
          | !PIXA3   & !A_backgnd
          | !PIXA3   & !ok_to_stretch_A );
/*
* Algorithm:
*   If Pixel_B is a background pixel, and it's          *
ok_to_stretch_B, then use previous pixel (which is      *
Pixel_A) else use current pixel (which is
*   Pixel_B) */
 OUTB0 = !( !PIXA0   & B_backgnd & ok_to_stretch_B
          | !PIXB0   & !B_backgnd
          | !PIXB0   & !ok_to_stretch_B );
 OUTB1 = !( !PIXA1   & B_backgnd & ok_to_stretch_B
          | !PIXB1   & !B_backgnd
          | !PIXB1   & !ok_to_stretch_B );
 OUTB2 = !( !PIXA2   & B_backgnd & ok_to_stretch_B
          | !PIXB2   & !B_backgnd
          | !PIXB2   & !ok_to_stretch_B );
 OUTB3 = !( !PIXA3   & B_backgnd & ok_to_stretch_B
          | !PIXB3   & !B_backgnd
          | !PIXB3   & !ok_to_stretch_B );
}
```

As shown in the right hand portion of FIG. 2B, a video palette U1 is connected to the outputs of the pixel processing circuit 34 for converting the digital image data to analog signals which are input to the CRT 30. For the sake of simplification, the detailed circuit of CRT 30 is omitted from FIG. 2, since it forms no part of this invention.

Figure 3A:
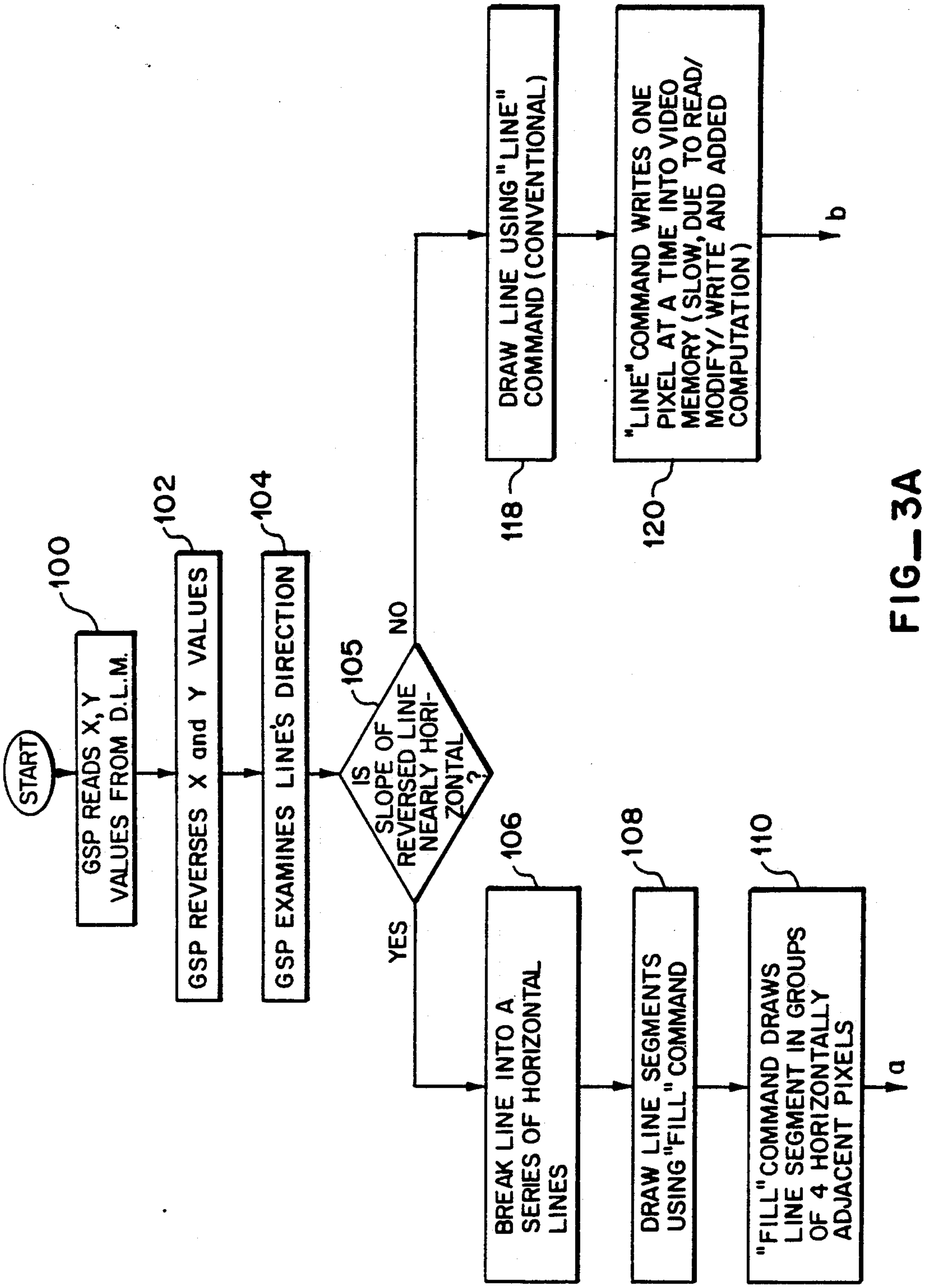
FIGS. 3A and 3B, is a flow chart of one embodiment of the method in accordance with the invention for speeding generation of raster displays.
Figure 3B:
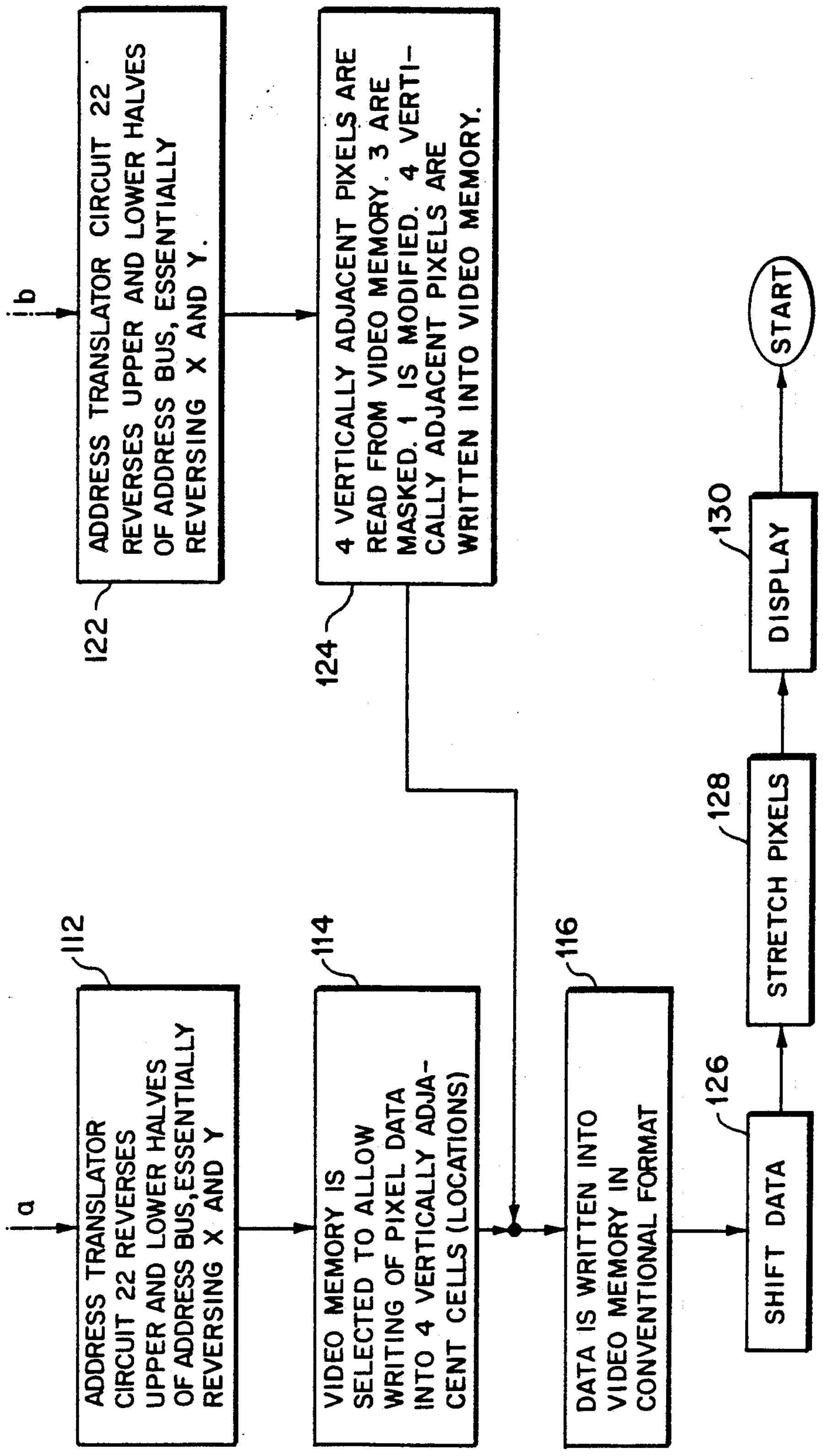

Operation of the image data generation circuit 10 is summarized in the flow chart shown in FIG. 3. As shown in FIG. 3, the graphics system processor 12 initially reads X,Y values from the display list memory 14, as indicated by the numeral 100. In accordance with the method of the invention, the graphics system processor 12 next reverses X and Y values to Y and X values, as indicated by the numeral 102. Then, the graphics system processor 12 examines the direction of the reversed line joining adjacent Y,X values, as indicated by the numeral 104.

On the one hand, if the slope of the reversed line is nearly horizontal, as indicated by the numeral 105, the graphics system processor 12 breaks the reversed line into a series of horizontal line segments, as indicated by the numeral 106. Then, the graphics system processor 12 draws line segments using the "FILL" command, as indicated by the numeral 108.

After the graphics system processor 12 executes the "FILL" command to draw line segments in groups of four horizontally adjacent pixels, as indicated by the numeral 110, the address translator circuit 22 reverses the upper and lower halves of the address bus, essentially reversing X and Y values, as indicated by the numeral 112. This selects the video memory 28 to allow writing of pixel data into four vertically adjacent memory cells (locations), as indicated by the numeral 114. The pixel data is thus written into the video memory 28 in conventional format, as indicated by the numeral 116.

On the other hand, if the slope of the reversed line is not nearly horizontal, as determined by the step 105, the graphics system processor 12 draws a line using a conventional "LINE" command, as indicated by the numeral 118. Accordingly, the graphics system processor 12 executes the "LINE" command to write one pixel at a time into the video memory 28, as indicated by the numeral 120. This is relatively slow, due to a read/modify/write process described in more detail below, and added computation.

Then, the address translator circuit 22 reverses the upper and lower halves of the address bus, essentially reversing X and Y values, as indicated by the numeral 122. In accordance with the read/modify/write process, the graphics system processor 12 next reads four vertically adjacent pixels from the video memory 28, three are masked, and one is modified, and then the resultant pixel data is written into four vertically adjacent memory cells in the video memory, as indicated by the numeral 124. The pixel data is thus written into the video memory 28 in conventional format, as indicated by the numeral 116.

Next, the pixel data is read into the video memory shift register 28A and shifted out as indicated by the numeral 126. Preferably, pixels are stretched, as indicated by the numeral 128. Finally, the image is displayed by the CRT 30, as indicated by the numeral 130.

In accordance with the invention, the conventional line drawing process of the graphics system processor 12 is improved to smoothly and consistently track vertical transitions in traces. This is particularly useful in displaying measurement data traces of instruments, such as network analyzers. An exemplary trace appears in FIG. 4.

Table V below compares the drawing speed of the TMS34010 GSP as it was designed to be used versus being incorporated into the image data generation circuit 10 when drawing vertical lines.

TABLE V

| Pixel Size | Normal Operation | Transposed Operation |
|---|---|---|
| 1 | 640 nS/pixel | 20 nS/pixel |
| 2 | 640 nS/pixel | 40 nS/pixel |
| 4 | 640 nS/pixel | 80 nS/pixel |
| 8 | 640 nS/pixel | 160 nS/pixel |
| 16 | 640 nS/pixel | 320 nS/pixel |

In the example of 4-bit pixels, there is an eight-fold increase in the rate of updating the video memory 28 and a corresponding increase in the speed of updating the CRT 30.

The foregoing description is offered primarily for purposes of illustration. While a variety of embodiments of the image data generation method and apparatus in accordance with the invention has been disclosed, it will be readily apparent to those skilled in the art that numerous other modifications and variations not mentioned above can still be made without departing from the spirit and scope of the invention as claimed below.

What is claimed is:

1. Apparatus for increasing the speed of displaying images on raster display means for displaying image data in the form of images, comprising:

a graphics system processor for receiving information to be displayed, at least a portion of the information being in the form of X,Y coordinate data, the graphics system processor for transposing each received set of X and Y coordinates so that X,Y becomes Y,X and then for processing at least one adjacent pair of transposed coordinates to generate at least one line segment by using a first set of transposed coordinates as the starting point and a second set of transposed coordinates as the end point to generate image data and addresses for storage of the image data;

a video memory connected by means of an I/O data bus to the graphics system processor, the video memory for storing image data, the video memory being connected to the raster display means; and an address translator circuit connected by first address lines to the graphics system processor and by second address lines to the video memory, the address translator circuit for retransposing each received set of Y and X coordinate data from the graphics system processor so that Y,X is restored to X,Y, thereby enabling the writing of image data into the video memory so that the image data is properly fed under control of the graphics system processor to modulate the electron beam of the raster display means.

2. The apparatus of claim 1 wherein the address translator circuit writes into the video memory by reversing address select lines to the video memory so that the image data is correctly stored for later access.

3. The apparatus of claim 2 wherein the address translator circuit enables the image data to be written into the video memory in banks of vertically oriented image data, as compared to horizontally oriented banks of image data, so that the image data is stored in the video memory in a conventional format for updating images on the raster display means.

4. The apparatus of claim 1 wherein the raster display means is a CRT.

5. The apparatus of claim 1 wherein the graphics system processor computes a best-fit set of points between the starting and end points to interconnect them using Bresenham's line-drawing algorithm.

6. The apparatus of claim 1, further comprising a pulse stretching circuit connected between the video memory and the raster display means for replicating an adjacent pixel for each pixel of each line segment to provide a smooth, high resolution trace.

7. Apparatus for speeding generation of images on raster display means, comprising:

a display list memory for storing raw data, at least a portion of the raw data being stored in the display list memory in X,Y coordinate form;

a video memory;

a graphics system processor connected to the display list memory and programmed for reading raw data from the display list memory on an I/O data bus which interconnects the graphics system processor and the display list memory, the graphics system processor after reading the raw data in X,Y coordinate form for transposing the raw data to Y,X coordinate form and then commencing a line-drawing operation which translates the raw data to a pictorial representation in the form of image data, the image data generated by the graphics system processor appearing on the I/O data bus in Y,X coordinate form with the Y,X coordinate address information appearing on first and second output address lines of the graphics system processor, such that a video memory address that is generated will have the least significant portion generated from the Y value and the most significant portion generated from the X value; and an address translator circuit for converting the address information on the first and second output address lines of the graphics system processor to X and Y coordinate information appearing on first and second output address lines of the address translator circuit, respectively, to exchange the upper and lower portions of the address bus before presenting the address to the video memory so that the Y-half (low order bits now) determines the row address in the video memory and the X-half of the address (higher order bits now) determines the column address in the video memory;

the video memory being connected to the first and second output address lines of the address translator circuit and the I/O data bus for receiving image data, the video memory storing image data in memory locations identified by the address information on the first and second output address lines of the address translator circuit to write the image data into appropriate memory locations for generating images on the raster display means.

8. The apparatus of claim 7 wherein the video memory comprises 16 VRAMs arranged as four banks of four.

9. The apparatus of claim 8 wherein the video memory comprises conventional 256K-bit video memories arranged as 64k×4 VRAMs.

10. The apparatus of claim 7 wherein the video memory comprises a video memory shift register into which image data for drawing each individual row of the raster display means is sequentially written and subsequently fed on a video data bus to the raster display means.

11. The apparatus of claim 10 wherein the raster display means is a CRT.

12. The apparatus of claim 11 wherein the CRT is a color monitor.

13. The apparatus of claim 10, further comprising a pixel processing circuit connected between the video memory shift register and the raster display means for replicating pixels based on the image data that appears on the video data bus to double the width of a trace displayed on the raster display means.

14. The apparatus of claim 13, further comprising a video palette connected between the pixel processing circuit and the raster display means for converting the image data to analog signals which are input to the raster display means.

15. The apparatus of claim 7 wherein the graphics system processor executes a fill rectangle command for performing actual line drawing.

16. A method for speeding generation of images on raster display means, comprising the steps of:

altering a graphics system processor to operate as though it is drawing horizontal lines, when it is processing vertical line data, by exchanging X and Y coordinates of each line segment endpoint and computing vertical line segments in a pseudo-horizontal mode; and exchanging X and Y halves of video memory addresses computed by the graphics system processor by means of an address translator circuit so that image data is written into a video memory in an appropriate format for generating a raster display.

17. The method of claim 16 wherein computing vertical line segments comprises the steps of:

reading raw data in X,Y coordinate form by means of the graphics system processor;

transposing the raw data to Y,X coordinate form by means of the graphics system processor;

determining the horizontal separation between adjacent points of the transposed data by means of the graphics system processor;

determining the vertical spacing between adjacent points by means of the graphics system processor if the horizontal spacing is less than a predetermined distance;

breaking the vertical spacing into a set of vertical line segments offset horizontally from one another by one pixel by means of the graphics system processor if the vertical spacing is greater than the horizontal separation, i.e., the slope is greater than 45 degrees;

breaking the vertical spacing into two vertical line segments of equal length, ignoring round-off, by means of the graphics system processor, if the cumulative offset between X coordinates is one; and if the cumulative offset is two or more, computing the number of vertical line segments to be Delta X plus 1, where Delta X equals the number of pixels separating the adjacent X coordinates, determining a length for each vertical segment by computing the vertical spacing so as to determine the number of pixels between the Y coordinates of the adjacent points, inclusive of end points, and dividing the result by Delta X, ignoring round-off, and, finally, setting the first and last vertical line segments to be half the length (number of pixels) of the remaining vertical line segments by means of the graphics system processor.

18. The method of claim 17, further comprising the step of pixel stretching so that if the current pixel is a background color, then the previous value of the pixel is output, and if the current pixel is not a background color, then the current pixel value is output.

19. A method for increasing the speed of generating images on raster display means, comprising the steps of:

initially reading X,Y values from a display list memory;

reversing X and Y values to Y and X values;

examining the direction of the reversed line joining adjacent Y,X values;

breaking the reversed line into a series of horizontal line segments, if the slope of the reversed line is nearly horizontal;

drawing line segments using a "FILL" command to draw line segments in groups of horizontally adjacent pixels; and reversing the upper and lower halves of an address bus, thereby reversing X and Y values to select a video memory to allow writing of pixel data into vertically adjacent memory cells so that the pixel data is thus written into video memory in conventional format.

20. The method of claim 19, further comprising the steps of:

drawing a line using a conventional "LINE" command to write one pixel at a time into the video memory, if the slope of the reversed line is not nearly horizontal;

reversing the upper and lower halves of the address bus, thereby reversing X and Y values; and performing a read/modify/write process by reading a predetermined number of vertically adjacent pixels from the video memory, masking all but one, and modifying one, and then writing the resultant pixel data into the predetermined vertically adjacent memory cells in the video memory so that the pixel data is thus written into the video memory in conventional format.

* * * * *